(12) United States Patent
Kim et al.

(10) Patent No.: US 9,983,664 B2
(45) Date of Patent: May 29, 2018

(54) MOBILE DEVICE FOR EXECUTING MULTIPLE APPLICATIONS AND METHOD FOR SAME

(71) Applicant: Samsung Electronics Co., Ltd., Suwon-si, Gyeonggi-do (KR)

(72) Inventors: Kang-Tae Kim, Yongin-si (KR); Kwang-Won Sun, Suwon-si (KR); Eun-Young Kim, Yongin-si (KR); Chul-Joo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 13/679,066

(22) Filed: Nov. 16, 2012

(65) Prior Publication Data
US 2013/0120295 A1    May 16, 2013

(30) Foreign Application Priority Data

Nov. 16, 2011    (KR) .......................... 10-2011-0119879

(51) Int. Cl.
*G06F 3/01*    (2006.01)
*G06F 3/044*    (2006.01)
(Continued)

(52) U.S. Cl.
CPC ................ *G06F 3/01* (2013.01); *G06F 3/044* (2013.01); *G06F 3/0481* (2013.01);
(Continued)

(58) Field of Classification Search
CPC ......... G06F 3/0481; G06F 2203/04803; G06F 2203/04805; G06F 3/01; G06F 3/044;
(Continued)

(56) References Cited

U.S. PATENT DOCUMENTS

| 6,686,852 B1 | 2/2004 | Guo |
| 8,271,907 B2 | 9/2012 | Kim et al. |

(Continued)

FOREIGN PATENT DOCUMENTS

| CN | 1344989 A | 4/2002 |
| CN | 1458576 A | 11/2003 |

(Continued)

OTHER PUBLICATIONS

Scavin (Google+), "Official version of Fences published, to keep desktop organized", www.appinn.com/fences-publish/, Oct. 12, 2009.

*Primary Examiner* — Mandrita Brahmachari
(74) *Attorney, Agent, or Firm* — Jeffersno IP Law, LLP

(57) ABSTRACT

A mobile device for executing multiple applications is provided. The mobile device includes a touch screen for displaying a first window where a first application is executed, a second window where a second application different from the first application is executed, and a controller for displaying execution keys for executing the multiple applications, determining whether a simultaneous execution input for the first application and the second application is input or not, and if the simultaneous execution input is input then displaying the first application on the first window and the second application on the second window.

18 Claims, 43 Drawing Sheets

(51) Int. Cl.
*G06F 3/0481* (2013.01)
*G06F 3/0482* (2013.01)
*G06F 3/0484* (2013.01)
*G06F 3/0488* (2013.01)
*G06F 3/0486* (2013.01)
*G09G 5/14* (2006.01)

(52) U.S. Cl.
CPC ......... *G06F 3/0482* (2013.01); *G06F 3/0484* (2013.01); *G06F 3/0486* (2013.01); *G06F 3/0488* (2013.01); *G06F 3/04817* (2013.01); *G06F 2203/04803* (2013.01); *G09G 5/14* (2013.01); *G09G 2340/0464* (2013.01)

(58) Field of Classification Search
CPC .. G06F 3/04817; G06F 3/0482; G06F 3/0484; G06F 3/0486; G06F 3/0488; G09G 5/14; G09G 2340/0464
USPC ....................................................... 715/788
See application file for complete search history.

(56) References Cited

U.S. PATENT DOCUMENTS

| | | |
|---|---|---|
| 2003/0076362 A1 | 4/2003 | Terada |
| 2003/0117440 A1 | 6/2003 | Hellyar et al. |
| 2004/0056903 A1 | 3/2004 | Sakai |
| 2005/0235220 A1 | 10/2005 | Duperrouzel et al. |
| 2006/0097991 A1* | 5/2006 | Hotelling ............... G06F 3/0416 345/173 |
| 2007/0192726 A1 | 8/2007 | Kim et al. |
| 2007/0226636 A1* | 9/2007 | Carpenter ............... G06F 3/048 715/751 |
| 2007/0277124 A1* | 11/2007 | Shin ..................... G06F 3/04883 715/863 |
| 2008/0158189 A1* | 7/2008 | Kim .............................. 345/173 |
| 2008/0172609 A1 | 7/2008 | Rytivaara |
| 2008/0214239 A1 | 9/2008 | Hashimoto et al. |
| 2008/0320396 A1 | 12/2008 | Mizrachi et al. |
| 2009/0307631 A1 | 12/2009 | Kim et al. |
| 2009/0322690 A1 | 12/2009 | Hiltunen et al. |
| 2010/0062811 A1 | 3/2010 | Park et al. |
| 2010/0088634 A1 | 4/2010 | Tsuruta et al. |
| 2010/0122207 A1* | 5/2010 | Kim et al. ..................... 715/788 |
| 2010/0214278 A1 | 8/2010 | Miura |
| 2010/0248788 A1* | 9/2010 | Yook et al. ..................... 455/566 |
| 2010/0259493 A1* | 10/2010 | Chang .................. G06F 3/04883 345/173 |
| 2010/0313154 A1* | 12/2010 | Choi ..................... G06F 3/0219 715/765 |
| 2011/0035691 A1* | 2/2011 | Kim ............................. 715/765 |
| 2011/0148778 A1* | 6/2011 | Yang ....................... G06F 3/045 345/173 |
| 2011/0275391 A1* | 11/2011 | Lee ..................... H04M 1/7253 455/500 |
| 2012/0066630 A1* | 3/2012 | Kim et al. ..................... 715/769 |
| 2012/0176322 A1 | 7/2012 | Karmi et al. |
| 2012/0290966 A1* | 11/2012 | Chae ....................... G09G 5/14 715/778 |
| 2012/0303476 A1 | 11/2012 | Krzyzanowski et al. |
| 2013/0016129 A1* | 1/2013 | Gossweiler, III et al. ... 345/667 |
| 2014/0157142 A1* | 6/2014 | Heinrich et al. .............. 715/744 |
| 2017/0010746 A1 | 1/2017 | Hotelling et al. |

FOREIGN PATENT DOCUMENTS

| | | |
|---|---|---|
| CN | 1942853 A | 4/2007 |
| CN | 101212752 A | 7/2008 |
| CN | 101352057 A | 1/2009 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2008-0087298 A | 10/2008 |
| KR | 10-2009-0016044 A | 2/2009 |
| KR | 10-0900295 B1 | 5/2009 |
| KR | 10-2009-0089201 A | 8/2009 |
| KR | 10-2010-0030968 A | 3/2010 |
| KR | 10-2010-035017 A | 4/2010 |
| KR | 2010-0034608 A | 4/2010 |
| KR | 10-2010-0053823 A | 5/2010 |
| KR | 10-2010-0107377 A | 10/2010 |
| KR | 10-2010-0131724 A | 12/2010 |
| KR | 10-2011-0014040 A | 2/2011 |
| WO | 2008/090902 A1 | 7/2008 |
| WO | 2009/017175 A1 | 2/2009 |
| WO | 2009/028892 A2 | 3/2009 |

* cited by examiner

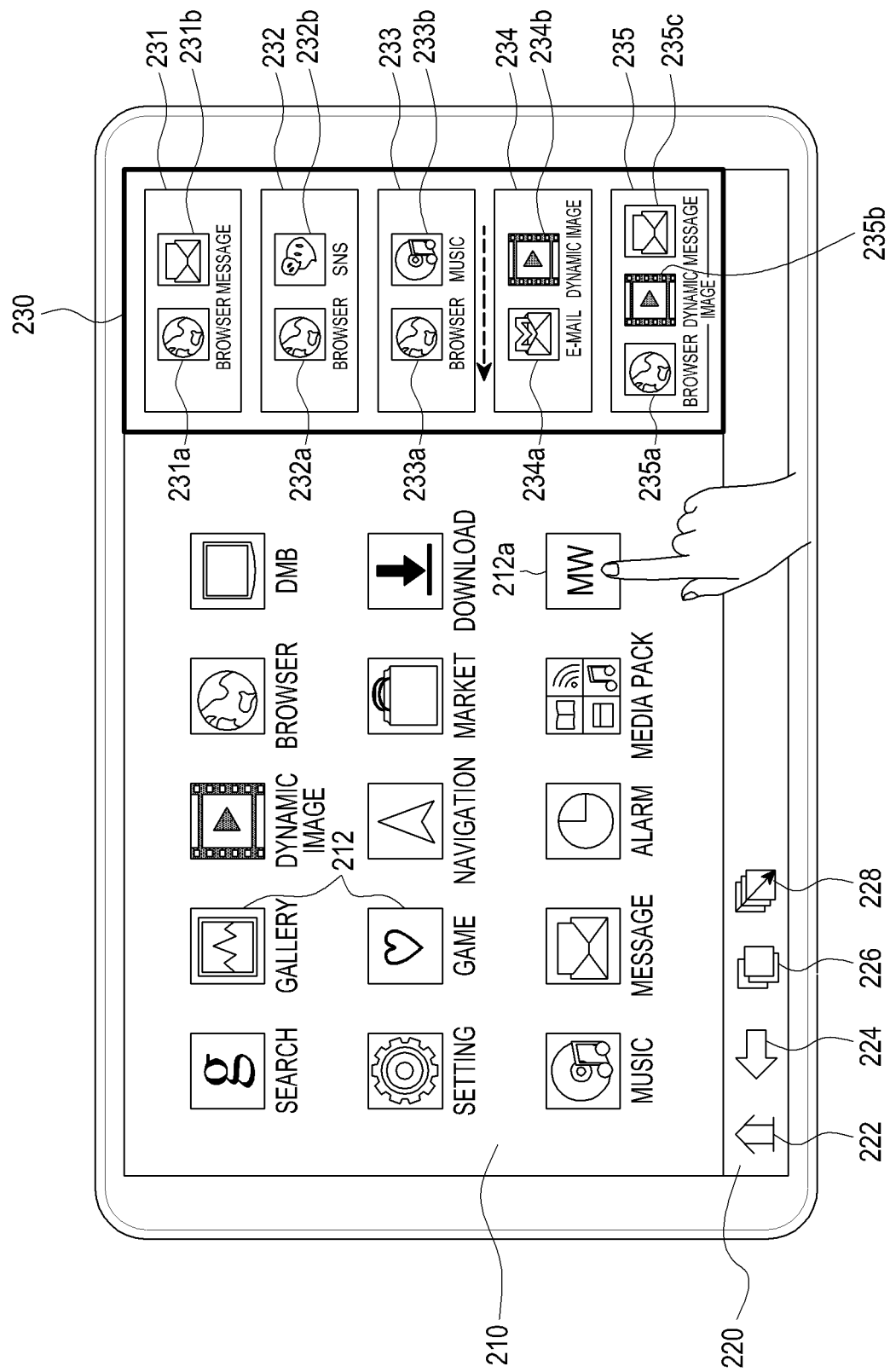

MOBILE DEVICE FOR EXECUTING MULTIPLE APPLICATIONS AND METHOD FOR SAME

PRIORITY

This application claims the benefit under 35 U.S.C. § 119(a) of a Korean patent application filed on Nov. 16, 2011 in the Korean Intellectual Property Office and assigned Serial No. 10-2011-0119879, the entire disclosures of which is hereby incorporated by reference.

BACKGROUND OF THE INVENTION

1. Field of the Invention

The present invention relates to a mobile device for executing multiple applications and a method for using the same. More particularly, the present invention relates to a mobile device for efficiently executing multiple applications by using a user interface implemented by a touch screen and a method for using the same.

2. Description of the Related Art

Recently, as demand for smart phones and tablets is rapidly increasing, research on a user interface method related to a touch screen mounted to the smart phone and the tablet is being actively carried out. Particularly, much research is being done to enable the smart phone and the tablet to provide an intuitive interface method. Accordingly, intuitive interface methods in various modes have been disclosed.

Specifically, most smart phones and tablets have a touch screen, and a method by which a user can more easily and accurately control the touch screen is set as an object of the recent research on the interface method.

Meanwhile, when executing one application, the conventional smart phone or the tablet adopts a configuration of displaying a window for displaying the one application on an entire touch screen. Accordingly, when another application is desired to be executed while one application is executed, the smart phone or the tablet stops displaying the application and should display another application. When the user desires to execute still another application, the user experiences inconvenience in that the user should input a control for shifting the screen to an initial menu screen and input a control for executing still another application again in the menu screen.

Furthermore, when the user multitasks a plurality of applications, the user experiences inconvenience in that the user should continuously input a control for shifting screens between applications, and a problem occurs where a progress result between the applications cannot be easily grasped.

Accordingly, it is desired to develop a configuration for dividing one touch screen and displaying respective applications on the divided touch screens and a method of displaying the applications on the divided touch screens, which is more efficient and in accordance with the user intuition, when a plurality of applications are executed.

Further, since a mobile device is manufactured to have a portable size, a display size and a User Interface (UI) thereof are limited. Accordingly, the user experiences inconvenience in executing a plurality of applications in the mobile device. For example, when one application is executed in the mobile device, the application is displayed on an entire display area. Further, when another application is desired to be executed, the application which is being currently executed is first terminated, and then an execution key for executing the desired another application is selected. That is, in order to execute several applications in the mobile device, execution and termination processes should be repeated. Further, there is no method of simultaneously executing a plurality of applications in the mobile device.

Therefore, a need exists for a system and method for efficiently executing multiple applications by using a user interface implemented by a touch screen and a method for using the same.

SUMMARY OF THE INVENTION

Aspects of the present invention are to address at least the above-mentioned problems and/or disadvantages and to provide at least the advantages described below. Accordingly, an aspect of the present invention is to provide a mobile device and a method thereof for simultaneously executing a plurality of applications.

Another aspect of the present invention is to provide a mobile device and a method thereof for quickly displaying a plurality of applications.

Still another aspect of the present invention is to provide a mobile device and a method thereof for arranging a plurality of applications in one touch screen and efficiently controlling screen sizes of the applications.

Yet another aspect of the present invention is to provide a mobile device and a method thereof by which a plurality of users can use different applications through one mobile device.

Still yet another aspect of the present invention is to provide a configuration for, when a plurality of applications are executed, dividing one touch screen and displaying the applications on the divided touch screens, and a configuration for executing the plurality of applications in accordance with user intuition.

At least one of the above described aspects of the present invention may be achieved by the following components.

In accordance with an aspect of the present invention, a mobile device for executing multiple applications is provided. The mobile device includes a touch screen for displaying a first window where a first application is executed, a second window where a second application different from the first application is executed, and a controller for displaying execution keys for executing the multiple applications, determining whether a simultaneous execution input for the first application and the second application is input or not, and if the simultaneous execution input is input then displaying the first application on the first window and the second application on the second window.

In accordance with an aspect of the present invention, a method for controlling a mobile device having a touch screen for displaying a first window where a first application is executed, a second window where a second application different from the first application is executed is provided. The method comprises displaying an execution keys for executing multiple applications comprising the first application and the second application and determining whether a simultaneous execution input for the first application and the second application is input or not, and if the simultaneous execution input is input then displaying the first application on the first window and the second application on the second window.

According to the present invention, it is possible to quickly execute a plurality of applications by a convenient user interface and also arrange the plurality of applications within a touch screen and efficiently control screen sizes of the applications. Further, according to various exemplary embodiments of the present invention, it is possible to provide, when a plurality of applications are executed, a configuration for dividing one touch screen and displaying the applications on the divided touch screens and a method of executing the plurality of applications in accordance with user intuition.

Accordingly, the user can more easily grasp a progress state between applications in controlling the divided touch screens on which the plurality of applications are displayed. Also, user convenience may be maximized as the plurality of applications can be executed in a simple way through a multi-touch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A to 4C illustrate a multi-application panel according to an exemplary embodiment of the present invention;

DETAILED DESCRIPTION OF EXEMPLARY EMBODIMENTS

Figure 1:
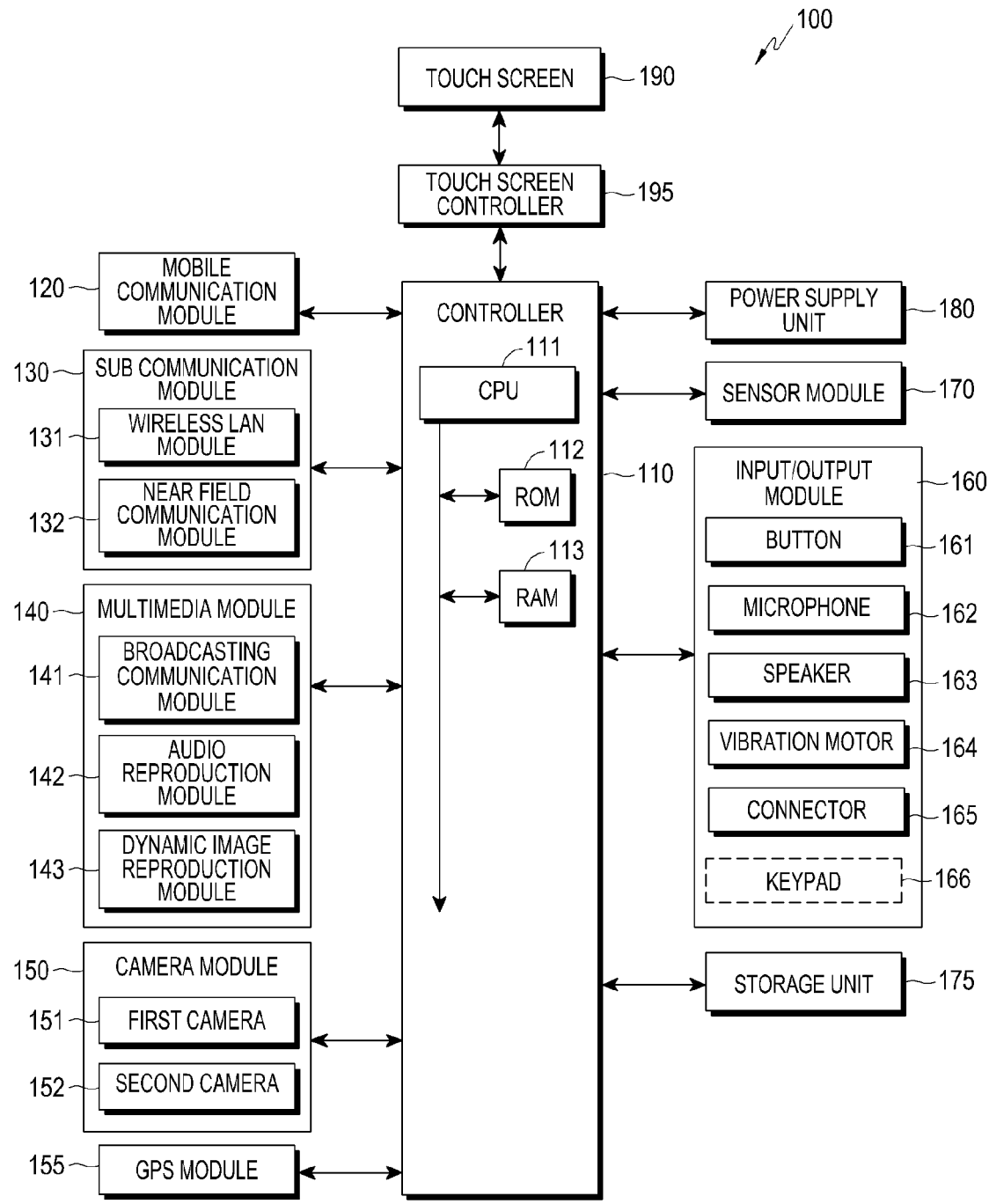
FIG. 1 is a block diagram schematically illustrating a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various illustrative exemplary embodiments will be described in detail with reference to the accompanying drawings. However, the present inventive concept is not limited or restricted by the illustrative exemplary embodiments. Same reference numerals indicated in the drawings are assigned to members performing substantially the same function.

FIG. 1 is a block diagram schematically illustrating a mobile device according to an exemplary embodiment of the present invention.

Referring to FIG. 1, a device 100 may be connected to an external device (not shown) by using a mobile communication module 120, a sub communication module 130, and a connector 165. The "external device" includes another device (not shown), a mobile phone (not shown), a smart phone (not shown), a tablet Personal Computer (PC) (not shown), and a server (not shown).

Referring to FIG. 1, the device 100 includes a touch screen 190 and a touch screen controller 195. The device 100 also includes a controller 110, a mobile communication module 120, a sub communication module 130, a multimedia module 140, a camera module 150, a Global Positioning System (GPS) module 155, an input/output module 160, a sensor module 170, a storage unit 175, and a power supplier or power supply unit 180. The sub communication module 130 includes at least one of a wireless Local Area Network (LAN) module 131 and a near field communication module 132. The multimedia module 140 includes at least one of a broadcasting communication module 141, an audio reproduction module 142, and a dynamic image reproduction module 143. The camera module 150 includes at least one of a first camera 151 and a second camera 152. The input/output module 160 includes at least one of a button 161, a microphone 162, a speaker 163, a vibration motor 164, a connector 165, and a keypad 166. It is noted that the device 100 can include more or less of the above described items. For example, the keypad 166 may be optional.

The controller 110 may include a Central Processing Unit (CPU) 111, a Read-Only Memory (ROM) 112, and a Random Access Memory (RAM) 113, which stores a signal or data input from outside of the device 100 or is used as a storage region for an operation performed by the device 100. The CPU 111 may include a single core, a dual core, a triple core, or a quad core, but is not limited thereto. The CPU 111 the ROM 112, and the RAM 113 may be connected to each other through an internal bus.

The controller 110 can control the mobile communication module 120, the sub communication module 130, the multimedia module 140, the camera module 150, the GPS module 155, the input/output module 160, the sensor module 170, the storage unit 175, the power supplier 180, a first touch screen 190a, a second touch screen 190b, and the touch screen controller 195

The mobile communication module 120 connects the device 100 with the external device through mobile communication by using one antenna or a plurality of antennas (not shown) according to a control of the controller 110. The mobile communication module 120 transmits/receives a wireless signal for performing voice phone communication, video phone communication, a Short Message Service (SMS), or a Multimedia Messaging Service (MMS).

The sub communication module 130 may include at least one of the wireless LAN module 131 and the near field communication module 132. For example, the sub communication module 130 may include only the wireless LAN module 131 or include both the wireless LAN module 131 and the near field communication module 132.

The wireless LAN communication module 131 may be connected to an Internet according to a control of the controller 110 in a place where a wireless Access Point (AP) (not shown) is installed. The wireless LAN communication module 131 supports wireless LAN standard IEEE802.11x of Institute of Electrical and Electronics Engineers (IEEE). The near field communication module 132 can wirelessly perform near field communication between the device 100 and an image forming device (not shown) according to a control of the controller 110. A near field communication mode may include BLUETOOTH (i.e., short distance network), Infrared Data Association (IrDA) and the like.

The device 100 may include at least one of the mobile communication module 120, the wireless LAN module 131, and the near field communication module 132 according to its capability. For example, the device 100 may include a combination of the mobile communication module 120, the wireless LAN module 131, and the near field communication module 132 according to its capability.

The multimedia module 140 may include the broadcasting communication module 141, the audio reproduction module 142, or the dynamic image reproduction module 143. The broadcasting communication module 141 can receive a broadcasting signal (for example, TeleVision (TV) broadcasting signal, radio broadcasting signal, or data broadcasting signal) and broadcasting additional information (for example, Electric Program Guide (EPS) or Electric Service Guide (ESG)) broadcast from a broadcasting station through a broadcasting communication antenna (not shown) according to a control of the controller 110. The audio reproduction module 142 can reproduce a digital audio file (for example, file having a filename extension of mp3, wma, ogg, or way) stored or received according to a control of the controller 110. The dynamic image reproduction module 143 can reproduce a digital dynamic image file (for example, file having a filename extension of mpeg, mpg, mp4, avi, mov, or mkv) stored or received according to a control of the controller 110. The dynamic image module 143 can reproduce the digital audio file.

The multimedia module 140 may include the audio reproduction module 142 and the dynamic reproduction module 143 except for the broadcasting communication module 141. Also, the audio reproduction module 142 and the dynamic reproduction module 143 of the multimedia module 140 may be included in the controller 110.

The camera module 150 may include at least one of the first camera 151 and the second camera 152 for photographing a still image or a dynamic image according to a control of the controller 110. Further, the first camera 151 or the second camera 152 may include an auxiliary light source (for example, flash (not shown)) for providing a light used for the photographing. The first camera 151 may be disposed on a front surface of the device 100, and the second camera 152 may be disposed on a back surface of the device 100. In a different way, the first camera 151 and the second camera 152 are adjacently disposed to each other (for example, an interval between the first camera 151 and the second camera 152 is larger than 1 cm and smaller than 8 cm) to photograph a three-dimensional still image or a three dimensional dynamic image.

The GPS module 155 can receive radio waves from a plurality of GPS satellites (not shown) in Earth orbit and calculate a position of the device 100 by using Time of Arrival from the GPS satellite (not shown) to the device 100.

The input/output module 160 may include at least one of the plurality of buttons 161, the microphone 162, the speaker 163, the vibration motor 164, the connector 165, and the keypad 166.

The buttons 161 may be formed in a front surface, a side surface, or a back surface of the housing of the device 100, and may include at least one of a power/lock button (not shown), a volume button (not shown), a menu button, a home button, a back button, and a search button 161.

The microphone 162 receives voice or sounds and generates an electrical signal according to a control of the controller 110.

The speaker 163 can output sounds corresponding to various signals (for example, wireless signal, broadcasting signal, digital audio file, digital dynamic image file, photographing a picture or the like) of the mobile communication module 120, the sub communication module 130, the multimedia module 140, or the camera module 150 to an outside of the device 100. The speaker 163 can output sounds corresponding to functions (for example, a button control sound or a ring back tone corresponding to phone communication) performed by the device 100. The single speaker or the plurality of speakers 163 may be formed in a proper position or positions of the housing.

The vibration motor 164 can convert an electrical signal to a mechanical vibration according to a control of the controller 110. For example, when the device 100 in a vibration mode receives voice phone communication from another device (not shown), the vibration motor 164 operates. The signal vibration motor or the plurality of vibration motors 164 may be formed within the housing of the device 100. The vibration motor 164 may operate in response to a touch action of the user on the touch screen 190 and successive motions of touches on the touch screen 190.

The connector 165 may be used as an interface for connecting the device 100 with an external device (not shown) or a power source (not shown). The connector 165 can transmit data stored in the storage unit 175 of the device 100 to the external device (not shown) through a wired cable connected to the connector 165 or receive the data from the external device (not shown) according to a control of the controller 110. Power is input or a battery (not shown) is charged from the power source (not shown) through the wired cable connected to the connector 165

The keypad 166 can receive a key input from the user to control the device 100. The keypad 166 includes a physical keypad (not shown) formed in the device 100 or a virtual keypad (not shown) displayed on the touch screen 190. The physical keypad (not shown) formed in the device may be omitted according to a capability or a structure of the device 100.

The sensor module 170 includes at least one sensor for detecting a state of the device 100. For example, the sensor module 170 may include a proximity sensor for detecting whether the user is close to the device 100, an illumination sensor (not shown) for detecting an amount of light adjacent to the device 100, or a motion sensor (not shown) for detecting an operation of the device 100 (for example, rotation of the device 100, or an acceleration or vibration applied to the device 100). At least one sensor can detect the state, generate a signal corresponding to the detection, and transmit the generated signal to the controller 110. The sensor of the sensor module 170 may be added or omitted according to a capability of the device 100.

The storage unit 175 can store signals or data input/output in accordance with operations of the mobile communication module 120, the sub communication module 130, the multimedia module 140, the camera module 150, the GPS module 155, the input/output module 160, the sensor module 170, and the touch screen 190 according to a control of the controller 110. The storage unit 175 can store a control program and applications for controlling the controller 110.

The term "storage unit" includes a memory card (not shown) (for example SD card or memory stick) mounted to the storage unit 175, the ROM 112 or the RAM 113 within the controller 110, or the device 100. The storage unit may include a nonvolatile memory, a volatile memory, a Hard Disk Drive (HDD), or a Solid State Drive (SSD).

The power supplier 180 can supply power to one battery or a plurality of batteries (not shown) disposed in the housing of the device 100 according to a control of the controller 110. The one battery or the plurality of batteries (not shown) supply power to the device 100. Further, the power supplier 180 can supply power input from an external power source (not shown) through the wired cable connected to the connector 165 to the device 100.

The touch screen 190 can provide a user interface corresponding to various services (for example, phone communication, data transmission, broadcasting, and photographing a picture) to the user. The touch screen 190 can transmit an analog signal corresponding to at least one touch input to the user interface to the touch screen controller 195. The touch screen 190 can receive at least one touch through a body part of the user (for example, fingers including a thumb) or a touchable input means. Also, the touch screen 190 can receive successive motions of one touch among at least one touch. The touch screen 190 can transmit an analog signal corresponding to the successive motions of the input touch to the touch screen controller 195.

The touch according to an exemplary embodiment is not limited to touches between the touch screen 190 and the body part of the user or the touchable input, but may include non-touches (for example, a case where a detectable interval between the touch screen 190 and the body part of the user or the touchable input is equal to or smaller than 1 mm). The detectable interval of the touch screen 190 may be changed according to a capability of a structure of the device 100.

The touch screen 190 may be implemented in, for example, a resistive type, a capacitive type, an infrared type, or an acoustic wave type.

The touch screen controller 195 converts the analog signal received from the touch screen 190 to a digital signal (for example, X and Y coordinate) and transmits the digital signal to the controller 110. The controller 110 can control the touch screen 190 by using the digital signal received from the touch screen controller 195. For example, the controller 110 can allow a shortcut icon (not shown) displayed on the touch screen 190 to be selected or execute the shortcut icon in response to the touch. Further, the touch screen controller 195 may be included in the controller 110.

Figure 2:
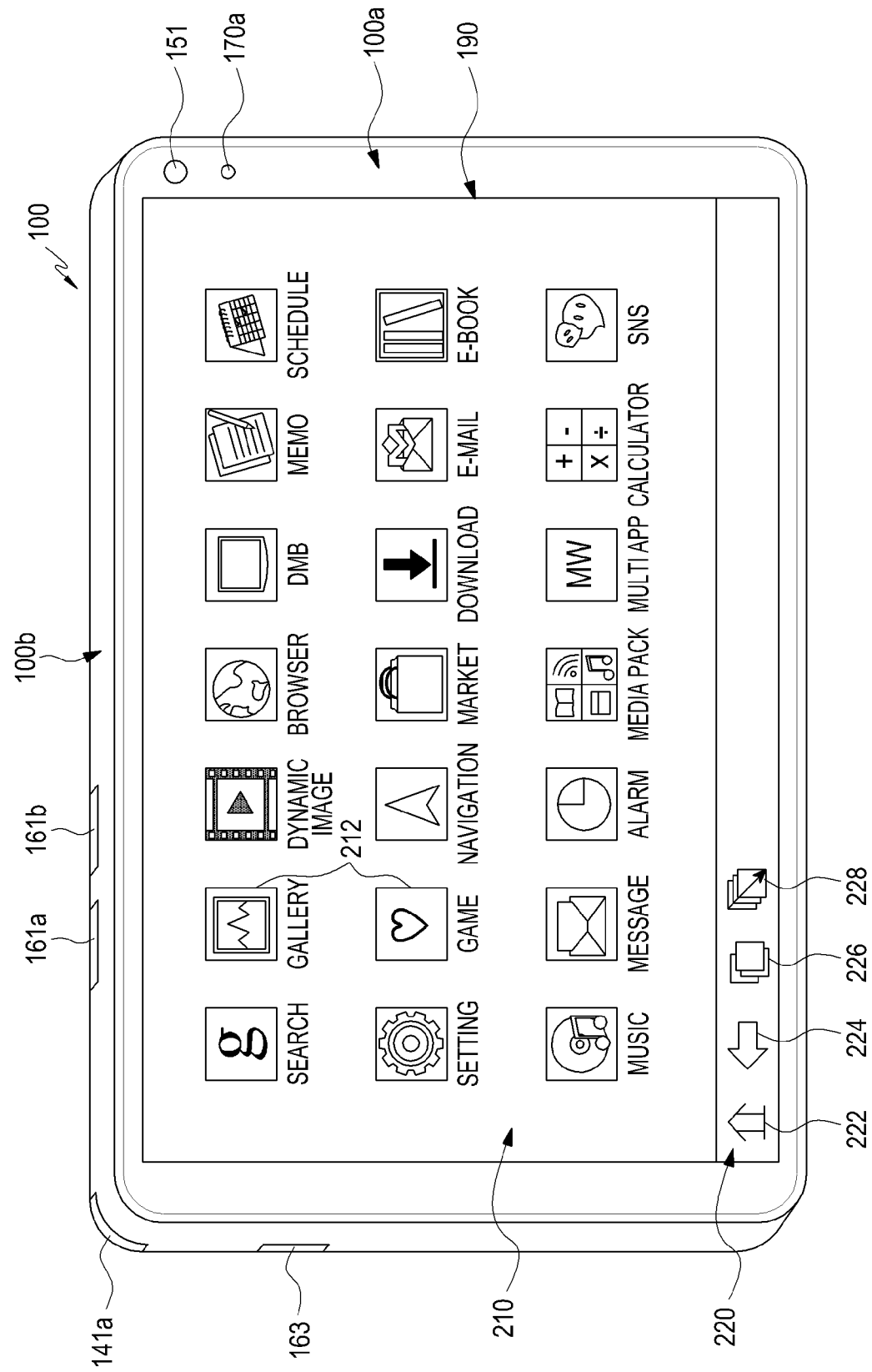
FIG. 2 is a perspective view of a mobile device according to an exemplary embodiment of the present invention.

FIG. 2 is a perspective view of the mobile device according to an exemplary embodiment of the present invention.

Referring to FIG. 2, the touch screen 190 is disposed in a center of a front surface 100a of the device 100. The touch screen 190 has a large size to almost cover the front surface 100a of the device 100. The first camera 151 and the illumination sensor 170a may be disposed in an edge of the front surface 100a of the device 100. For example, a power/reset button 161a, a volume button 161b, the speaker 163, a terrestrial Digital Multimedia Broadcasting (DMB) antenna 141a, the microphone (not shown), the connector (not shown) and the like may be disposed on the side surface 100b of the device 100, and the second camera (not shown) may be disposed on the back surface (not shown) of the device 100.

The touch screen 190 includes a main screen 210 and a lower bar 220. In FIG. 2, the device 100 and the touch screen 190 have a horizontal length larger than a vertical length. In this case, it is defined that the touch screen 190 is horizontally arranged.

The main screen 210 is an area where one application or a plurality of applications is executed. FIG. 2 shows an example where a home screen is displayed on the touch screen. 190. The home screen is a first screen displayed on the touch screen 190 when the device 100 is turned on. Execution keys 212 for executing a plurality of applications stored in the device 100 are arranged in the home screen in a row and a column. The execution keys 212 may be formed in icons, buttons, texts or the like. When each execution key 212 is touched, an application corresponding to the touch execution key 212 is executed and then displayed on the main screen 210.

The lower bar 220 is displayed in a horizontal direction in a lower end of the touch screen 190 and includes standard function buttons 222 to 228.

A home screen motion button 222 displays the home screen on the main screen 210. For example, when the home screen motion key 222 is touched in the main screen while applications are executed, the home screen is displayed on the main screen 210 as illustrated in FIG. 2.

A back button 224 may display a screen executed just before a currently executed screen or terminate an application most recently used.

A multi view mode button 226 displays a plurality of applications on the main screen 210 according to an exemplary embodiment. For example, when the multi view mode button 226 is touched, the controller 110 may display a multi application panel on the main screen 210 and may simultaneously execute and display a plurality of applications selected through the multi application panel. Also, the multi view mode button 226 can switch and display a single view mode and a multi view mode. In the single view mode, the controller 110 is executing the plurality of applications within the controller 100, but may display only a single window in an entirety of the main screen 210. The single window displayed on the entirety of the main screen 210 may be, for example, a window corresponding to the application most recently executed among the plurality of applications being executed within the controller 110. On the other hand, in the multi view mode, the controller 110 executes the plurality of applications, and simultaneously displays a plurality of windows corresponding to the plurality of applications on the main screen 210. Accordingly, only one window may be displayed on the entirety of the main screen 100 in the single view mode, but a plurality of windows may be displayed on the main screen 100 in the multi view mode.

Meanwhile, the multi view mode may be set through a screen environment setting by the user, and may be operated by providing a multi view launcher in a separate type of application. When the screen is set in the multi view mode or the multi view launcher is operated, the controller 110 can provide all of the executed applications to the main screen 210 of the touch screen 160 in the multi view mode.

A mode switching button 228 switches modes of a plurality of currently executed applications to different multi view modes on the main screen 210 and displays the applications. For example, when the mode switching button 228 is touched, a switching between an overlap mode for partially overlappingly displaying the plurality of applications and a split mode for divisibly displaying the plurality of applications on different area in the main screen 220 of the device 100 may be performed.

Further, an upper bar (not shown) for displaying a charging state of the battery, an intensity of a received signal, and a state of the device 100 such as a current time may be formed in an upper end of the touch screen 190.

Meanwhile, the lower bar 220 and the upper bar (not shown) may be omitted on the touch screen 190 according to an Operating System (OS) of the device 100 or an application executed in the device 100. When both the lower bar 220 and the upper bar (not shown) are not displayed on the touch screen 190, the main screen 210 may be formed on an entire area of the touch screen 190. Further, the lower bar 220 and the upper bar (not shown) may be translucently displayed on the main screen 210 overlapping each other.

Figure 3:
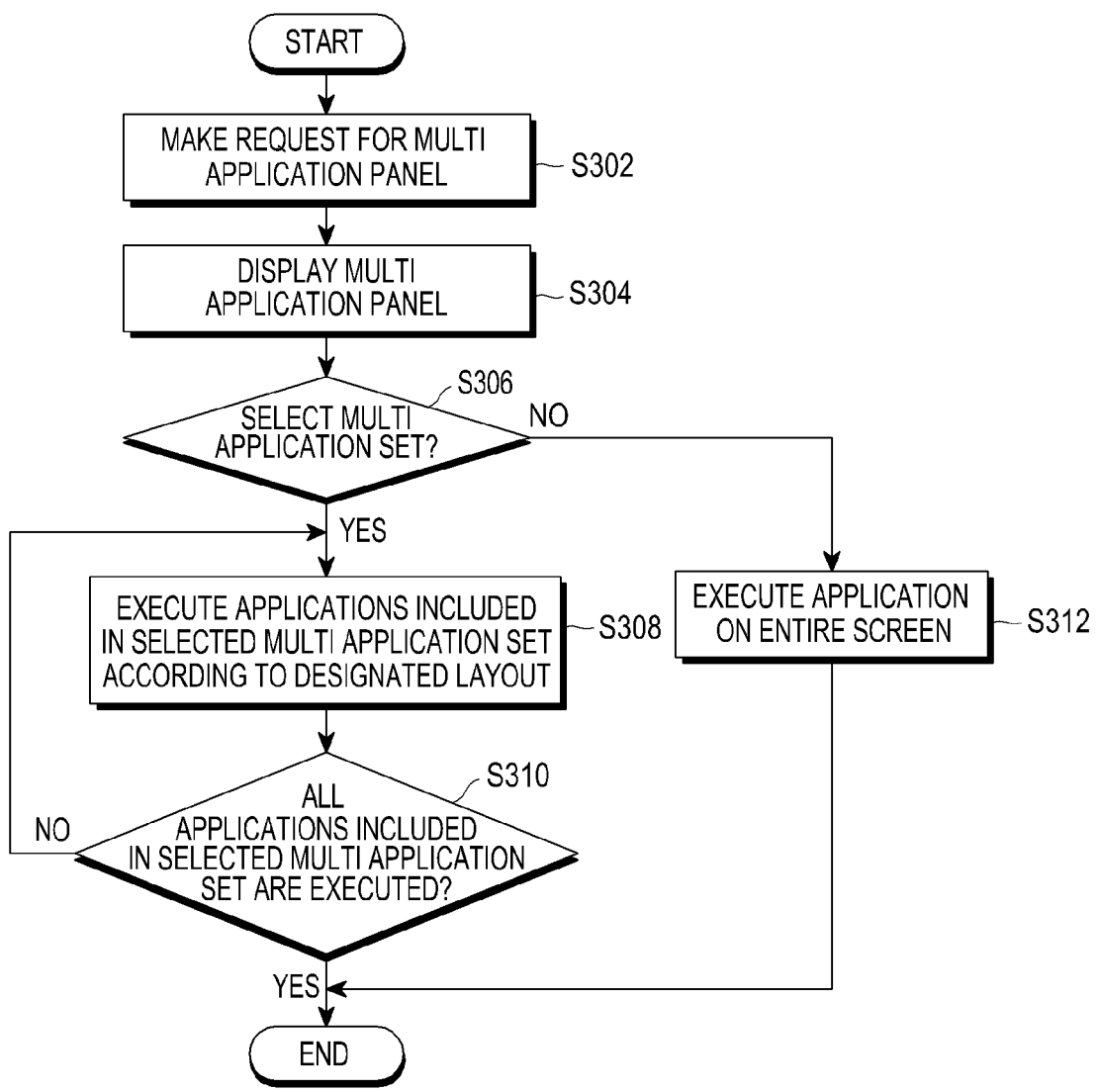
FIG. 3 is a flowchart schematically illustrating a method of executing multiple applications according to an exemplary embodiment of the present invention.

FIG. 3 is a flowchart schematically illustrating a method of executing multiple applications according to an exemplary embodiment of the present invention.

Referring to FIG. 3, the user makes a request for the multi application panel by touching a predetermined position on the touch screen 190 in step S302. The controller 110 can detect a touch for the request for the multi application panel by using the touch screen 190 and the touch screen controller 195. When there is the request for the multi application panel, the controller 110 displays the multi application panel on the touch screen 190 in step S304.

Figure 4A:
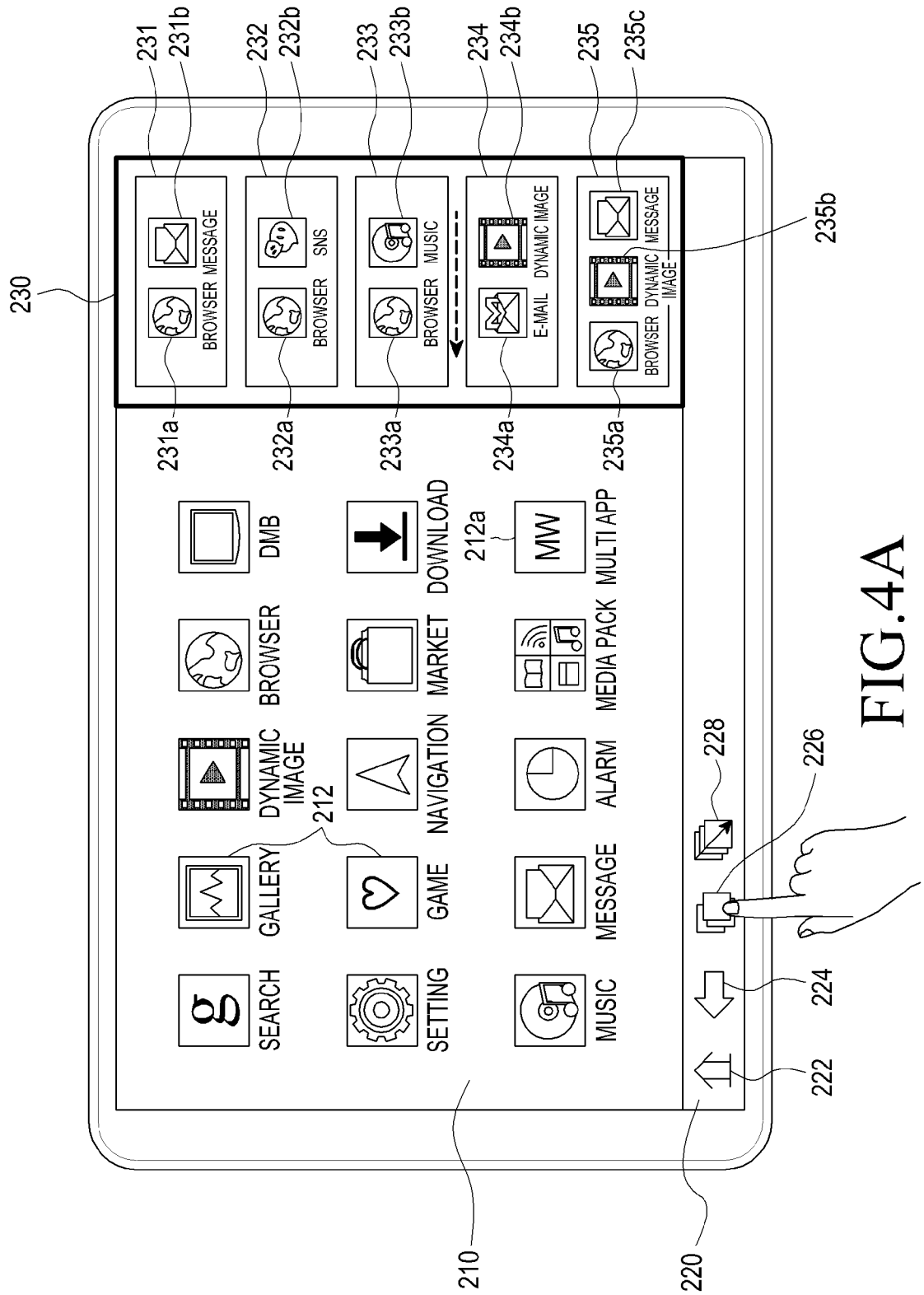
Figure 4C:
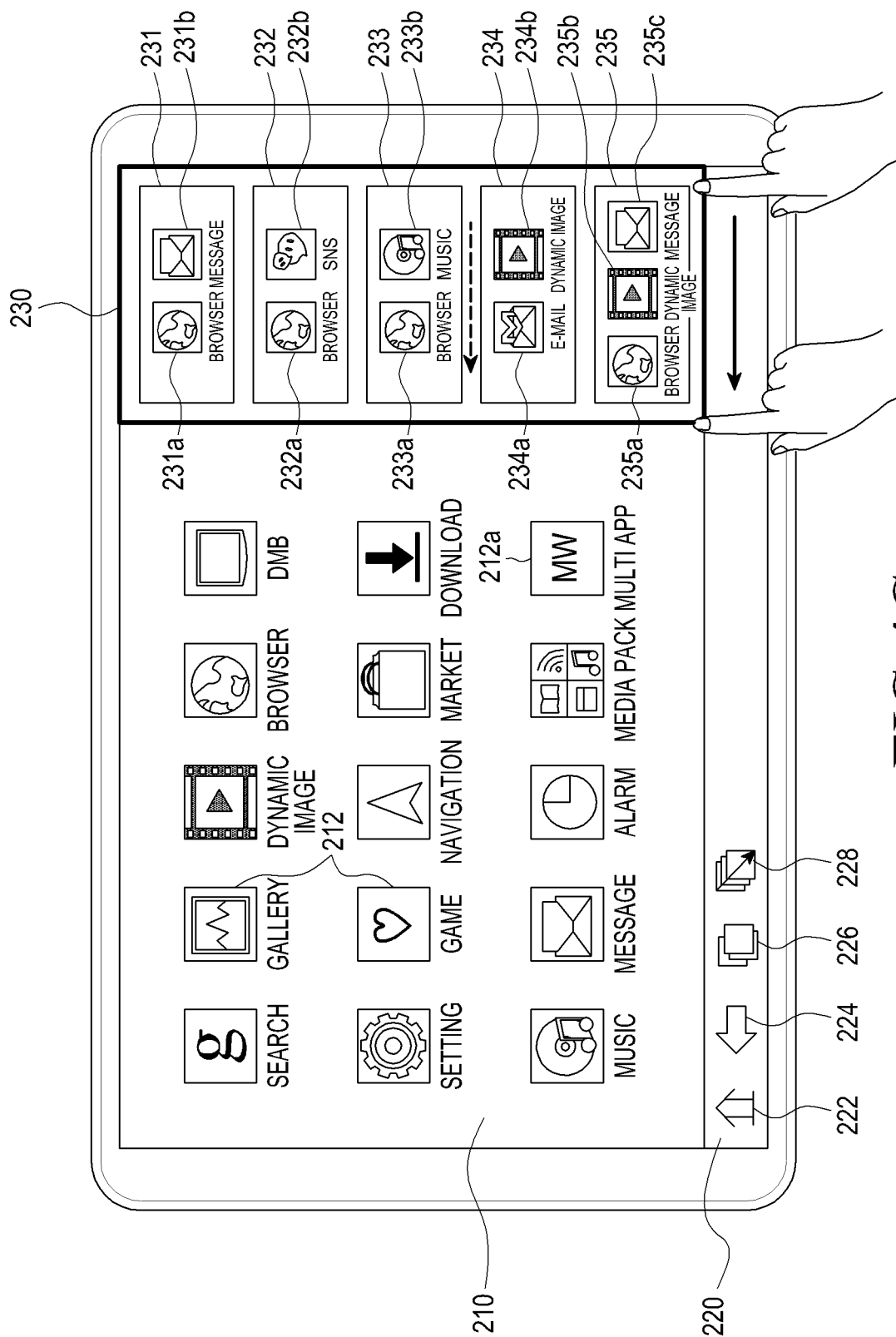

FIGS. 4A to 4C illustrate a multi-application panel according to an exemplary embodiment of the present invention.

Referring to FIG. 4A, when the user touches the multi view mode button 226 on the touch screen 190, the controller 110 detects the touch and vertically displays the multi application panel 230 in a predetermined position of the main screen 210, for example, a right part of the main screen 210. Further, when the plurality execution keys 212 formed on the main screen 210 include an execution key 212a for displaying the multi application panel 230 as illustrated in FIG. 4B, if the execution key 212a is touched, the multi application panel 230 is displayed in a right part of the main screen 210. In addition, when successive motions of one touch are detected within a predetermined distance in a direction from a right edge to a center of the main screen 210 as illustrated in FIG. 4C, the multi application panel 230 may be displayed while sliding in the direction from a right edge to a center of the main screen 210 according to the motions of the touch. Here, the successive motions of one touch refer to motions continuously maintaining the touch on the touch screen 190. For example, the successive motions of one touch may be a swipe gesture in which one finger horizontally or vertically moves within a predetermined distance in a state where the one finger touches the touch screen 190. The multi application panel 230 is displayed in the right part of the main screen 210 in FIGS. 4A to 4C, but the display position may be changed.

The multi application panel 230 includes a plurality of multi application sets 231, 232, 233, 234, and 235. Each of the multi application sets 231, 232, 233, 234, and 235 includes predetermined one main application and at least one sub application. The main application and the sub application are applications initially provided by a manufacturer of the device 100, and may be set from one of a web browser application for accessing an Internet to search for information, a message application for transmitting a Short Message Service (SMS) or a Multimedia Messaging Service (MMS), a music application for reproducing music, an e-mail application for transmitting/receiving an e-mail, and a dynamic image application for reproducing an dynamic image (or video). The setting may be changed by the user in the future. The Social Network Service (SNS) application is a service program for building personal connections online, which may integratively manage a text message stored in the device 100 and an e-mail, and is an application by which the user of the device 100 communicates with another person or shares and searches for information online. The SNS application may include, for example, KAKAO TALK®, TWITTER®, FACEBOOK®, MYSPACE® (i.e., SNS), Me2Day® and the like.

The applications (that is, web browser, message, SNS, music, e-mail, and dynamic image applications) initially provided to the multi application sets 231, 232, 233, 234, and 235 may be predetermined as follows.

According to research results of applications most frequently used by the user of the mobile device 100 performed by various research organizations, applications such as a web browser, a dynamic image, an SNS, an e-mail, a message, music, an E-book, a game, and a telephone are most frequently used in common.

Based on the research results, the user preference application sets 231 to 235 according to an exemplary embodiment include the web browser, dynamic image, SNS, e-mail, and music applications as basic applications.

Accordingly, the multi application sets 231, 232, 233, 234, and 235 may consist of combinations of the first application and the second application as shown in Table 1 below.

TABLE 1

| Multi application set | first application | second application |
| --- | --- | --- |
| Two-stored structure | Web browser | Dynamic image (or video) |
|  | Web browser | SNS |
|  | Web browser | Music |

TABLE 1-continued

| Multi application set | first application | second application | |
| --- | --- | --- | --- |
|  | Web browser | Message | |
|  | Dynamic image (or video) | SNS | |
|  | Dynamic image (or video) | E-mail | |
|  | Dynamic image (or video) | Message | |
|  | SNS | E-mail | |
|  | SNS | E-book | |
|  | E-mail | Message | |
| Three-stored structure | Web browser | Dynamic image (or video) | Message |
|  | Web browser | Music | E-mail |
|  | Web browser | E-mail | SNS |
|  | Web browser | Music | SNS |
|  | Dynamic image (or video) | E-mail | SNS |

For example, the first multi application set 231 may include the web browser application 231a and the message application 231b. The second multi application set may include a web browser application 232a and an SNS application 232b. The third multi application set 233 may include a web browser application 233a and a music application 233b. The fourth multi application set 234 may include an e-mail application 234a and a dynamic image (or video) application 234b. The fifth multi application set 235 may include a web browser application 235a, a dynamic image (or video) application 235b, and a message application 235c.

However, the game application and the telephone application are excluded from the basic application initially provided to the multi application sets 231, 232, 233, 234, and 235. It is because types of applications are very diverse and preferred game applications are different for each user. Further, the telephone application is relatively infrequently used with other applications at the same time. However, the user can change applications included in the multi application sets 231, 232, 233, 234, and 235 according to the user preference.

Here, the applications included in the multi application sets 231, 232, 233, 234, and 235 are programs independently implemented by manufacturers of the device 100 or application developers. Accordingly, for execution of one application, another application is not required to be executed in advance. Further, even though one application is terminated, another application may be continuously executed.

Therefore, according to an exemplary embodiment, the user can freely configure the multi application sets 231, 232, 233, 234, and 235 preferred by the user by using applications already installed in the device 100 when the user purchases the device 100 or downloaded from an Internet application sale site after the device 100 is purchased, and there is an advantage in that the types of multi application sets 231, 232, 233, 234, and 235 have no limitation.

As described above, the applications included in the multi application sets 231, 232, 233, 234, and 235 are distinguished from a complex function application corresponding to one application (for example, dynamic image application) to which some functions (memo function and message transmission/reception function) provided by other applications are added, in that the applications included in the multi application sets 231, 232, 233, 234, and 235 are programs independently implemented from each other. However, the complex function application is a single application newly manufactured to have various functions, and is different from conventional applications. Accordingly, the complex function applications do not provide various functions unlike the conventional applications and provide only limited functions, and the user has a burden to separately purchase the new complex function application.

In step S306 of FIG. 3, the controller 110 determines whether one of the plurality of application sets 231, 232, 233, 234, and 235 displayed in the multi application panel 230 is touched. The user can select a plurality of applications which the user desires to execute, by touching one of the plurality of displayed multi application sets 231, 232, 233, 234, and 235.

As a result of the determination in step S306, when one of the plurality of displayed multi application sets 231, 232, 233, 234, and 235 is selected, the controller 110 simultaneously executes a plurality of applications included in the selected multi application set and displays the plurality of applications on the touch screen 190 according to a predetermined layout in step S308. Step S308 is repeated until all the applications included in the selected multi application set are executed in step S310.

Figure 5A:
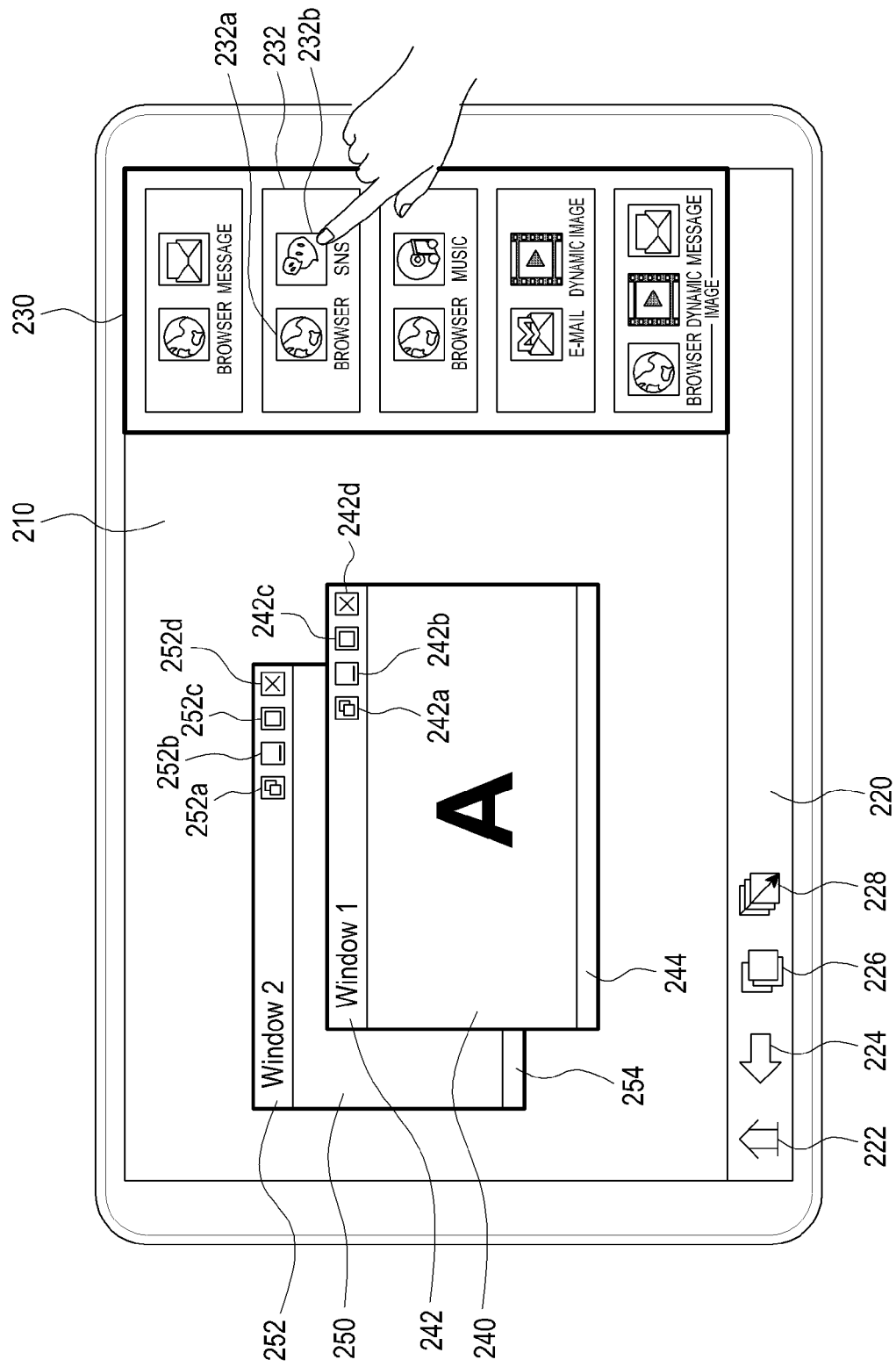
FIGS. 5A and 5B are diagrams for describing a layout displaying a plurality of applications according to an exemplary embodiment of the present invention.
Figure 5B:
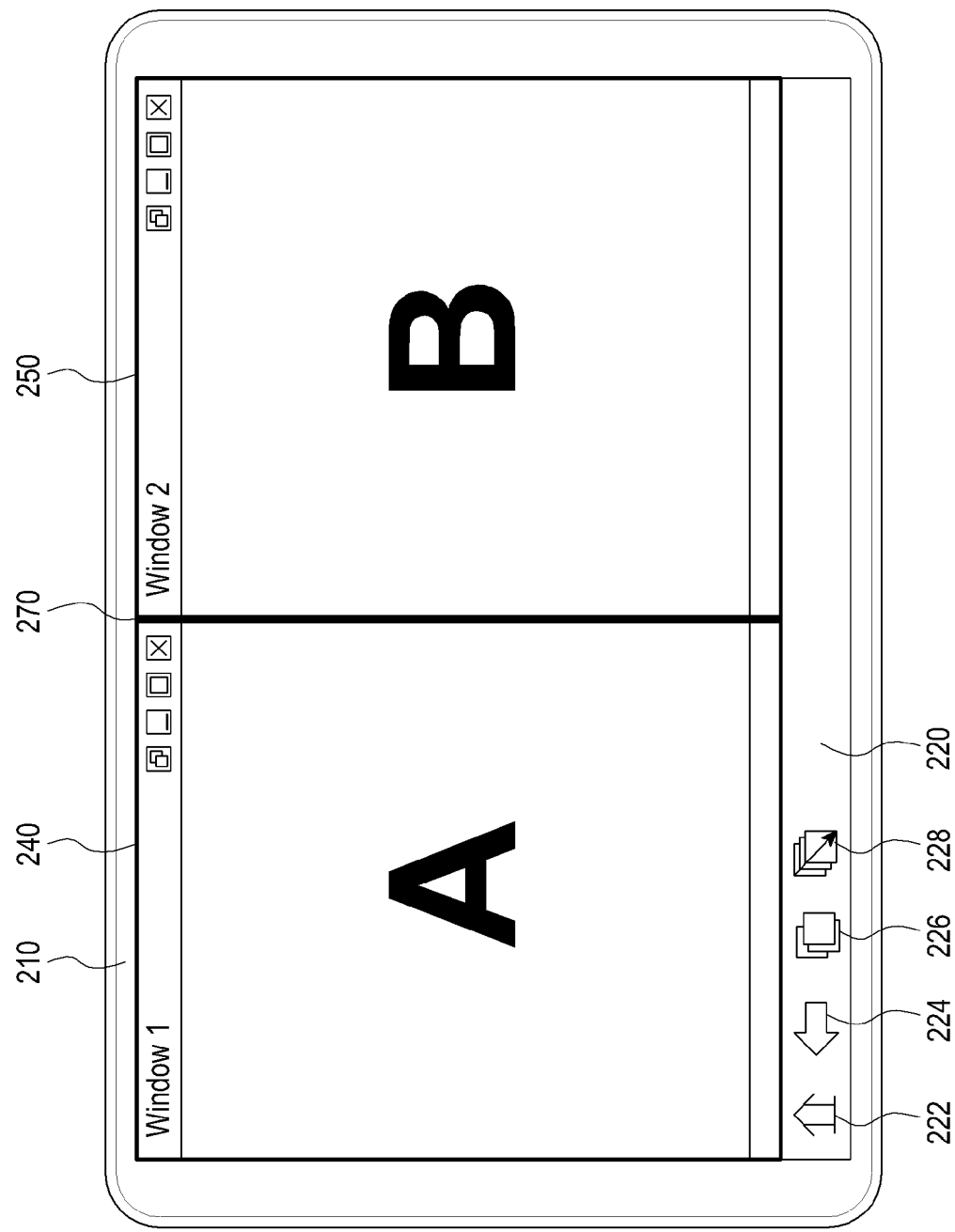

FIGS. 5A and 5B are diagrams for describing a layout displaying a plurality of applications according to an exemplary embodiment of the present invention.

Referring to FIG. 5A, for example, when the user touches the second multi application set 232 in the multi application panel 230, the controller 110 simultaneously executes the plurality of applications 232a and 232b included in the second multi application set 232 and displays the applications 232a and 232b on the main screen 210 according to a predetermined layout. Here, the simultaneous execution of the plurality of applications represents executing all of the plurality of applications within the device 100 by a single gesture touching the area where the second multi application set 232 is displayed. The execution is different from executing and displaying only one application by a single gesture of the user in the conventional mobile device. Further, the execution is different from repeating similar operations by the number of times corresponding to the number of applications which the user desires to execute, like the case where when it is desired to execute, for example, two applications in a conventional desktop computer, an execution key for executing a first application is first selected and the first application is executed, and then an execution key for executing a second applications is selected.

That is, according to an exemplary embodiment, it is possible to quickly execute and display a plurality of applications on a small screen of the mobile device 100 by a minimum gesture of the user.

FIG. 5A illustrates an example where two applications 232a and 232b are displayed on the main screen 210 in an overlap mode. The first application 232a is executed and displayed within a first window 240, and the second application 232b is executed and displayed within a second window 250. The second window 250 is displayed in a lower layer than the first window 240 in the overlap mode. For example, as illustrated in FIG. 5A, the second window 150 may be displayed below the first window 240 in an upper right end of the first window 240. The first application 232a is a main application, and the second application 232b is a sub application associated with the first application 232a.

The first window 240 substantially has a rectangular shape including top, bottom, left, and right sides, and the first application 232a is executed within the first window 240. A title bar 242 is formed in an upper end of the first window 240, and an operation display bar 244 is formed in a lower end. A title of the first application 232a (for example, web browser) executed in the first window 240 is displayed in the title bar 242. A button 242a for a basic size, a minimization button 242b, and a maximization button 242c with respect to a size of the first window 240, and a button 242d for terminating the first window 240 are sequentially formed in the title bar 242. The operation display bar 244 may display an execution state of the first application 232a. However, the title bar 242 and the operation display bar 244 may be omitted.

The second window 250 substantially has a rectangular shape including top, bottom, left, and right sides, and the second application 232b is executed within the second window 250. The title bar 252 is formed in an upper end of the second window 250, and the operation display bar is formed in a lower end of the second window 250. A title of the second application 232b (for example, message) executed in the second window 250 is displayed in the title bar 252. A button 252a for a basic size, a minimization button 252b, and a maximization button 252c with respect to a size of the second window 250, and a button 252d for terminating the second window 250 are sequentially formed in the title bar 252. The operation display bar 254 may display an execution state of the second application 232b. However, the title bar 252 and the operation display bar 254 may be omitted.

A plurality of objects related to respective applications 232a and 232b are displayed in respective windows 240 and 250. The objects may be formed in various types such as a text, a figure, an icon, a button, a check box, a picture, a dynamic image, a web, a map and the like. When the user touches the object, a function or an event predetermined for the object may be performed in a corresponding application. The object may be called a view according to an operating system.

FIG. 5B illustrates an example where two applications 232a and 232b are displayed on the main screen 210 in the split mode. When the user touches the second multi application set 232 in the multi application panel 230, the controller 110 simultaneously executes a plurality of applications 232a and 232b included in the second multi application set 232 and displays the applications on the main screen 210 in the split mode.

In the split mode, the first window 240 and the second window 250 may be displayed not to overlap each other on the main screen 210. For example, as illustrated in FIG. 5B, in a state where the main screen 210 is divided in half, the first window 240 may be displayed in a left half side of the main screen 210 and the second window 250 may be displayed in a right half side of the main screen 210. The first window 240 and the second window 250 are arranged adjacently to each other while sharing a common boundary line 270, but do not overlap. The common boundary line 270 is interposed between the first window 240 and the second window 250.

Further, when the mode switching button 228 is touched in a state where the two windows 240 and 250 are arranged in the overlap mode as illustrated in FIG. 5A, the controller 110 detects the touch to switch the two windows 240 and 250 to the split mode as illustrated in FIG. 5B. In contrast, when the mode switching button 228 is touched in a state where the two windows 240 and 250 are arranged in the split mode as illustrated in FIG. 5B, the controller 110 detects the touch to switch the two windows 240 and 250 to the overlap mode as illustrated in FIG. 5A.

In addition, when the multi view mode button 226 is touched in a state where the plurality of windows 240 and 250 are displayed on the main screen 210 in the multi view mode as illustrated in FIG. 5A or 5B, the controller 110 detects the touch to display only the first window 240 on an entirety of the main screen 210 in the single view mode. In contrast, when the multi view mode button 226 is touched again in the state where only the first window 240 is displayed on the entirety of the main screen 210 in the single view mode, the controller 110 detects the touch to display the plurality of windows 240 and 250 on the main screen 210 in the multi view mode.

Referring to FIG. 3, as a result of the determination in step S306, when a predetermined time (for example, 2 to 3 seconds) passes without selecting one of the user preference application sets 231, 232, 233, 234, and 235, the controller 110 determines that simultaneous execution of the plurality of applications and a multi view function are not performed in step S312. In this case, the controller 110 displays a window of an application which is most recently executed in the device 100 on the entirety of the main screen 210. Accordingly, only one window is displayed on the main screen 210.

Figure 6A:
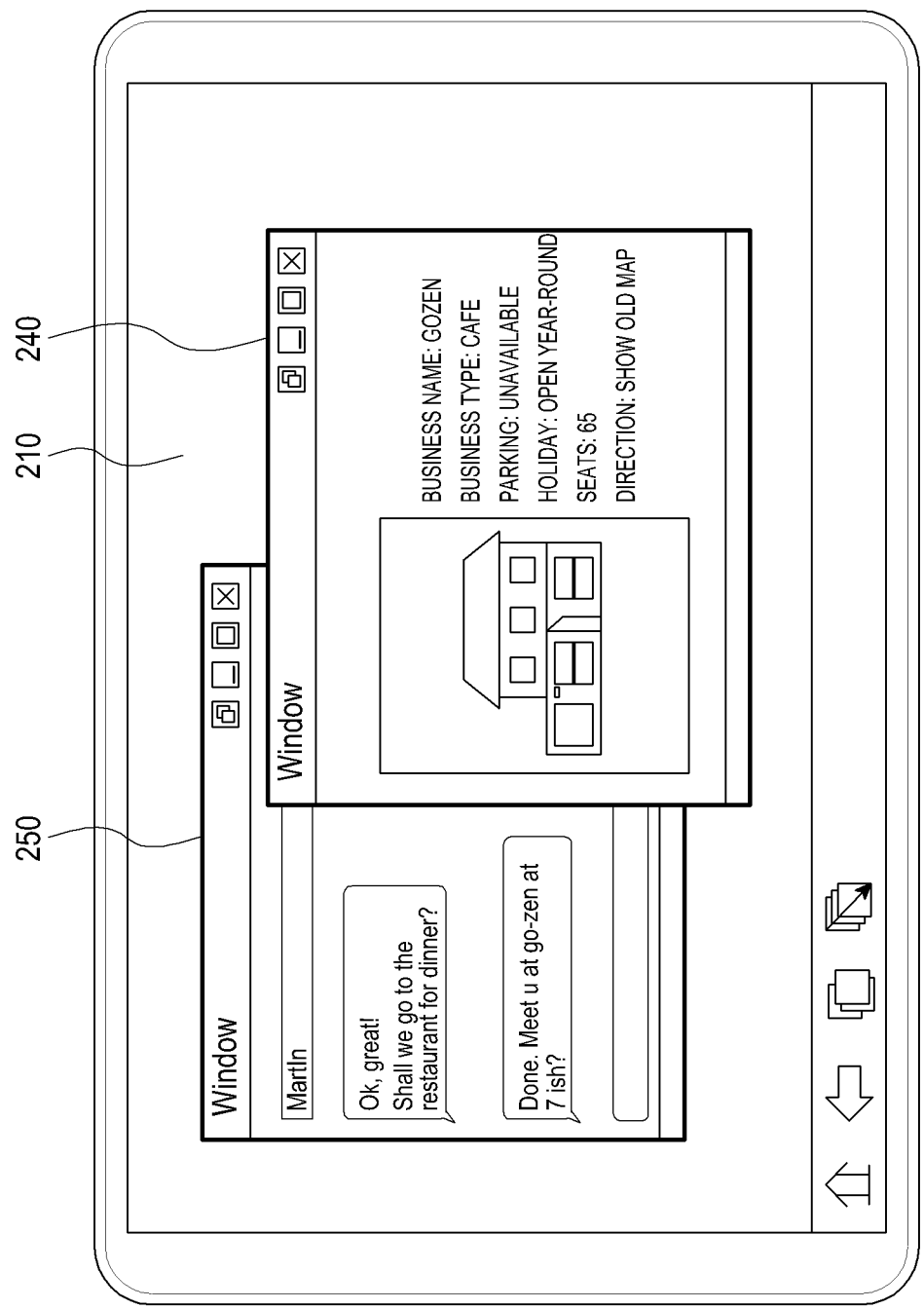
FIGS. 6A and 6B illustrate screens where a plurality of applications are executed according to an exemplary embodiment of the present invention.
Figure 6B:
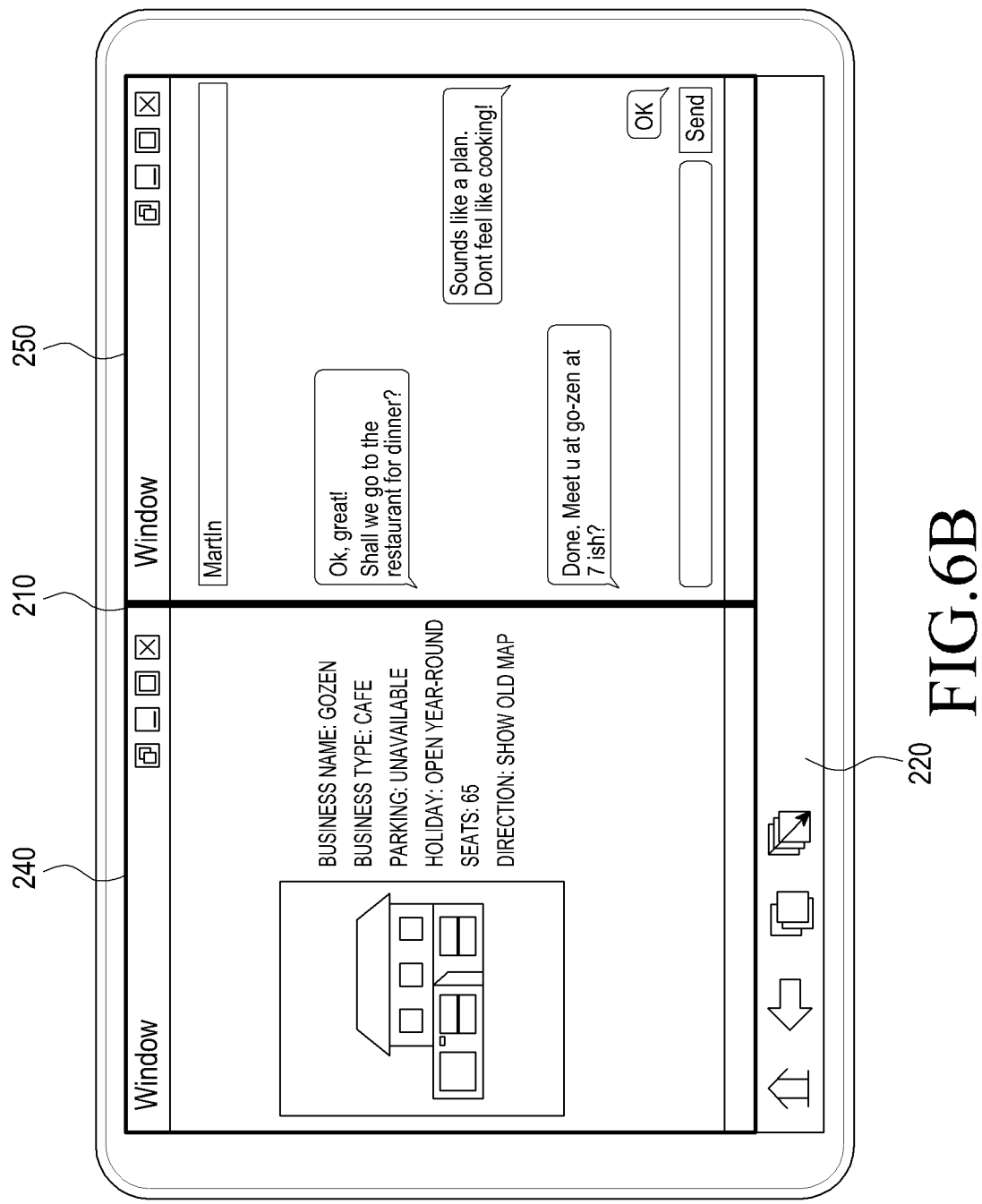

FIGS. 6A and 6B illustrate screens where a plurality of applications are executed according to an exemplary embodiment of the present invention.

FIG. 6A illustrates an example where a plurality of applications are executed on the main screen 210 in the overlap mode, wherein the web browser application is executed in the first window 240 and the message application is executed in the second window 250. FIG. 6B illustrates an example where the first window 240 and the second window 250 are displayed on the main screen 210 in the split mode.

Referring to FIGS. 6A and 6B, the user can search for a desired restaurant through the web browser application executed in the first window 240 on one touch screen 190 and make an appointment to have dinner in the searched restaurant with a friend through the message application executed in the second window 250 at the same time. As illustrated in FIGS. 6A and 6B, the user can search information in the Internet by touching the objects on the first window 240. Further, the user can talk to a friend, Martin, through the message service by touching the objects on the second window 250.

Figure 7A:
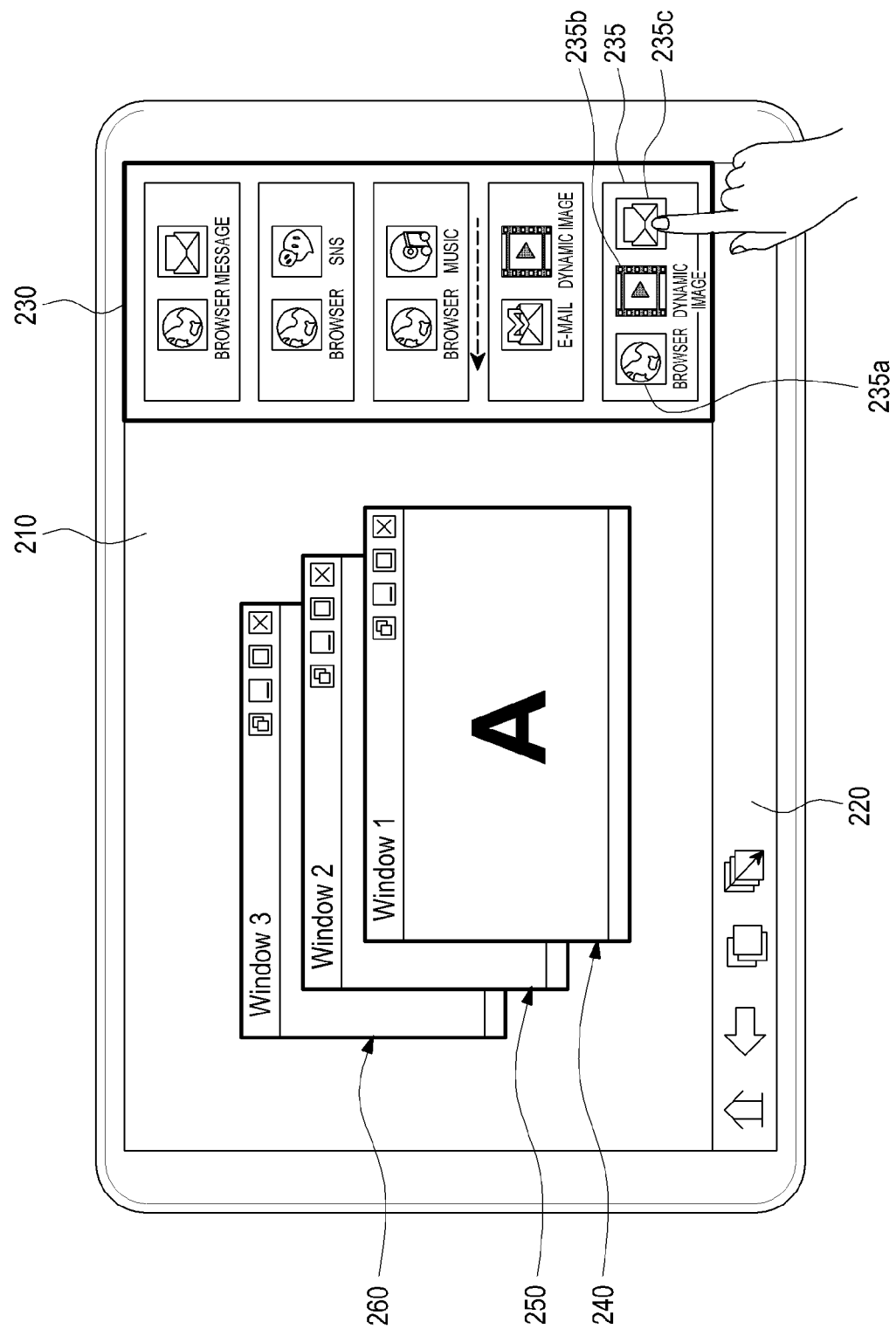
FIGS. 7A and 7B are diagrams for describing a layout displaying a plurality of applications according to another exemplary embodiment of the present invention.
Figure 7B:
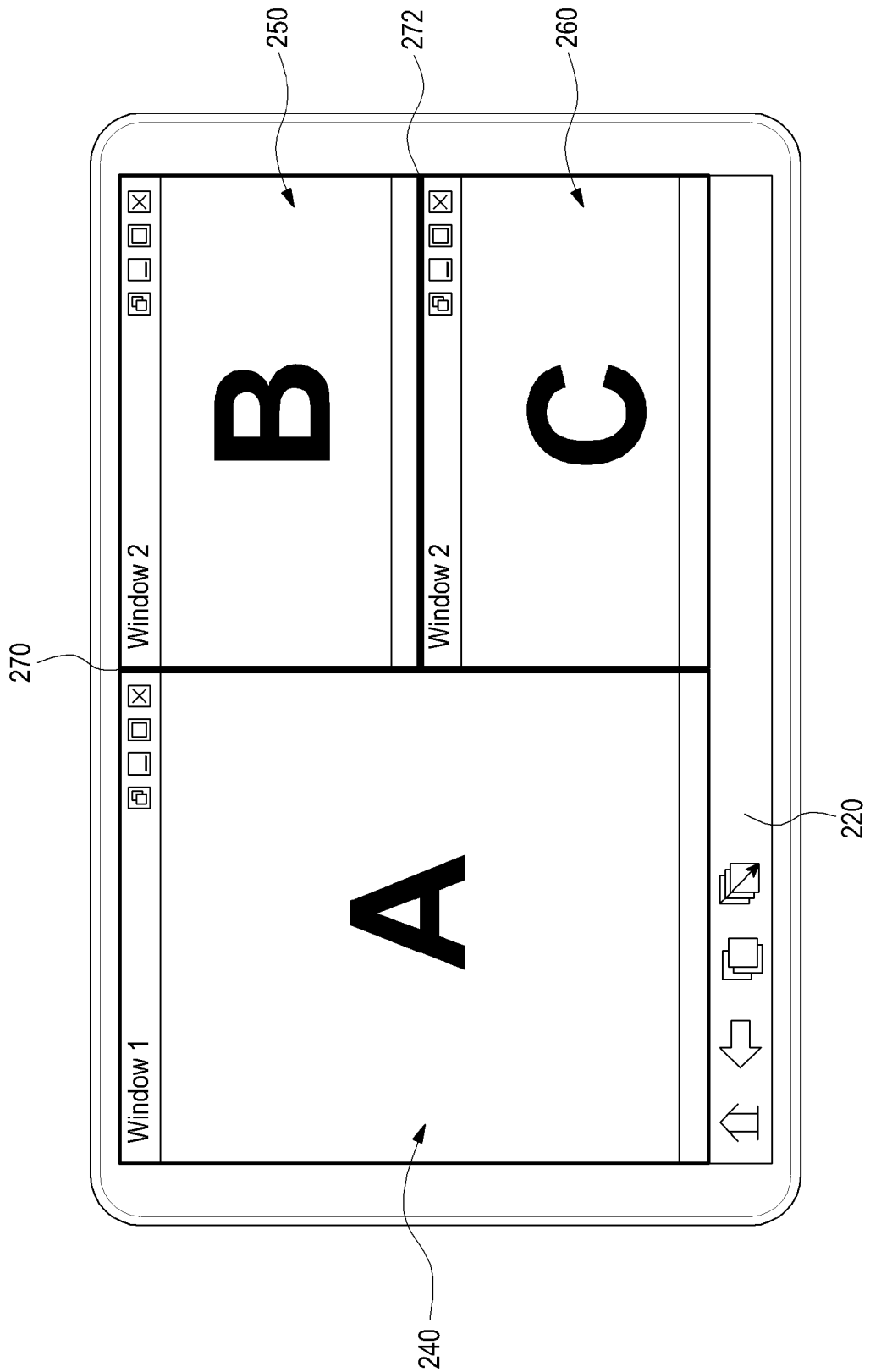

FIGS. 7A and 7B illustrate layouts for displaying a plurality of applications according to another exemplary embodiment of the present invention.

Referring to FIG. 7A, when the user touches the fifth set 235 in the multi application panel 230, the controller 110 simultaneously executes a plurality of applications 235a, 235b, and 235c included in the fifth multi application set 235 and displays the applications on the main screen 210 according to a predetermined layout.

FIG. 7A illustrates an example where three applications 235a, 235b, and 235c are displayed on the main screen 210 in the overlap mode. The first application 235a is displayed within the first window 240, the second application 235b is displayed within the second window 250, and the third application 235c is displayed within the third window 260. In the overlap mode, the second window 250 is displayed in a lower layer than the first window 240. For example, as illustrated in FIG. 7A, the second window 250 may be displayed below the first window 240 in an upper right end of the first window 240. The third window 260 may be displayed below the second window 250 in an upper right end of the second window 250.

The first application 235a is a main application, and the second application 235b and the third application 235c are sub applications associated with the first application 235a.

Here, the first application 235a, the second application 235b, and the third application 235c are programs independently implemented by manufacturers or application developers, respectively.

A plurality of objects for performing functions and events of respective applications 235a, 235b, and 235c are displayed in respective windows 240, 250, and 260.

FIG. 7B illustrates an example where three applications 235a, 235b, and 235c are displayed on the main screen 210 in the split mode. When the user touches the fifth multi application set 235 in the multi application panel 230, the controller 110 simultaneously executes the plurality of applications 235a, 235b, and 235c included in the fifth multi application set 235 and displays the applications on the main screen 210 in the split mode.

In the split mode, the first window 240, the second window 250, and third window 260 may be displayed not to overlap each other on the main screen 210. For example, as illustrated in FIG. 7B, in a state where the main screen 210 is divided into three areas, the first window 240 is displayed in a left half side of the main screen 210, the second window 250 is displayed in an upper right side of the main screen 210, and the third window 260 is displayed in a lower right side of the main screen 210. The first window 240 is arranged not to overlap the second window 250 and the third window 260 while sharing the boundary line 270 with the second window 250 and the third window 260. The second window 250 and the third window 260 are arranged not to overlap each other while sharing the common boundary line 272.

Further, when the mode switching button 228 is touched in the state where the three windows 240, 250, and 260 are arranged in the overlap mode as illustrated in FIG. 7A, the controller 110 can arrange the three windows 240 and 250 in the split mode as illustrated in FIG. 7B. In contrast, when the mode switching button 228 is touched in the state where the three windows 240, 250, and 260 are arranged in the split mode as illustrated in FIG. 7B, the controller 110 can switch the three windows 240, 250, and 260 to the overlap mode as illustrated in FIG. 7A.

Figure 8A:
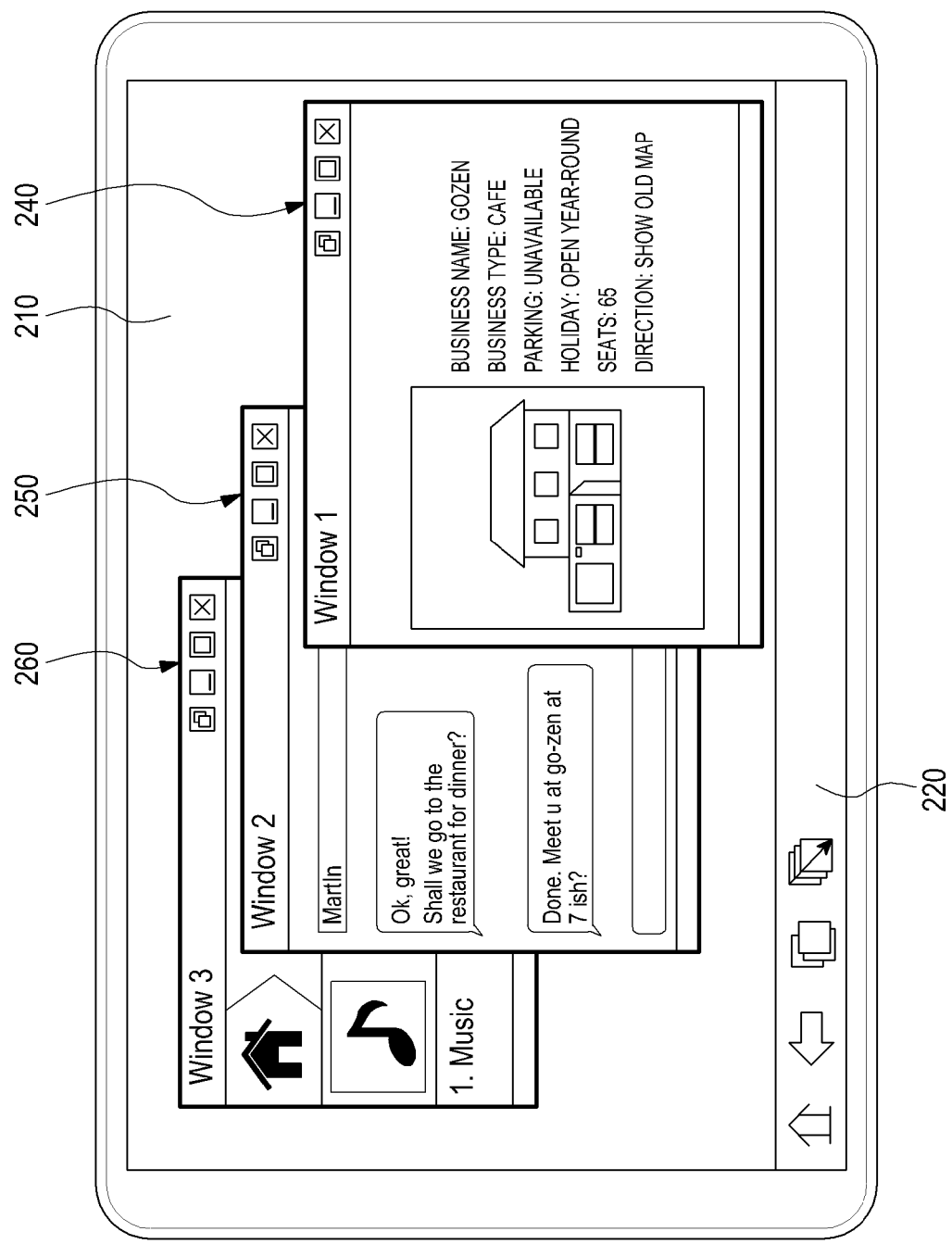
FIGS. 8A and 8B illustrate screens where a plurality of applications are executed according to another exemplary embodiment of the present invention.
Figure 8B:
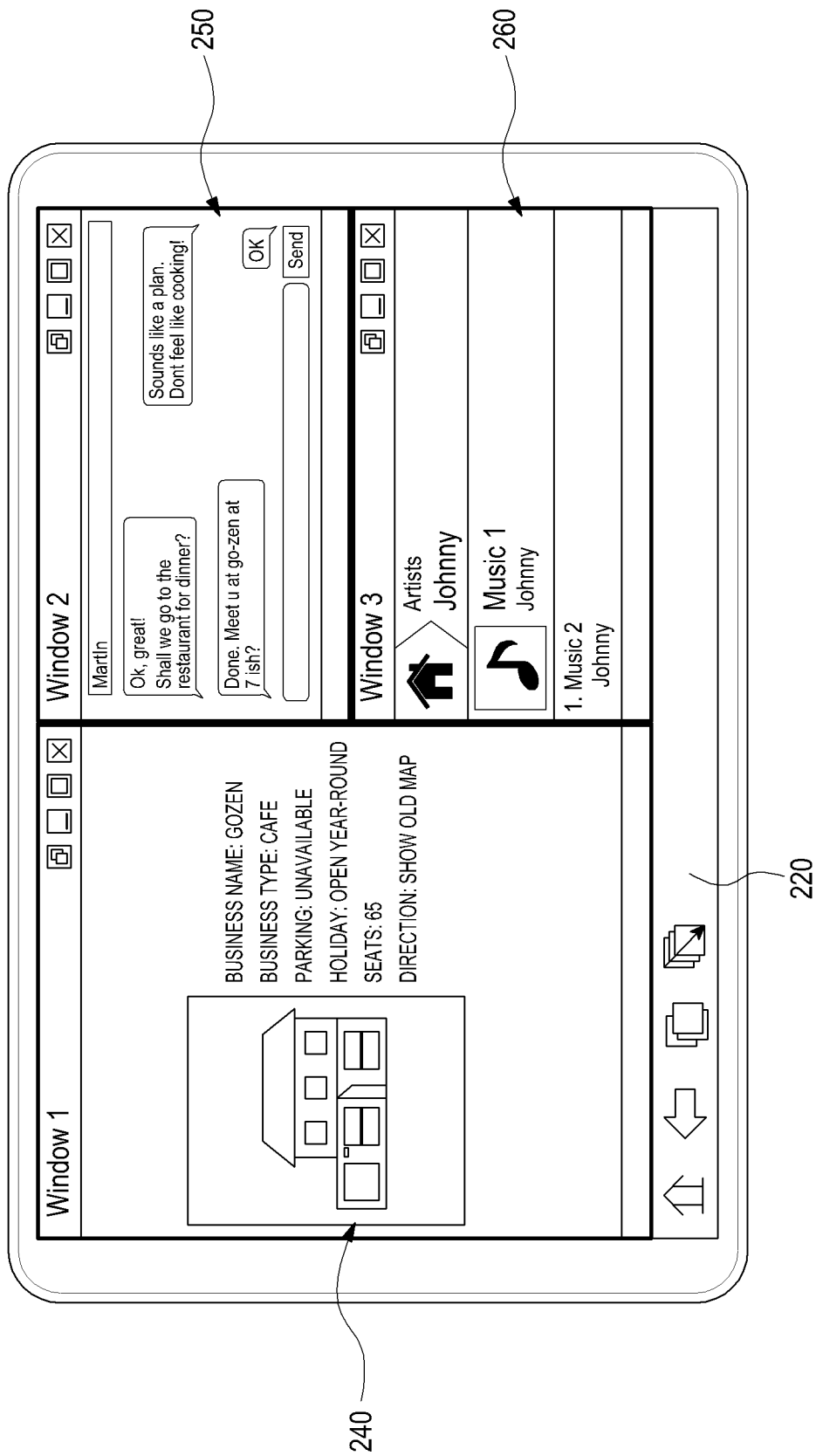

FIGS. 8A and 8B illustrate screens where a plurality of applications are executed according to another exemplary embodiment of the present invention.

FIG. 8A illustrates an example where a plurality of applications are executed on the main screen 210 in the overlap mode, wherein the web browser application is executed in the first window 240, the message application is executed in the second window 250, and the music reproduction application is executed in the third window 260. FIG. 8B illustrates an example where the first window 240, the second window 250, and the third window 260 are displayed on the main screen 210 in the split mode.

Referring to FIGS. 8A and 8B, the user can search for a desired restaurant through the web browser application executed in the first window 240 on touch screen 190 and make an appointment to have dinner in the searched restaurant with a friend through the message application executed in the second window 250 at the same time. At this time, music may be reproduced and the user can listen to the music through the music application executed in the third window 260. In FIGS. 8A and 8B, the user can search for information through the Internet by touching the objects on the first window 240. Further, the user can talk to a friend, Martin, through the message service by touching the objects on the second window 250. In addition, the user can select and listen to the music by touching the objects on the third window 260.

Figure 9:
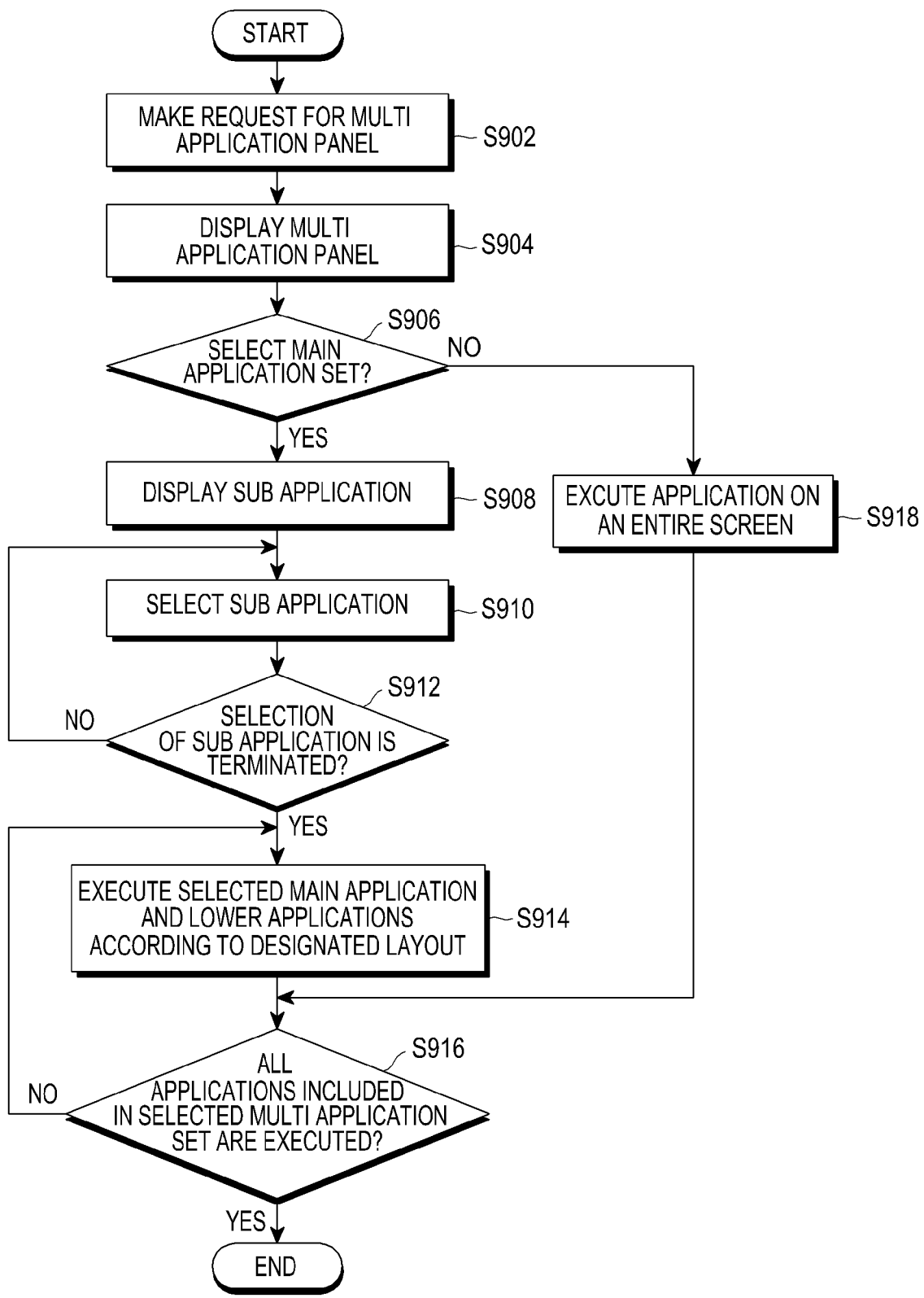
FIG. 9 is a flowchart schematically illustrating a method of executing multiple applications according to another exemplary embodiment of the present invention.

FIG. 9 is a flowchart schematically illustrating a method of executing multiple applications according to another exemplary embodiment of the present invention.

Referring to FIG. 9, the user makes a request for the multi application panel by touching a predetermined position on the touch screen 190 in step S902. The controller 110 can detect the touch for the request for the multi application panel by using the touch screen 190 and the touch screen controller 195. When there is the request for the multi application panel, the controller 110 displays the multi application panel on the touch screen in step S904.

Figure 10A:
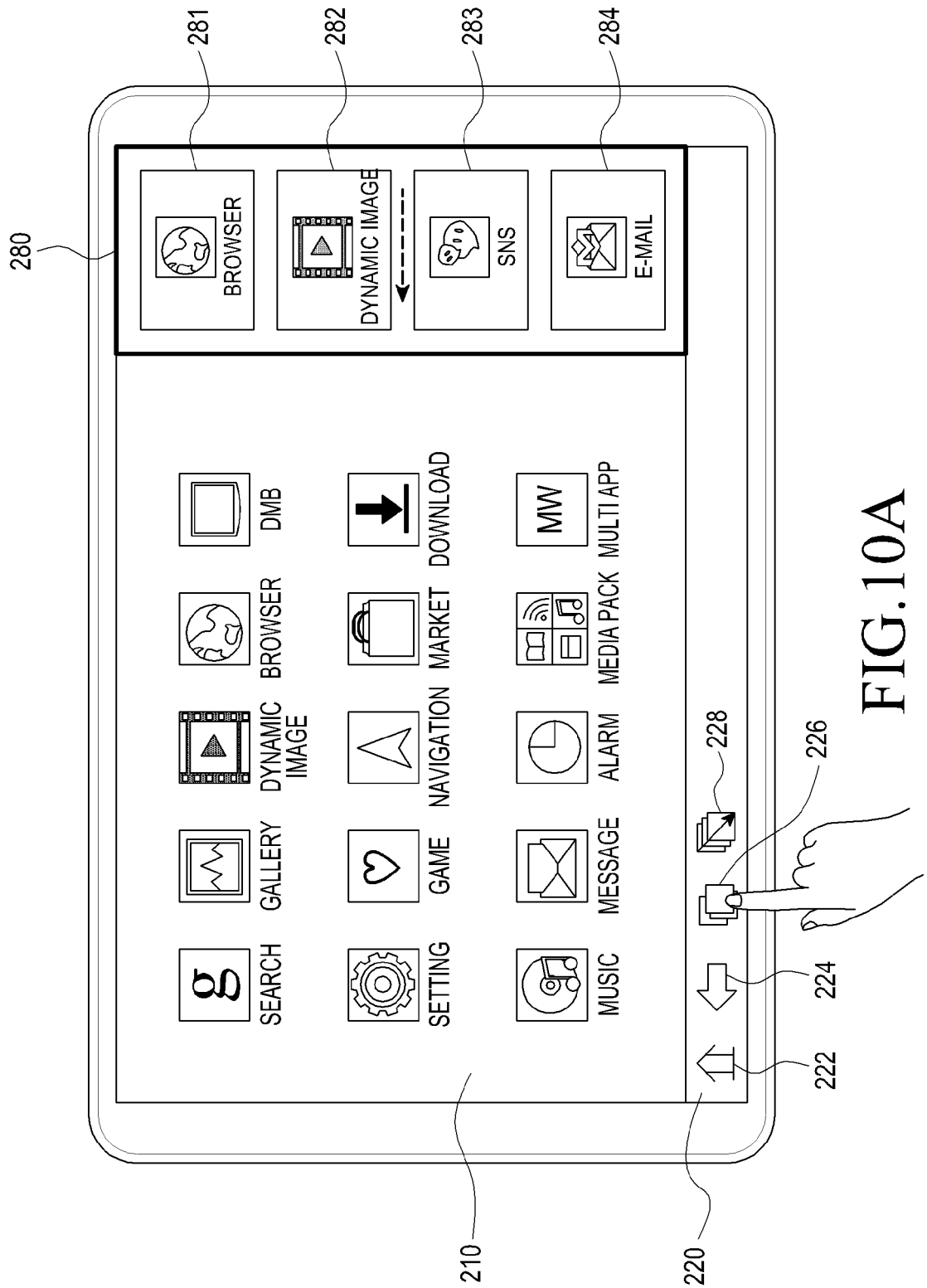
FIGS. 10A to 10C are diagrams for describing a multi application panel according to another exemplary embodiment of the present invention.
Figure 10B:
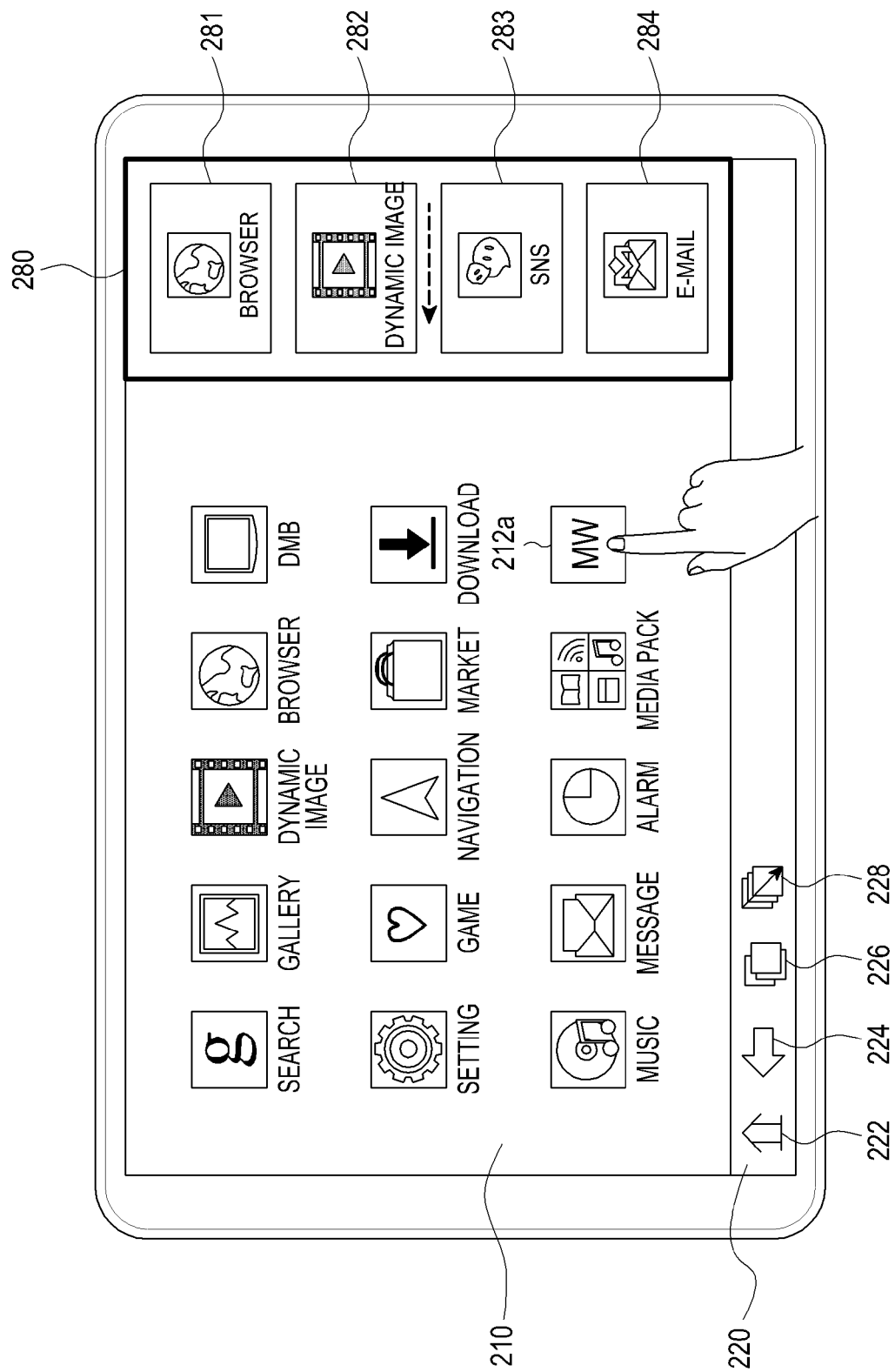
Figure 10C:
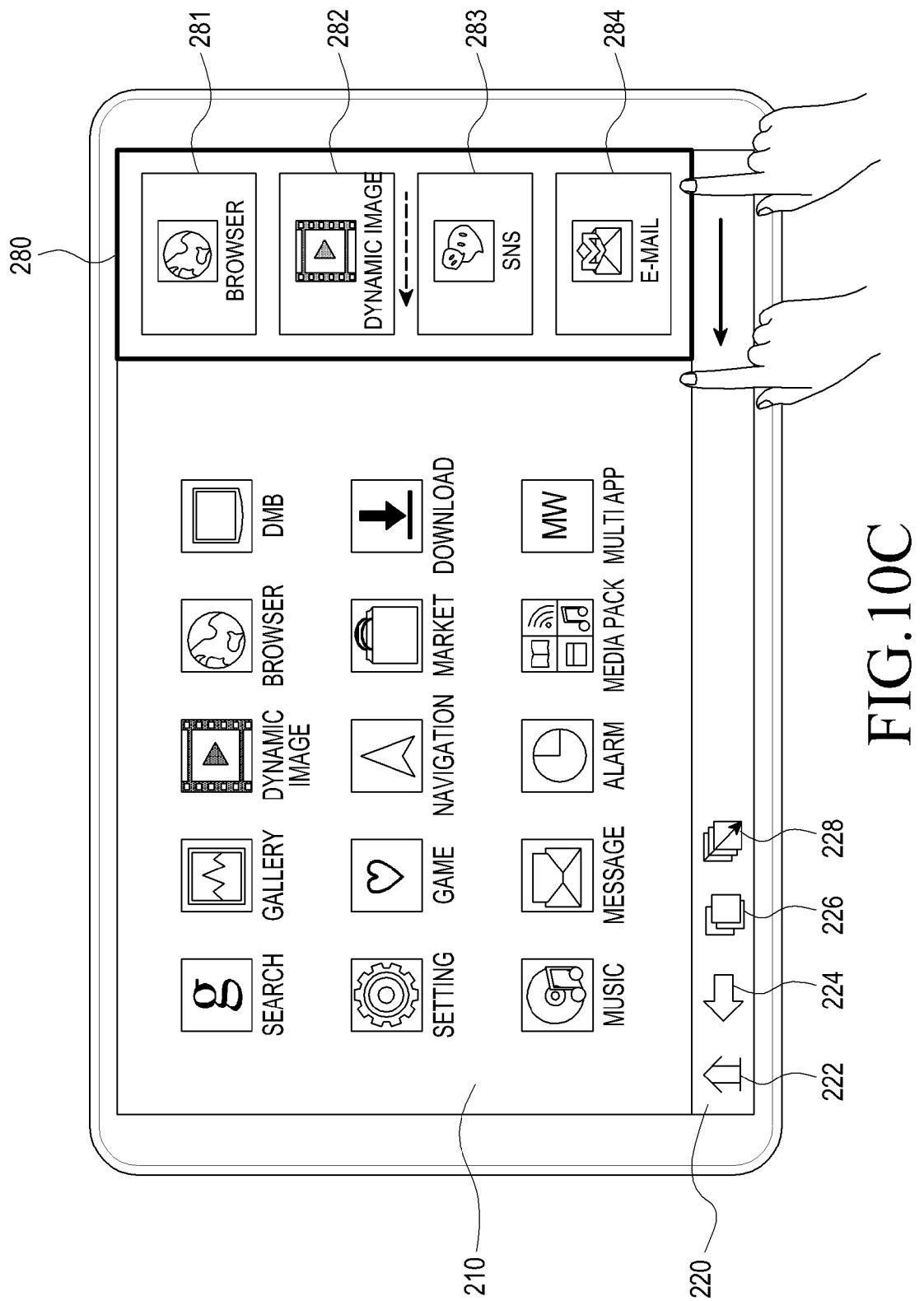

FIGS. 10A to 10C are diagrams for describing a multi application panel according to another exemplary embodiment of the present invention.

Referring to FIG. 10A, when the user touches the multi view mode button 226 on the touch screen 190, the controller 110 detects the touch to vertically display the multi application panel 280 in a predetermined position on the main screen 210, for example, in a right part of the main screen 210. Further, when the execution key 212a for displaying the multi application panel 280 is formed on the main screen 210 as illustrated in FIG. 10B, if the execution key 212a is touched, the multi application panel 280 may be displayed in the right part of the main screen 210. When successive motions of one touch are detected within a predetermined distance in a direction from a right edge to a center of the main screen 210 as illustrated in FIG. 10C, the multi application panel 280 may be displayed while sliding in the direction from the right edge to the center of the main screen 210 according to the motions of the touch. Here, the successive motions of one touch may be a swipe gesture. In FIGS. 10A to 10C, the multi application panel 280 is displayed in the right part of the main screen 210, but the display position may be changed.

The multi application panel 280 includes a plurality of multi application sets 281 to 284. Each of the multi application sets 281 to 284 includes a main application. For example, the first multi application set 281 includes the web browser application as the main application. The second application set 282 includes the dynamic image application as the main application. The third application set 283 includes the SNS application as the main application. The fourth application set 284 includes the e-mail application as the main application.

Referring to FIGS. 10A to 10C, the main applications among the multi application sets shown in Table 1 are displayed in the multi application panel 280 and sub applications are not displayed in step S904.

Referring to FIG. 9, the controller 110 determines whether one of the plurality of multi application sets 281 to 284 included in the multi application panel 280 is touched in step S906.

As a result of the determination in step S906, when one of the plurality of multi application sets 281 to 284 is selected, the controller 110 displays sub applications included in the selected multi application set together with the main application of the selected multi application set in step S908.

Figure 11A:
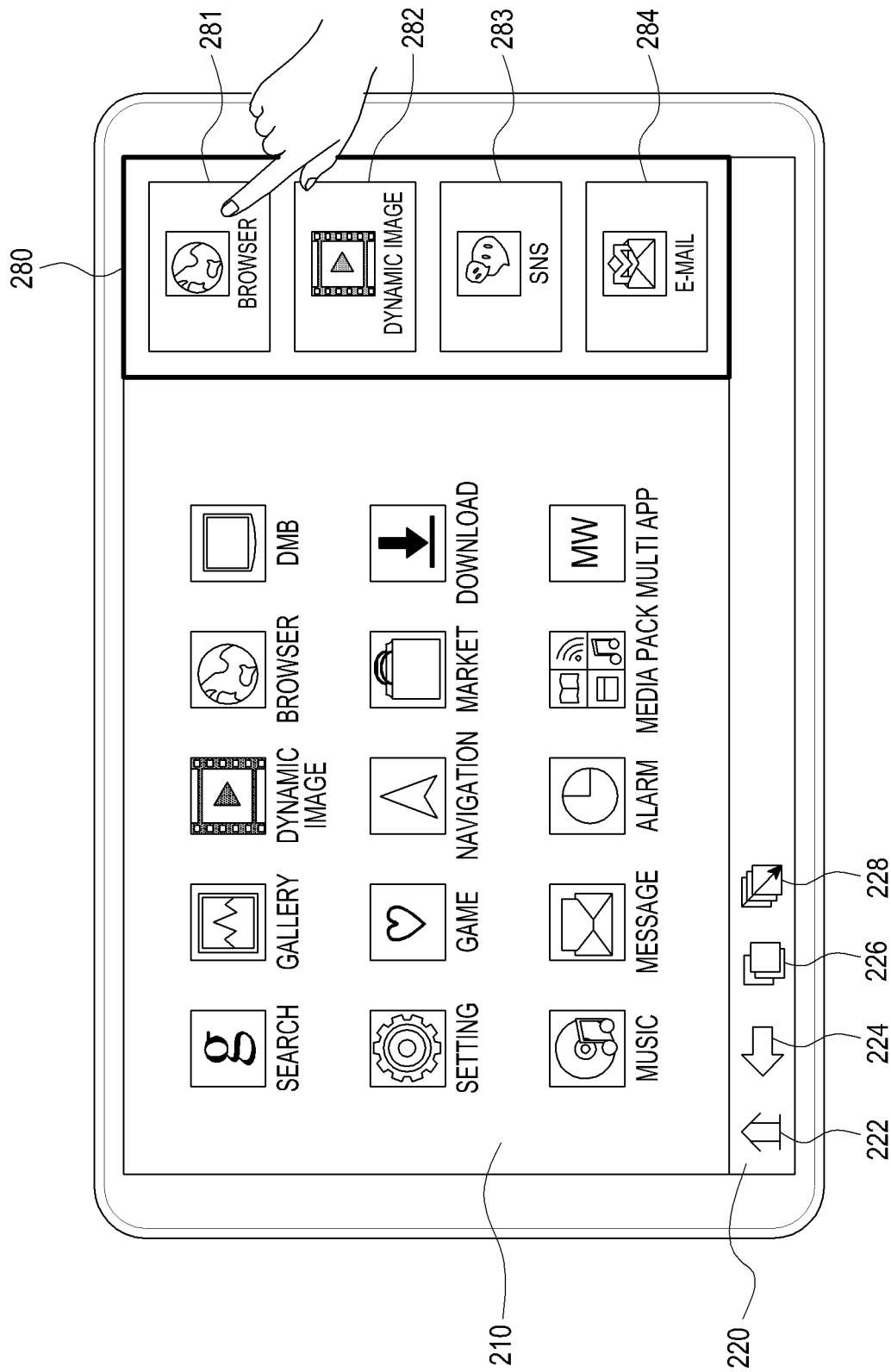
FIGS. 11A to 11C are diagrams for describing a sub application panel according to another exemplary embodiment of the present invention.
Figure 11B:
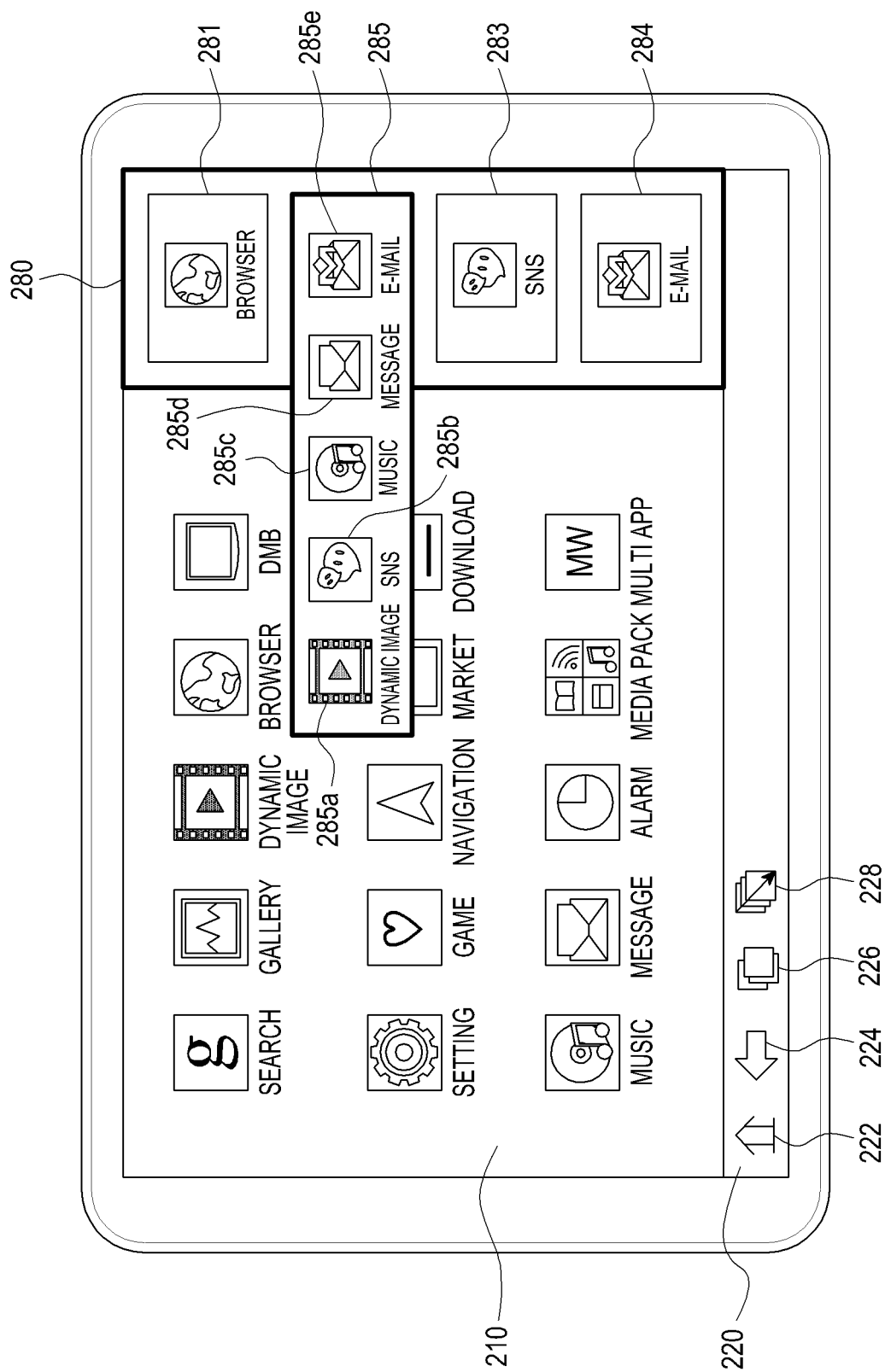
Figure 11C:
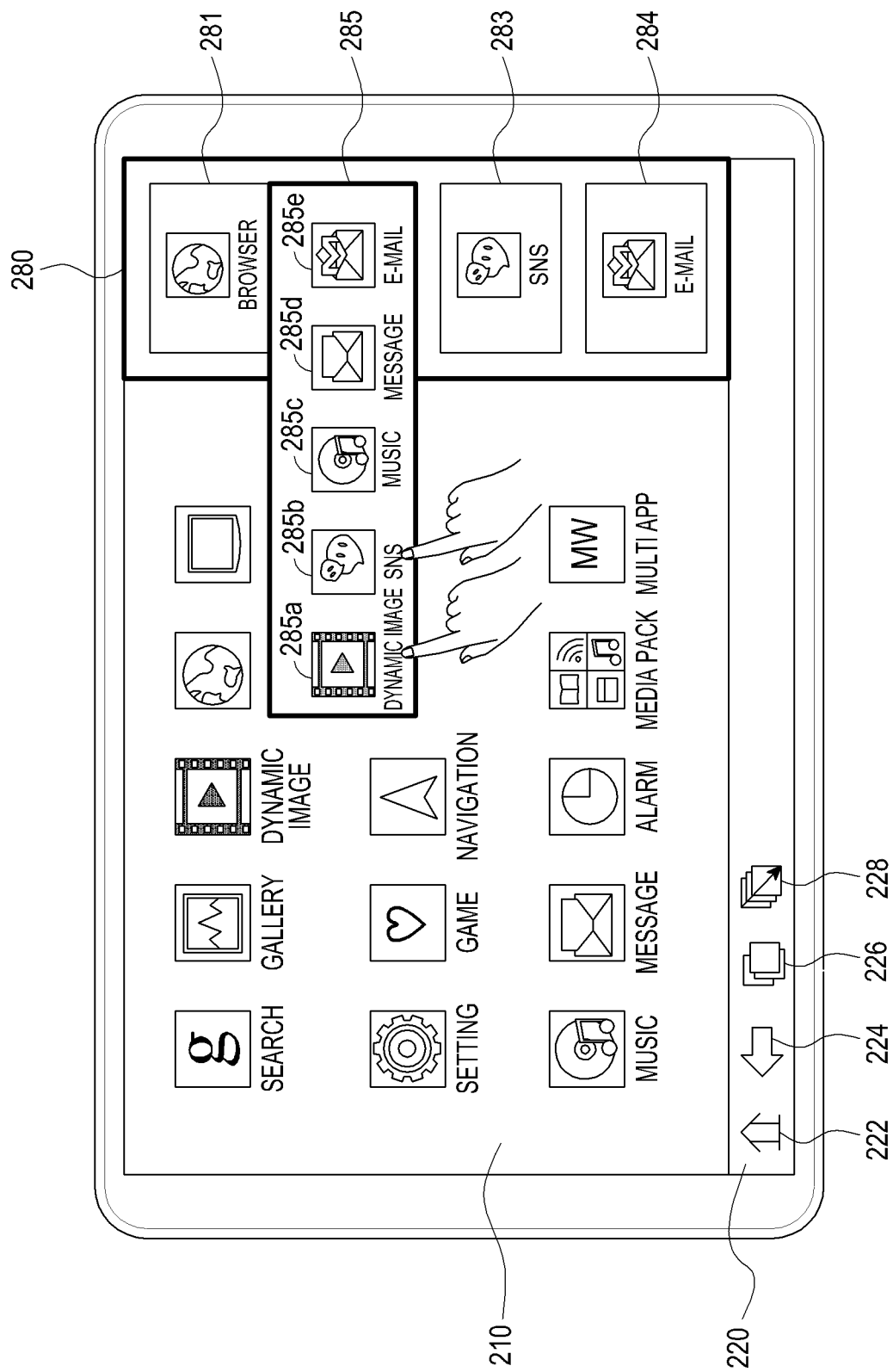

FIGS. 11A to 11C are diagrams for describing a sub application panel according to another exemplary embodiment of the present invention.

Referring to FIG. 11A, when the first main application 281 among the plurality of main applications 281 to 284 displayed within the multi application panel 280 is touched, a sub application panel 285 is displayed as illustrated in FIG. 11B. The sub application panel 285 includes sub applications 285a to 285e associated with the first main application 281. The sub applications 285a to 285e are combined with the first main application 281 to configure the multi application sets of Table 1. For example, when the main application is the web browser application 281, its sub applications may be the dynamic image, SNS, music, message, and the e-mail applications 285a to 285e according to Table 1.

Referring to FIG. 9, the user selects the sub application by touching one or a plurality of sub applications 285a to 285e in step S910. Accordingly, the controller 110 detects the touch on one or the plurality of applications 285a to 285e.

Referring to FIG. 11C, the user can touch only the dynamic image application 285a among the sub applications 285a to 285e displayed in the sub application panel 285 or may additionally touch the SNS application 285b.

Referring to FIG. 9, the controller 110 determines whether the selection for the sub applications 285a to 285e is terminated in step S912. For example, when there is no touch input for a predetermined time (for example, 2 to 3 seconds) on the sub application panel 285, it is determined that the selection for the sub applications 285a to 285e is terminated and then next step S914 may be performed.

Referring to FIG. 9, the controller 110 simultaneously executes the main application selected in step S906 and the one or the plurality of sub applications selected in step S910 and displays the applications on the main screen 210 according to a pre-designated layout in step S914. Step S914 is repeated until all the applications included in the selected multi application set are executed in step S916.

When one main application and one sub application are selected to form one multi application set, two applications included in the multi application set may be displayed on the main screen 210 in the overlap mode or the split mode like FIGS. 5 and 6. Further, when one main application and two sub applications are selected to form one multi application set, three applications included in the multi application set may be displayed on the main display screen 210 in the overlap mode or the split mode like FIGS. 7 and 8. In addition, it is easily understood by those skilled in the art that also when one main application and three or more sub applications are selected, the plurality of applications may be displayed in the overlap mode and the plurality of applications may be displayed in the split mode through proper screen division.

Referring to FIG. 9, as a result of the determination in step S906, when a predetermined time (for example 2 to 3 seconds) passes without selecting one of the main applications 281 to 284, the controller 110 determines that simultaneous execution of the plurality of applications or a multi-view function is not performed in step S918. In this case, a window of an application most recently executed in the device 100 is displayed on an entirety of the main screen 210. Accordingly, only one window is displayed on the main screen 210.

Figure 12:
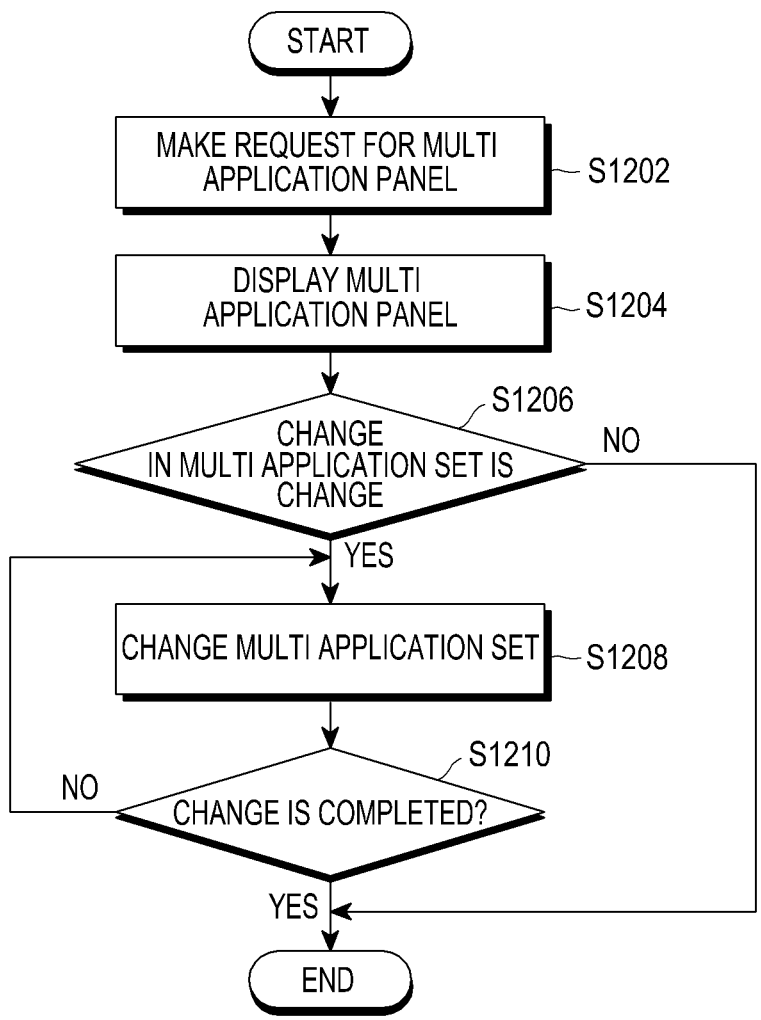
FIG. 12 is a flowchart schematically illustrating a method of changing a multi application set according to an exemplary embodiment of the present invention.

FIG. 12 illustrates a method of changing a multi application set according to an exemplary embodiment of the present invention.

Referring to FIG. 12, a user makes a request for a multi application panel 230 at step S1202 and further the controller 110 detects a user's gesture for changing the multi application sets 231 to 235 of the multi application panel 230 in a state where the multi application panel 230 is displayed on the main screen 210 in step S1204.

When one of the multi application sets 231 to 235 included in the multi application panel 230 is touched, the controller 110 determines that there is a request for changing the multi application sets 231 to 235 and displays an application edit panel 290 in step S1206. Thereafter, if determined that there is a change to at least one of the multi application sets 231 to 235, the at least one of the multi application sets 231 to 235 is changed at step S1208. Finally, at step S1210 it is determined whether the change is completed. If the change is completed, the process ends and if the change is not completed, the process returns to step S1208. Meanwhile, if at step S1206 it is determined that there is no request for changing the multi application sets 231 to 235, the process ends.

Figure 13:
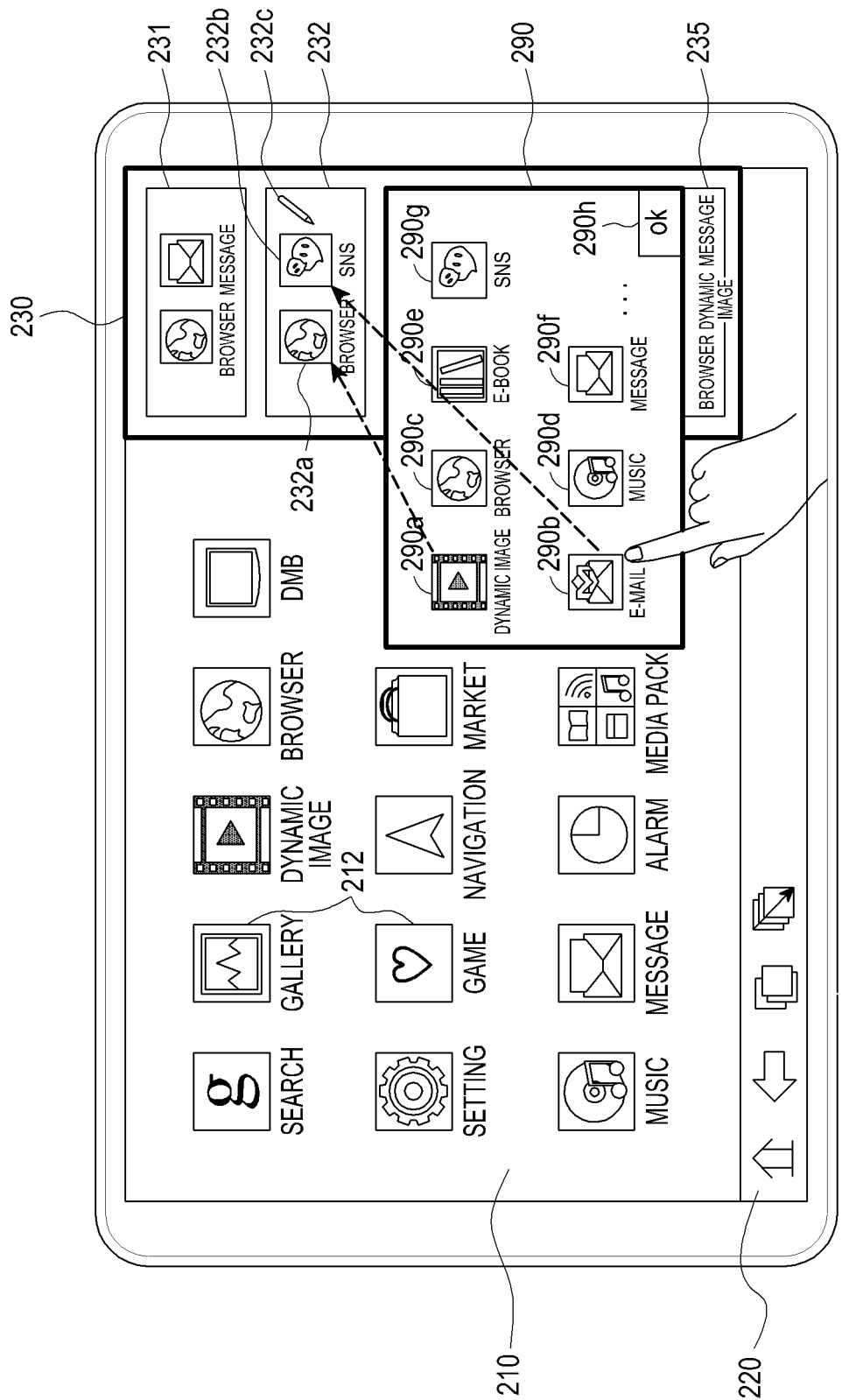
FIG. 13 is a diagram for describing a method of changing a multi application set according to an exemplary embodiment of the present invention.

FIG. 13 illustrates a method of changing a multi application set according to an exemplary embodiment of the present invention.

Referring to FIG. 13, for example, when the second multi application set 232 of the multi application panel 230 is touched, the controller 110 determines that there is a request for changing the second multi application set 232 and displays the application edit panel 290. An edit key 232c for editing the application may be formed in the second multi application set 232. Accordingly, when the edit key 232c is touched, the controller 110 may display the application edit panel 290. Further, when the state where the second multi application set 232 is touched is maintained, for example, for one or more seconds, the controller 110 determines that there is the request for changing the second multi application set 232 and displays the application edit panel 290. When the state where the second multi application set 232 is touched is maintained for less than one second, the controller 110 may determine that there is a request for simultaneously executing the plurality of applications 232a and 232b included in the second multi application set 232.

The application edit panel 290 is displayed adjacently to the second multi application set 232 in a lower part of the second multi application set 232.

The application edit panel 290 includes alternative applications which can replace the applications 232a and 232b within the second multi application set 232.

After one alternative application within the application edit panel 290 is touched, the controller detects a gesture dragging to one position of the applications 232a and 232b within the second multi application set 232, and replaces the applications 232a and 232b within the second multi application set 232 with alternative applications 290a to 290g within the application edit panel 290.

For example, the user can replace the first application 232a with the first alternative application 290a by a drag and drop gesture to a position of the first application 232a of the second multi application set 232 from a position of the first alternative application 290a within the application edit panel 290. The first application 232a may be the web browser application, and the first alternative application 290a may be the dynamic image application.

Further, the user can replace the second application 232a with the second alternative application 290b by the drag and drop gesture to a position of the second application 232b of the second multi application set 232 from a position of the second alternative application 290b within the application edit panel 290. The second application 232b may be the SNS application, and the second alternative application 290b may be the e-mail application.

As described above, the second multi application set 232 initially includes the web browser application and the SNS application, but the second multi application set 232 may be changed to include the dynamic image application and the e-mail application by the user.

An edit termination key 290h may be additionally formed in the application edit panel 290. Accordingly, when the edit termination key 290h is touched, the controller 110 determines that the editing of the second multi application set 232 is terminated, removes the application edit panel 290, and sets such that the second multi application set 232 includes the alternative applications 290a and 290b.

Figure 14:
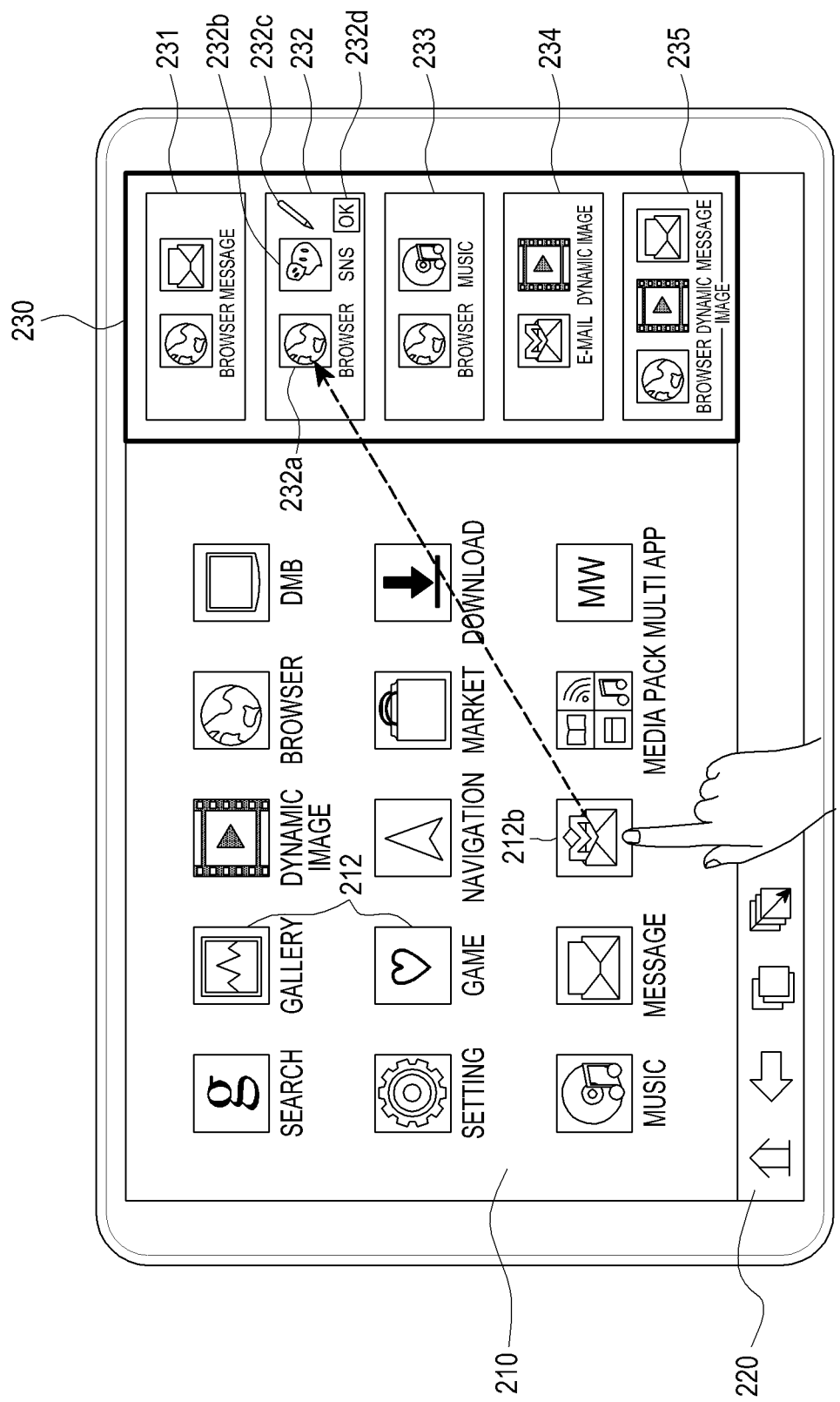
FIG. 14 is a diagram for describing a method of changing a multi application set according to another exemplary embodiment of the present invention.

FIG. 14 illustrates a method of changing a multi application set according to another exemplary embodiment of the present invention.

Referring to FIG. 14, the controller detects a user's gesture for changing the multi application sets 231 to 235 of the multi application panel 230 in a state where the multi application panel 230 is displayed on the main screen 210.

When one of the multi application sets 231 to 235 included in the multi application panel 230 is touched, the controller 110 determines that there is a request for changing the multi application sets 231 to 235.

For example, when the second multi application set 232 of the multi application panel 230 is touched, the controller 110 determines that there is a request for editing the second multi application set 232. An edit key 232c may be formed in the second multi application set 232. When the edit key 232c is touched or for example, when a predetermined time is maintained in a state where one point of the second multi application set 232 is touched, the controller 110 determines there is the request for changing the second multi application set 232. The controller 110 can indicate that the second multi application set 232 is in a changeable state by brightly displaying the second multi application set 232 or displaying the second multi application set 232 with a color different from the multi application sets 231, 233, 234, and 235.

Subsequently, after one execution key 212b of the plurality of execution keys 212 within the main screen 210 is touched, the controller 110 detects a gesture dragging to a position of the first application 232a within the second multi application set 232 and replaces the first application 232a within the second multi application set 232 with an application corresponding to the execution key 212b.

For example, the first application 232a may be the web browser application, and the application corresponding to the execution key 212b of the main screen 210 may be the e-mail application.

As described above, the second multi application set 232 initially includes the web browser application and the SNS application, but the second multi application set 232 may be changed to include the e-mail application and the SNS application by the user.

An edit termination key 232d may be additionally formed in the second multi application set 232. Accordingly, when the edit termination key 232d is touched, the controller 110 determines that the editing of the second multi application set 232 is terminated, and sets such that the second multi application set 232 includes the applications 212b and 232b.

Although the method of editing the multi application panel 230 according to an exemplary embodiment by using the execution keys on the application edit panel 290 or the main screen 210 has been described in FIGS. 13 and 14, it is easily understood by those skilled in the art that the multi application panel 280 according to another exemplary embodiment may be edited by using the execution keys on the application edit panel 290 or the main screen 210.

FIGS. 15A to 15D are diagrams for describing a screen control method by a mobile device executing multiple applications according to an exemplary embodiment of the present invention.

Figure 15A:
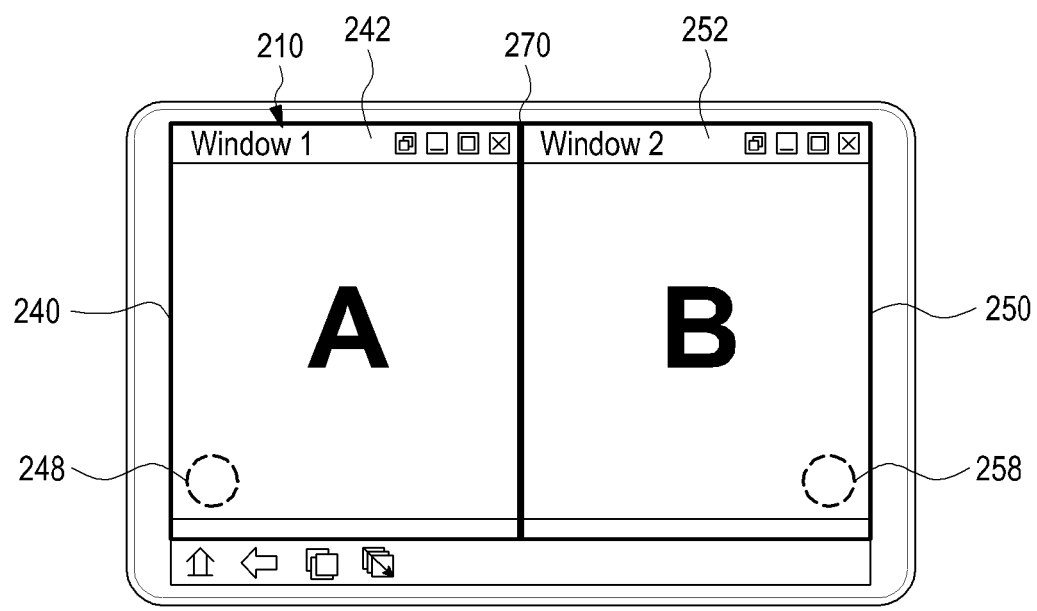
FIGS. 15A to 15D are diagrams for describing a screen control method by a mobile device executing multiple applications according to an exemplary embodiment of the present invention.

Referring to FIG. 15A, two windows 240 and 250 are displayed on the main screen 210 of the device 100 in the split mode. The first window 240 is located in a left side of the main screen 210, and the second window 250 is located in a right side of the main screen 250. A first application is executed and displayed in the first window 240, and a second application is executed and displayed in the second window 250. A plurality of objects A may be displayed in the first application. A plurality of objects B may be also displayed in the second application. The first and second applications may be simultaneously executed by using the above described multi application panels 230 and 280, but the exemplary embodiment is not limited thereto, and one (for example, first application) of the first and second applications may be first executed and displayed on the main screen 210 and then the other (for example, second application) may be executed and displayed on the main screen 210. It will be easily understood by those skilled in the art that the first and second applications may be sequentially executed also for methods controlling a screen size, a position, and a display direction of the first and second windows 240 and 250 which will be described below and be displayed on the main screen 210.

The first window 240 and the second window 250 share the common boundary line 270 and are connected to each other through the common boundary line 270. In FIG. 15A, sizes of the first window 240 and the second window 250 are equal to each other, and the common boundary line 270 is vertically formed in a center of the main screen 210. A right edge of the first window 240 extends to the common boundary line 270, and a left edge extends to a left edge of the main screen 210. A left edge of the second window 250 extends to the common boundary line 270, and a right edge extends to a right edge of the main screen 210. However, this is merely an exemplary embodiment and the first window 240 and the second window 250, as explained below, may be of different sizes. Similarly, the windows need not be arranged one next to the other but may also be arranged one on top of the other.

A first application executed in the first window 240 and a second application executed in the second window 250 are programs independently executed from each other. Accordingly, for execution of the second application, the first application is not required to be executed in advance. Further, even though the first application is terminated, the second application may be continuously executed on the main screen 210, and vice versa.

The controller 110 detects successive motions of one touch from the common boundary line 270, and simultaneously changes the sizes of the first window 240 and the second window 250 according to the motions of the touch. The successive motions of the one touch may be the swipe gesture in which one finger horizontally moves within a predetermined distance in a state where the one finger touches the common boundary line 270. When an object A included in the first application within the first window 240 is touched or when an object B included in the second application within the second window 250 is touched, a function or an event corresponding to the object A or the object B may be executed in the first application or the second application. Accordingly, in order to simultaneously change the sizes of the first window 240 and the second window 250, an area which does not influence the object A and the object B, for example, the common boundary line 270 may be used.

Figure 15B:
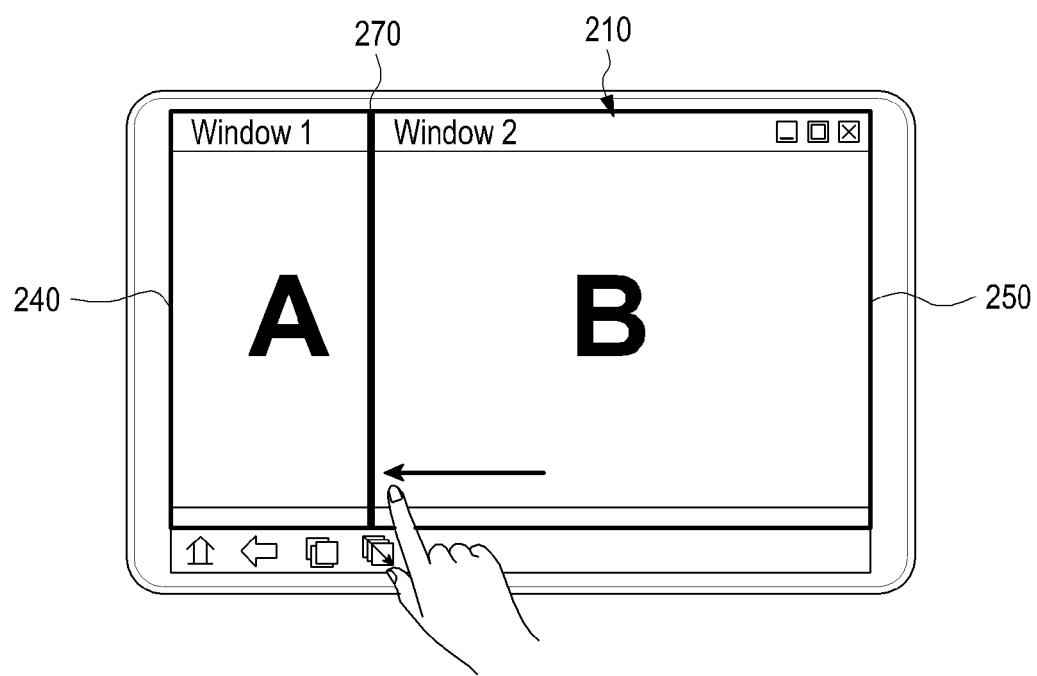

Referring to FIG. 15B, when the user touches the common boundary line 270 and moves in a left direction, the common boundary line 270 and a left side of the second window 250 move together by a moved distance of the touch. Accordingly, the size of the second window 250 horizontally increases by the moved distance of the touch. The common boundary line 270 and a right side of the first window 240 move together by the moved distance of the touch. Accordingly, the size of the first window 240 horizontally decreases by the moved distance of the touch. As described above, as the size of the first window 240 decreases, the object A displayed in the first application of the first window 240 may be partially displayed.

Figure 15C:
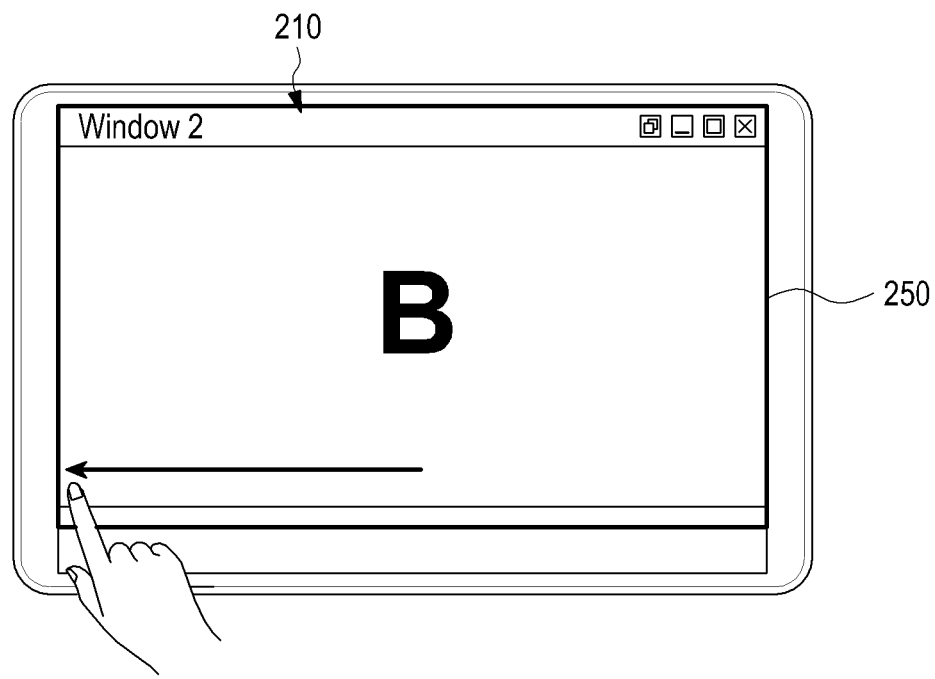

Referring to FIG. 15C, when the user touches the common boundary line 270 and moves to a left edge of the main screen 210 in a left direction, the common boundary line 270 and a left side of the second window 250 move together by a moved distance of the touch. That is, the left side of the second window 250 extends to a left end of the touch screen 190 by the moved distance of the touch. Accordingly, even though all the first and second applications are executed in the device 100, only the second window 250 is displayed on the main screen 210 of the touch screen 190 and the first window 240 is not shown. However, it is possible to display the first window 240 on the touch screen 190 as illustrated in FIG. 15D below.

Figure 15D:
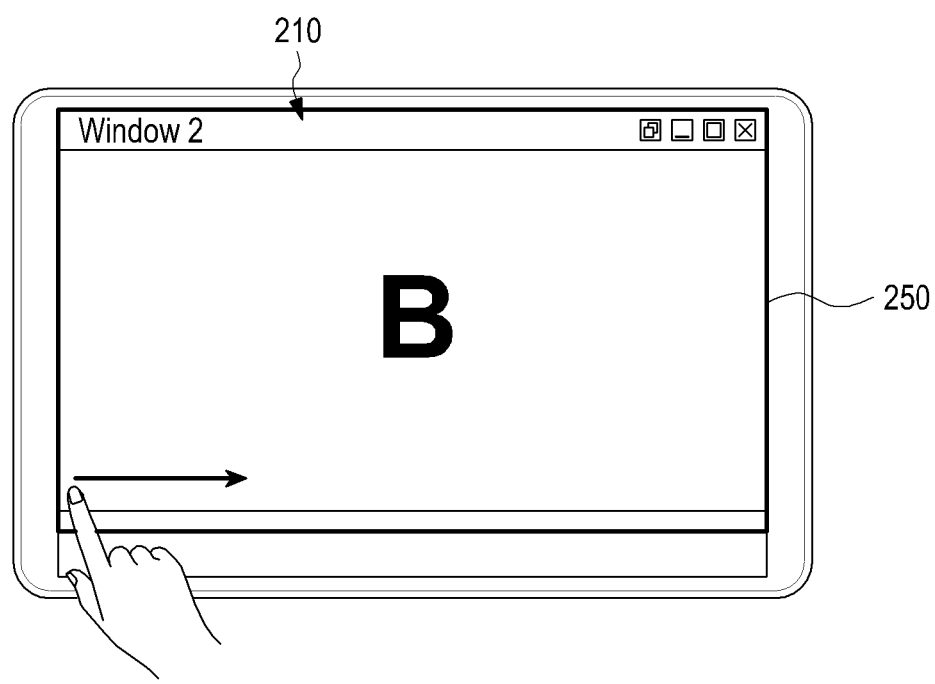

Referring to FIG. 15D, when the user touches a left edge of the main screen 210 and moves in a right direction, that is, in a direction toward the center of the main screen 210, the common boundary line 270 and a left side of the second window 250 move together by a moved distance of the touch. Accordingly, when the touch moves up to the center of the touch screen 190, the first window 240 and the second window 250 may be displayed together on the main screen 210 as illustrated in FIG. 15A.

Although the example where the sizes of the first and second windows 240 and 250 are simultaneously changed by touching the common boundary line 270 by the user is described in FIGS. 15A to 15D, the sizes of the first and second windows 240 and 250 may be simultaneously changed by touching particular positions of the first and second windows 240 and 250. For example, the user can simultaneously change the sizes of the first and second windows 240 and 250 by swiping the title bars 242 and 252 formed in the first and second windows 240 and 250. Further, window size adjustment keys 248 and 258 are formed in the first and second windows 240 and 250, and the user can simultaneously change the size of the first and second windows 240 and 250 by swiping the window size adjustment keys 248 and 258. Since a method of simultaneously changing the sizes of the first and second windows 240 and 250 by using the title bars 242 and 252 or the window size adjustment keys 248 and 258 is the same as the method of simultaneously changing the size of the first and second windows 240 and 250 by using the common boundary line 270, repeated descriptions will be omitted. In addition, although the example where the sizes of the first and second windows 240 and 250 are simultaneously changed has been described in FIGS. 15A to 15D, it is different from changing sizes of various objects formed in one application, for example, sizes of various objects included in the second application of the second window 250 or changing positions of the objects.

FIGS. 16A to 16D are diagrams for describing a screen control method of controlling a screen of the mobile device executing multiple applications according to another exemplary embodiment of the present invention.

Figure 16A:
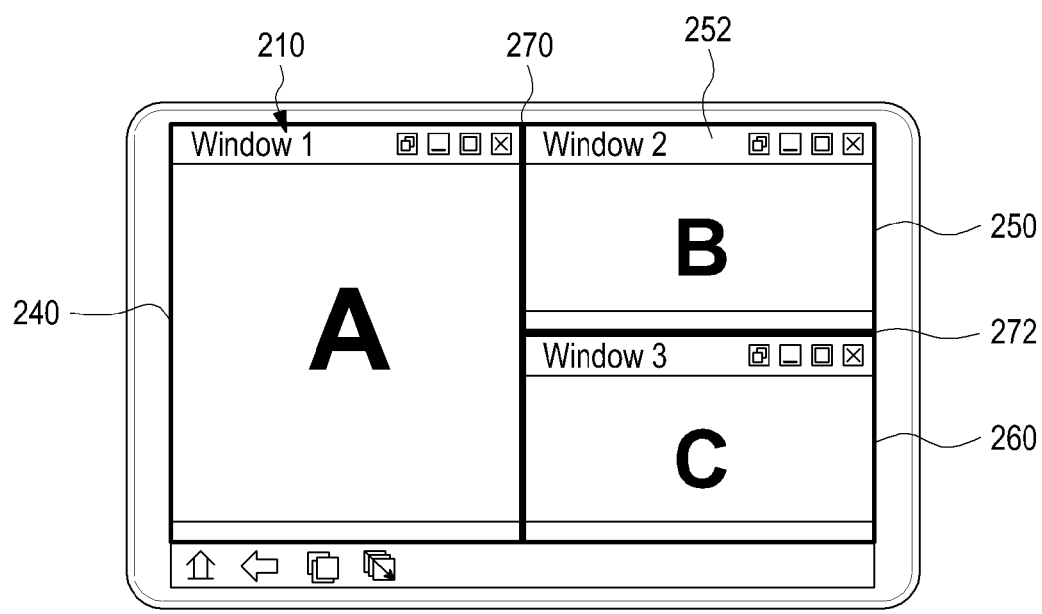
FIGS. 16A to 16D are diagrams for describing a screen control method by a mobile device executing multiple applications according to another exemplary embodiment of the present invention.

First, referring to FIG. 16A, three windows 240, 250, and 260 are displayed on the main screen 210 of the device 100 in the split mode. The first window 240 is located in a left side of the main screen 210, the second window 250 is located in an upper right side of the main screen 210, and the third window 260 is located in a lower right side of the main screen 210. A first application is executed and displayed in the first window 240, a second application is executed and displayed in the second window 250, and a third application is executed and displayed in the third window 260. The first, second, and third applications are different applications and correspond to independently implemented programs. A plurality of objects A may be displayed in the first application. A plurality of objects B may be displayed in the second application. A plurality of objects C may be displayed in the second application. The first, second, and third applications may be simultaneously executed by using the above described multi application panels 230 and 280, but the exemplary embodiment is not limited thereto, and the first, second, and third applications may be sequentially executed and displayed on the main screen.

The first window 240, the second window 250, and the third window 260 share the common boundary line 270, and are connected to each other through the common boundary line 270. The second window 250 and the third window 260 share the common boundary line 272, and are connected to each other through the common boundary line 272.

In FIG. 16A, the size of the first window 240 is equal to a sum of the sizes of the second window 250 and the third window 260 and the common boundary line 270 is vertically formed in the center of the main screen 210. However, this arrangement is not limited thereto and the first window 240 can be formed on the upper side of the main screen 210 and the second window 250 and the third window 260 can be formed on the lower side of the main screen 210.

It is illustrated that the size of the second window 250 is equal to the size of the third window 260 and the common boundary line 272 is horizontally formed. A right edge of the first window 240 extends to the common boundary line 270, and a left edge of the first window 240 extends to a left edge of the main screen 210. A left edge of the second window 250 extends to the common boundary line 270, a right edge of the second window 250 extends to a right edge of the main screen 210, an upper edge of the second window 250 extends to an upper edge of the main screen 210, and a lower edge of the second window 250 extends to the common boundary line 272. A left edge of the third window 260 extends to the common boundary line 270, a right edge of the third window 260 extends to the right edge of the main screen 210, an upper edge of the third window 260 extends to the common boundary line 272, and a lower edge of the third window 260 extends to a lower edge of the main screen. 210.

The controller 110 detects successive motions of one touch from the common boundary line 272, and simultaneously changes the size of the second window 250 and the size of the third window 260 according to motions of the touch. The successive motions of the one touch may be the swipe gesture in which one finger vertically moves within a predetermined distance in a state where the one finger touches the common boundary line 272.

Figure 16B:
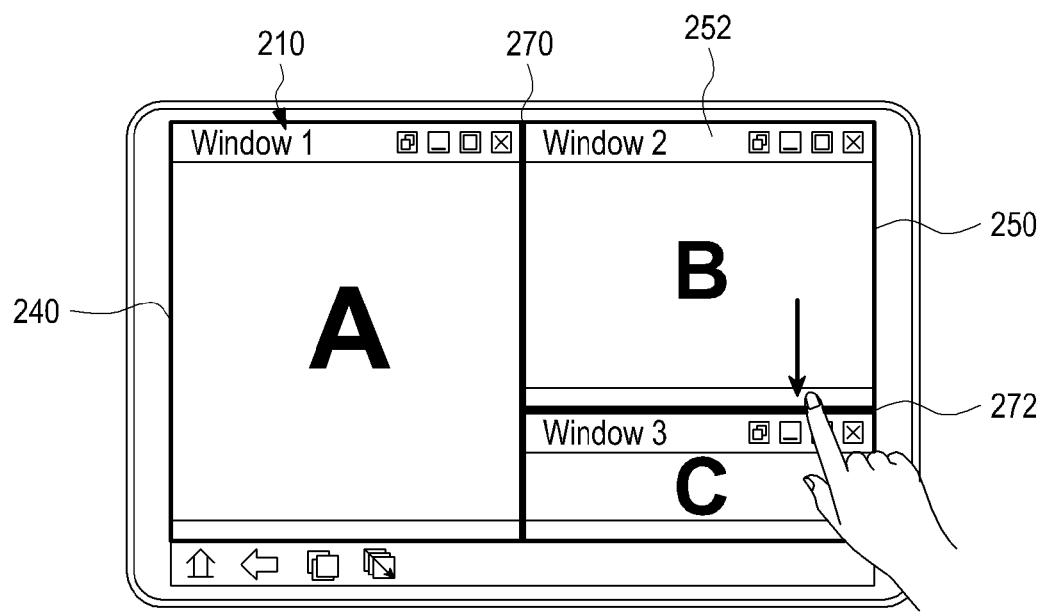

Referring to FIG. 16B, when the user touches the common boundary line 272 and moves in a lower direction, the common boundary line 272 and a lower side of the second window 250 move together by a moved distance of the touch. Accordingly, the size of the second window 250 vertically increases by the moved distance of the touch. The common boundary line 272 and an upper side of the third window 260 move together by a moved distance of the touch. Accordingly, the size of the third window 260 vertically decreases by the moved distance of the touch. As described above, as the size of the third window 260 decreases, the object C displayed in the third application of the third window 260 may be partially displayed.

Figure 16C:
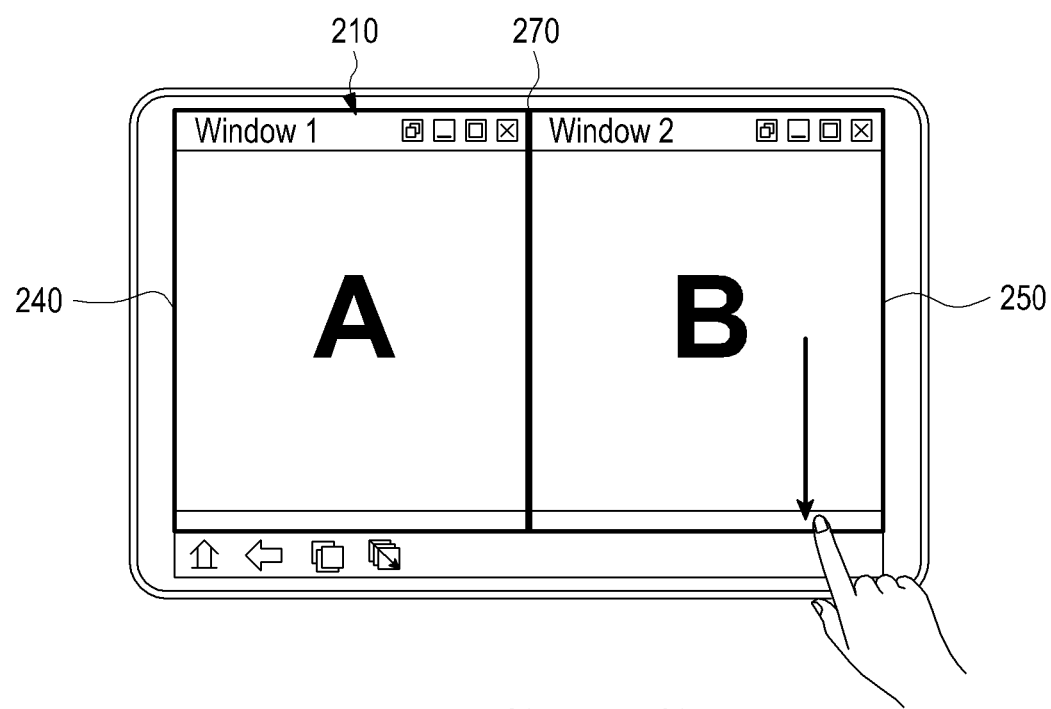

Referring to FIG. 16C, when the user touches the common boundary line 272 and moves to the lower edge of the main screen 210 in the lower direction, the common boundary line 272 and a lower side of the second window 250 move together by a moved distance of the touch. That is, the lower side of the second window 250 extends to a lower end of the main screen 210 by the moved distance of the touch. Accordingly, even though all the first, second, and third applications are executed in the device 100, only the first and second windows 240 and 250 are displayed on the main screen 210 of the touch screen 190 and the third window 260 is not shown. However, it is possible to display the third window 260 on the touch screen 190 as illustrated in FIG. 16D.

Figure 16D:
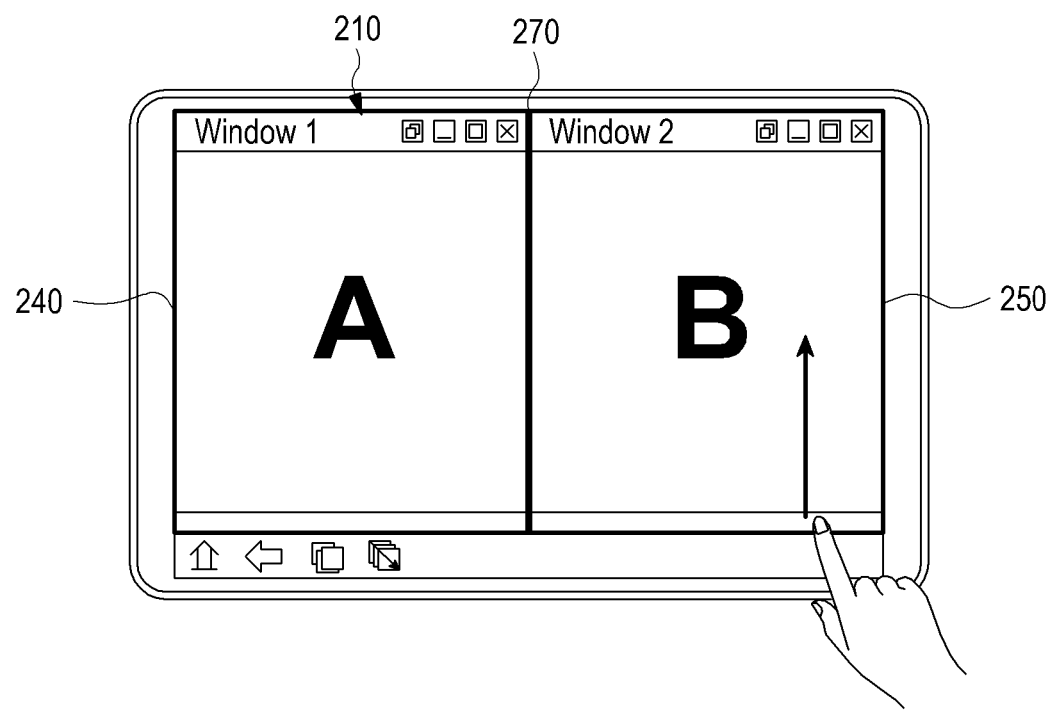

Referring to FIG. 16D, when the user touches a lower end of the main screen 210 and moves in an upper direction, the common boundary line 272 and the lower side of the second window 250 move together by a moved distance of the touch. Accordingly, the second window 250 and the third window 260 may be displayed together on the main screen 210 as illustrated in FIG. 16A.

FIGS. 17A to 17D illustrate a method of controlling a screen of the mobile device executing multiple applications according to still another exemplary embodiment of the present invention.

Figure 17A:
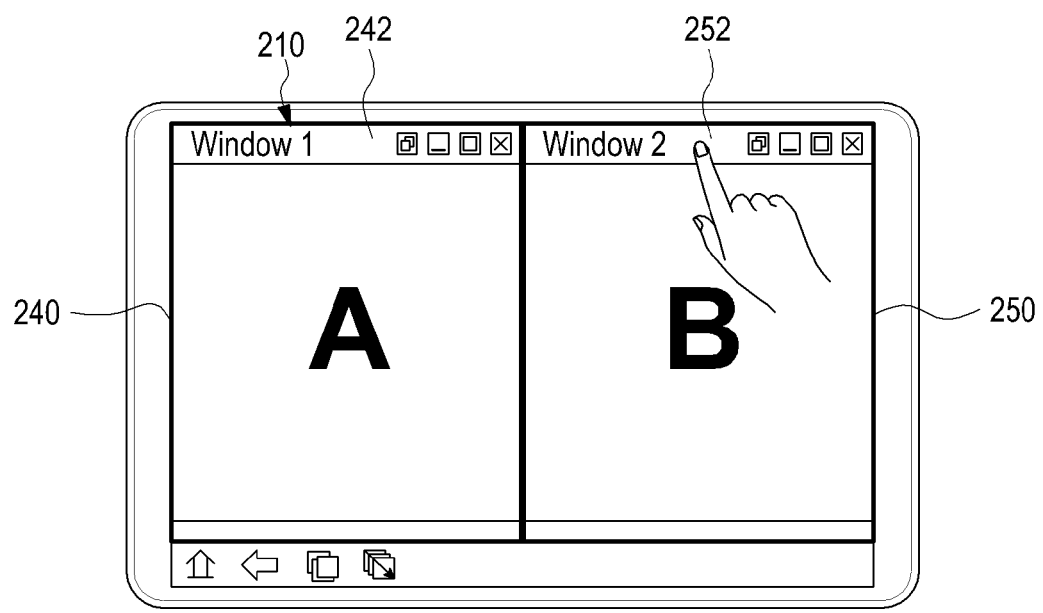
FIGS. 17A to 17D are diagrams for describing a screen control method by a mobile device executing multiple applications according to still another exemplary embodiment of the present invention.
Figure 17B:
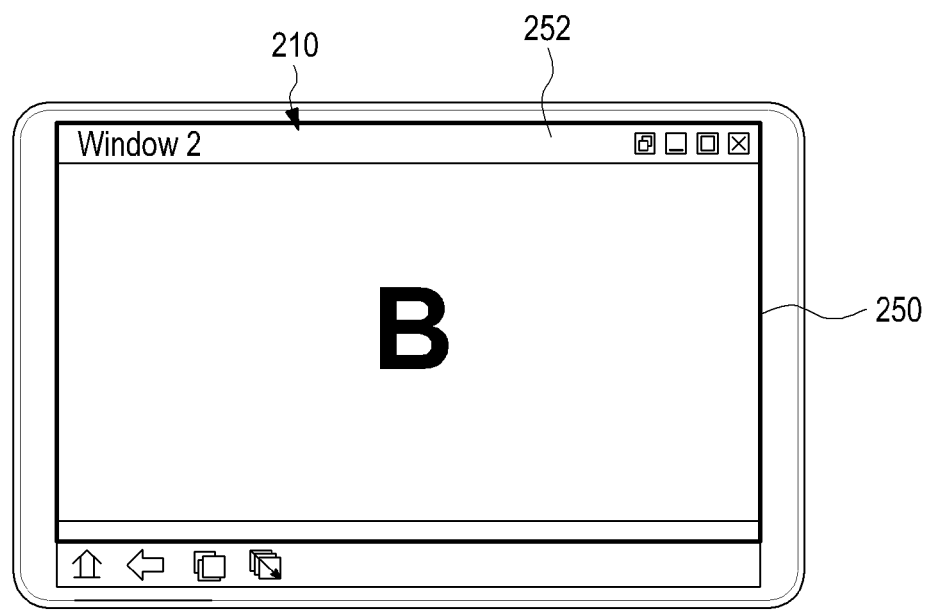

Referring to FIG. 17A, only one of the two windows 240 and 250 may be displayed on the entirety of the main screen 210 by the touch in a state where the two windows 240 and 250 are displayed on the main screen in the split mode. For example, the controller 110 detects the touch generated by performing a double tap on the title bar 252 of the second window 250, and may display the second window 250 on the entirety of the main screen 210 as illustrated in FIG. 17B. Here, the double tap refers to a gesture lightly and shortly tapping the touch screen 190 with one finger two times. Further, when the object B included in the second application within the second window 250 is touched, a function or an event corresponding to the object B is executed in the second application. Accordingly, in order to change the size of the second window 250, an area which does not influence the object B, that is, the title bar 252 may be used.

Figure 17C:
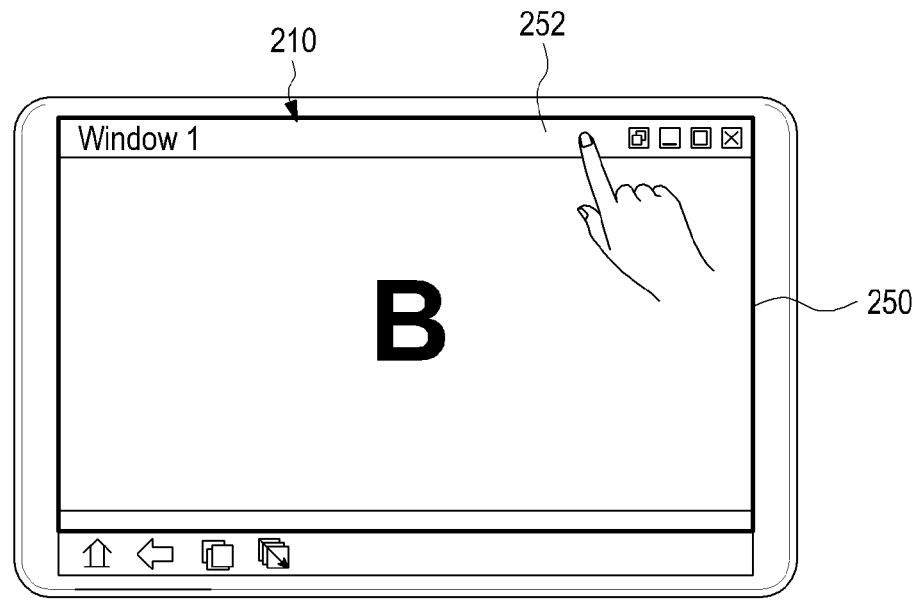

Therefore, as illustrated in FIG. 17C, even though all the first and second applications are executed in the device 100, only the second window 250 is displayed on the main screen 210 and the first window 240 is not shown. However, as illustrated in FIG. 17D, it is possible to display the first window 240 on the touch screen 190.

Figure 17D:
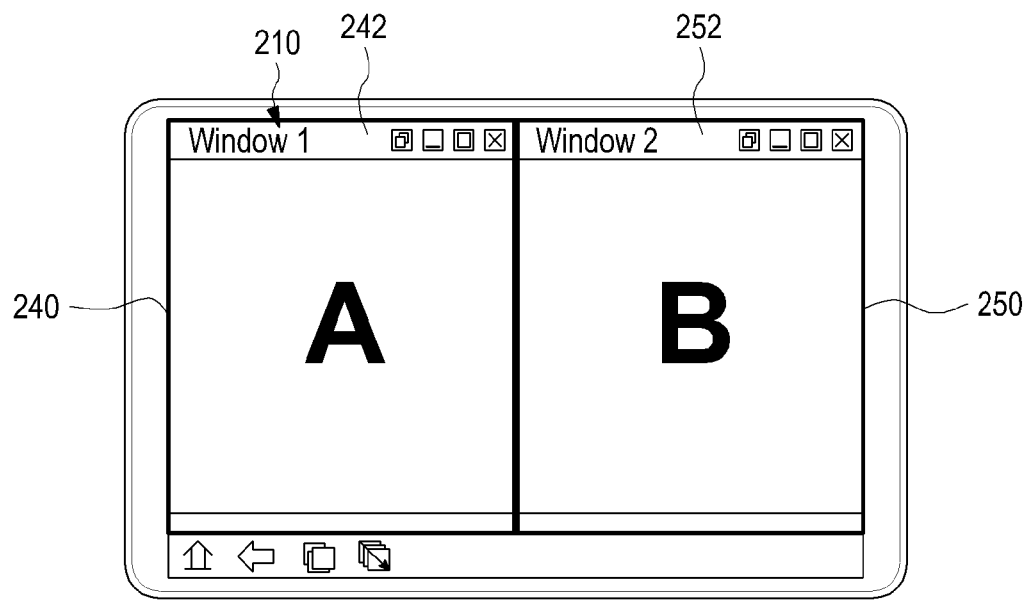

That is, referring to FIG. 17C, the controller 110 detects the touch generated by performing the double tap on the title bar 252 of the second window 250 on the entirety of the main screen 210, and displays the first window 240 and the second window 250 with the same size as each other on the main screen 210 as illustrated in FIG. 17D.

FIGS. 18A to 18F are diagrams for describing a screen control method by a mobile device executing multiple applications according to yet another exemplary embodiment of the present invention.

Figure 18A:
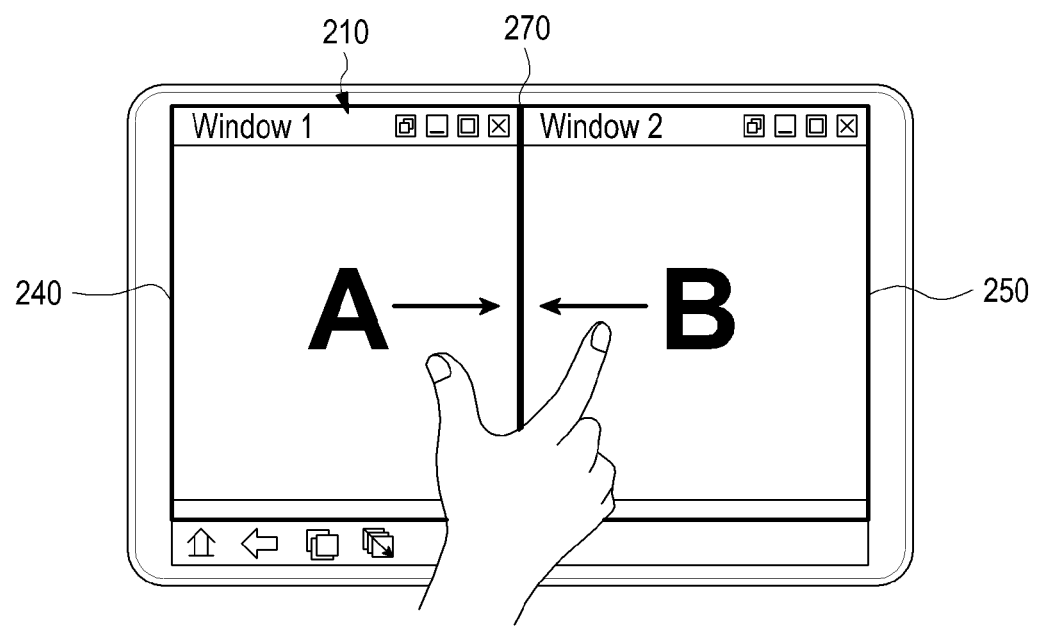
FIGS. 18A to 18F are diagrams for describing a screen control method by a mobile device executing multiple applications according to yet another exemplary embodiment of the present invention.

Referring to FIG. 18A, the user can switch display positions of the two windows 240 and 250 by the user's touch in a state where the two windows 240 and 250 are displayed on the main screen 210 of the device 100 in the split mode.

For example, the controller 110 detects pinch gestures performed with the common boundary line 270 therebetween, and may switch the display positions of the first window 240 and the second window 250. Here, pinches correspond to gestures of moving two fingers in different directions in a state where the two fingers (for example, thumb and index finger) touch the touch screen 190.

Figure 18B:
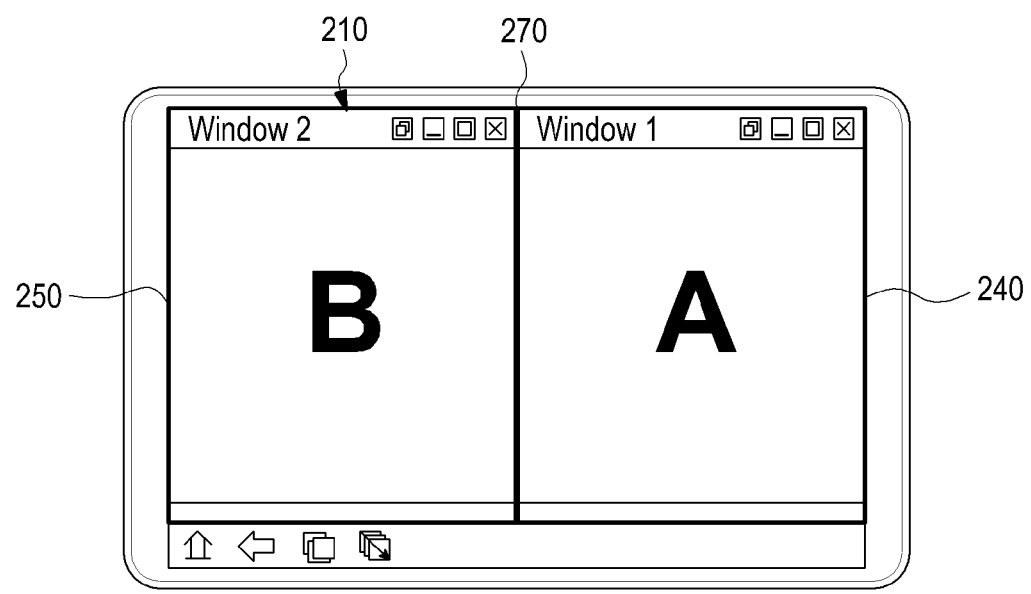

In FIG. 18A, the first window 240 is displayed in a left side of the common boundary line 270, and the second window 250 is displayed in a right side of the common boundary line 270. Further, in a state where the thumb of the user touches one point within the first window 240 and the index finger of the user touches one point within the second window 250, the user horizontally moves the two fingers in a direction close to the common boundary line 270. Then, the controller 110 detects touches of the fingers to display the first window 240 in the right side of the common boundary line 270 and display the second window 250 in the left side of the common boundary line 270 as illustrated in FIG. 18B. As described above, the user who is not skilled in the User Interface (UI) of the device 100 can switch the positions of the first and second windows 240 and 250 by making the gesture of crossing his/her two fingers on the touch screen 190 according to intuition.

Figure 18C:
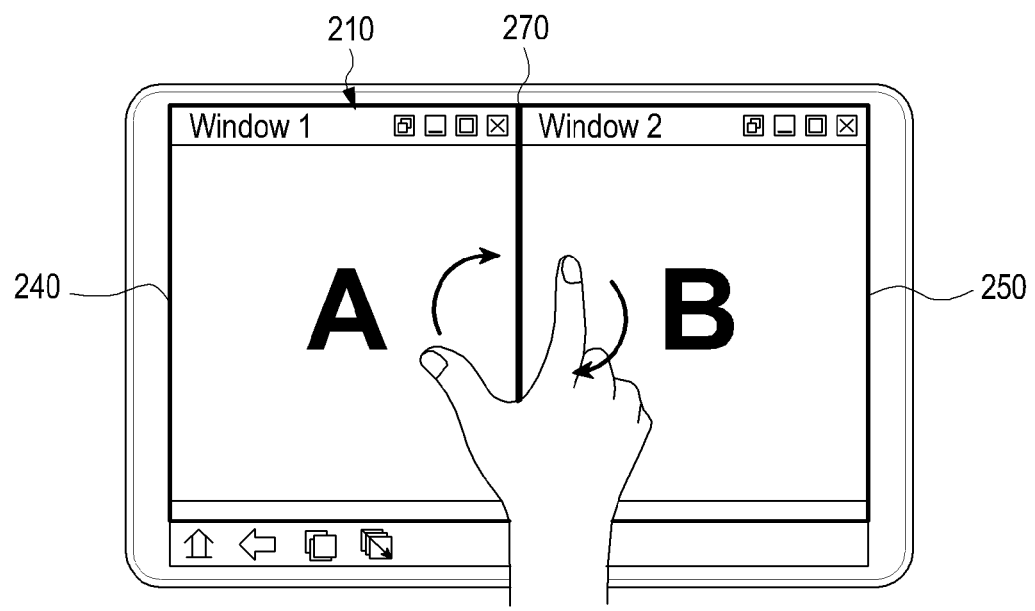
Figure 18D:
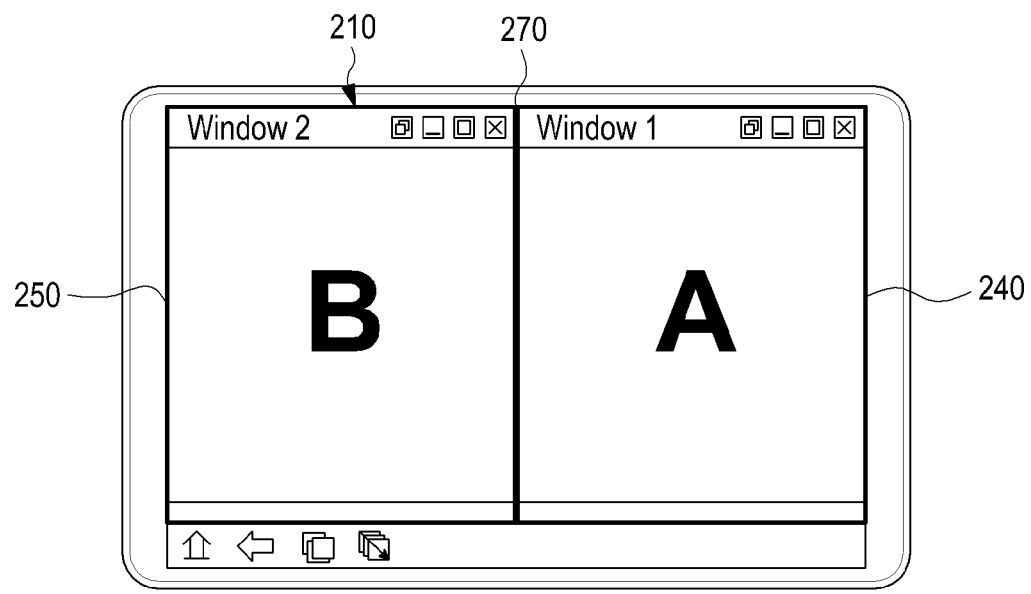

Further, referring to FIG. 18C, the first window 240 is displayed in the left side of the common boundary line 270, and the second window 250 is displayed in the right side of the common boundary line 270. In addition, in the state where the thumb of the user touches one point within the first window 240 and the index finger of the user touches one point within the second window 250, the user clockwise rotates the two fingers in a circle. An interval between the two fingers may be smaller while drawing the circle. Then, the controller 110 detects touches of the fingers to display the first window 240 in the right side of the common boundary line 270 and display the second window 250 in the left side of the common boundary line 270 as illustrated in FIG. 18D. As described above, the user who is not skilled in the UI of the device 100 can switch the positions of the first and second windows 240 and 250 by making the gesture of rotating his/her two fingers on the touch screen 190 according to intuition.

Figure 18E:
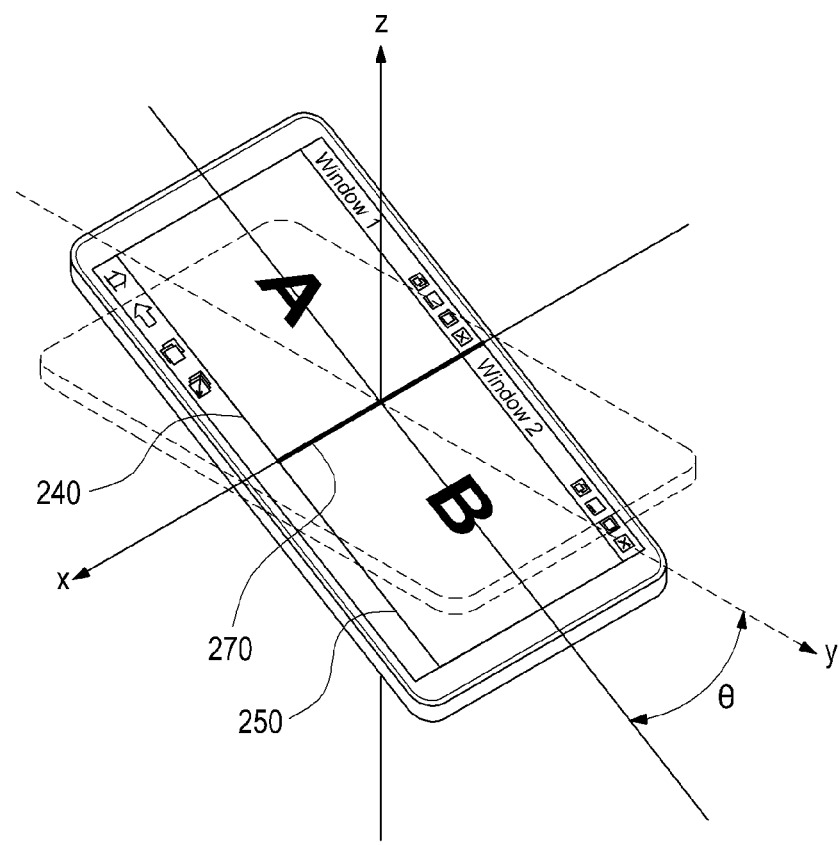

In addition, referring to FIG. 18E, the controller 110 recognizes a motion of the device 100 to switch the display positions of the two windows 240 and 250 by the user's touch in a state where the two windows 240 and 250 are displayed on the main screen 210 of the device 100 in the split mode.

Figure 18F:
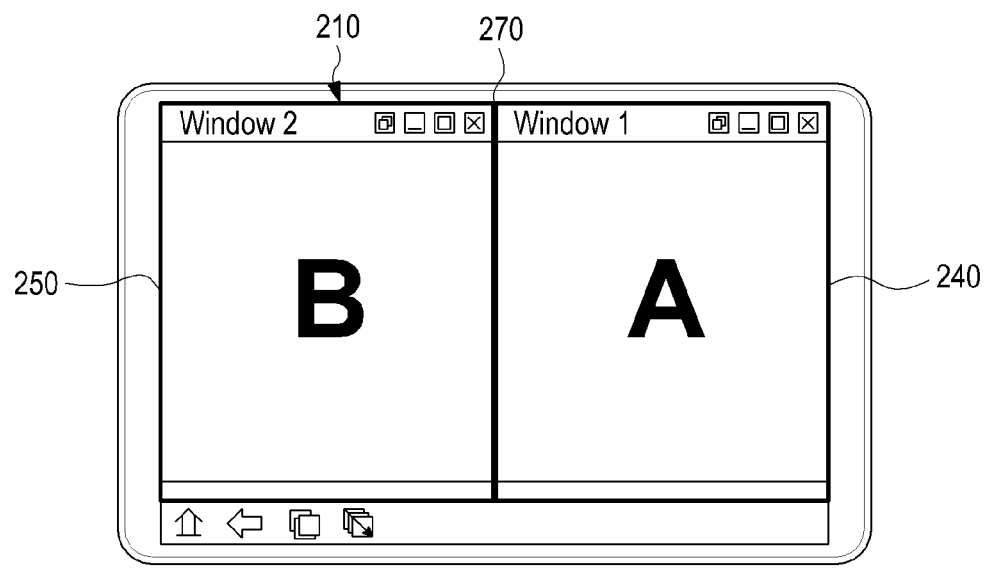

In FIG. 18E, in a state where the device 100 is laid on a horizontal plane (x-y plane) in parallel, the first window 240 is displayed in the left side of the common boundary line 270 and the second window 250 is displayed in the right side of the common boundary line 270. Further, as illustrated in FIG. 18F, when the user inclines the device 100 by a predetermined angle θ from the horizontal plane (x-y plane), the controller 110 detects the inclination of the device 100 by using the sensor module 170 to display the first window 240 in the right side of the common boundary line 270 and display the second window 250 in the left side of the common boundary line 270. As described above, the user who is not skilled in the UI can switch the positions of the first and second windows 240 and 250 by simply inclining the device 100 according to intuition. The predetermined angle θ may be 45 to 90 degrees. In addition, the case where a right end of the device 100 inclines toward a vertical bottom direction (−z direction) has been described in FIG. 18E as an example, but the display positions of the first and second windows 240 and 250 may be switched even when the right end inclines toward a vertical top direction (+z direction).

FIGS. 19A to 19D are diagrams for describing a screen control method by a mobile device executing multiple applications according to still yet another exemplary embodiment of the present invention.

Referring to FIGS. 19A to 19D, the display positions of the two windows 240 and 250 may be rotated by user's touch in a state where the two windows 240 and 250 are displayed on the main screen 210 of the device 100 in the split mode.

Figure 19A:
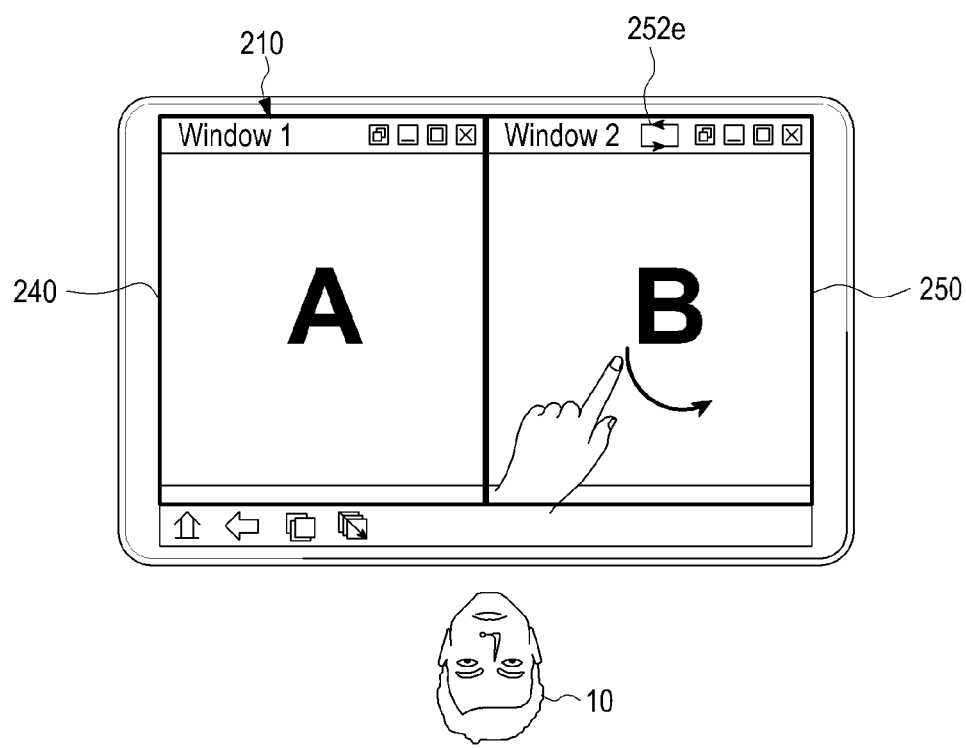
FIGS. 19A to 19D are diagrams for describing a screen control method by a mobile device executing multiple applications according to still yet another exemplary embodiment of the present invention.

First, as illustrated in FIG. 19A, the first window 240 and the second window 250 are arranged in a direction of a first user 10. Here, the arrangement of the first window 240 and the second window 250 in the direction of the first user 10 indicates that the first window 240 and the second window 250 are arranged in a direction that the first user 10 generally views and conveniently recognizes objects A or B including texts displayed in the first window 240 or the second window 250 as illustrated in FIG. 19A.

Figure 19B:
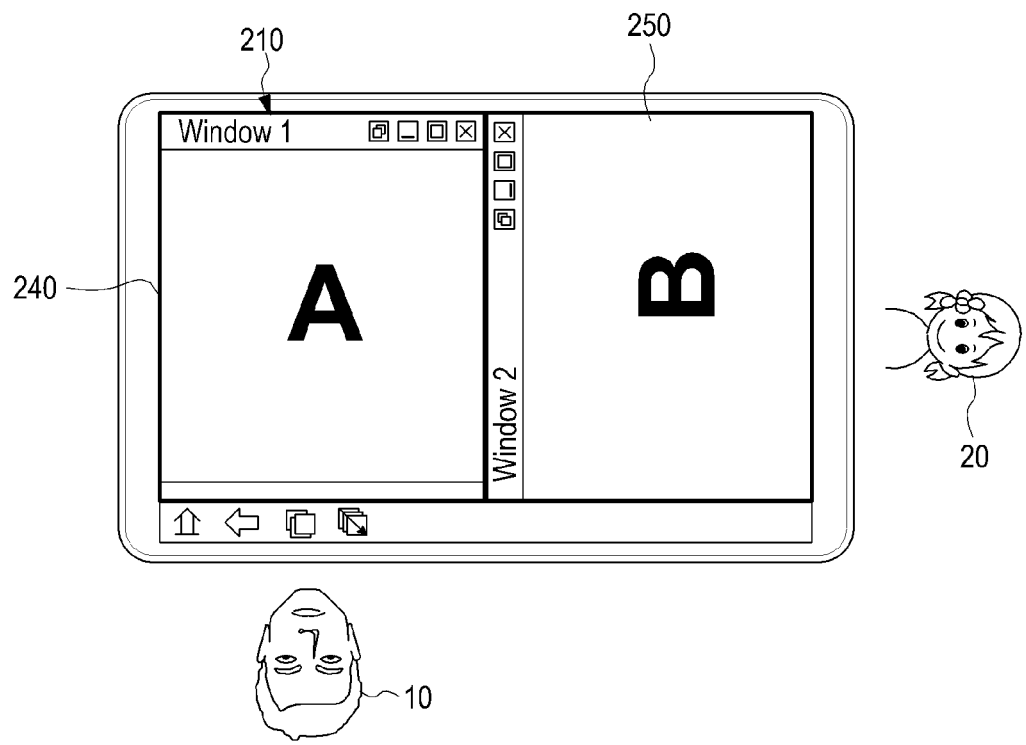

In such a state, the first user 10 touches the second window 240, and then performs a gesture of counterclockwise rotating his/her finger by 90 degrees and continuously rotating the finger. Then, as illustrated in FIG. 19B, the controller 110 detects the rotation gesture and counterclockwise rotates the second window 250 by 90 degrees according to the gesture of the first user 10 to arrange the second window 250 in a direction of a second user 20. Further, when a screen rotation button 252e formed in the title bar 252 of the second window 250 is touched, the controller 110 may be set such that the second window 250 is counterclockwise rotated by 90 degrees and then displayed.

Figure 19C:
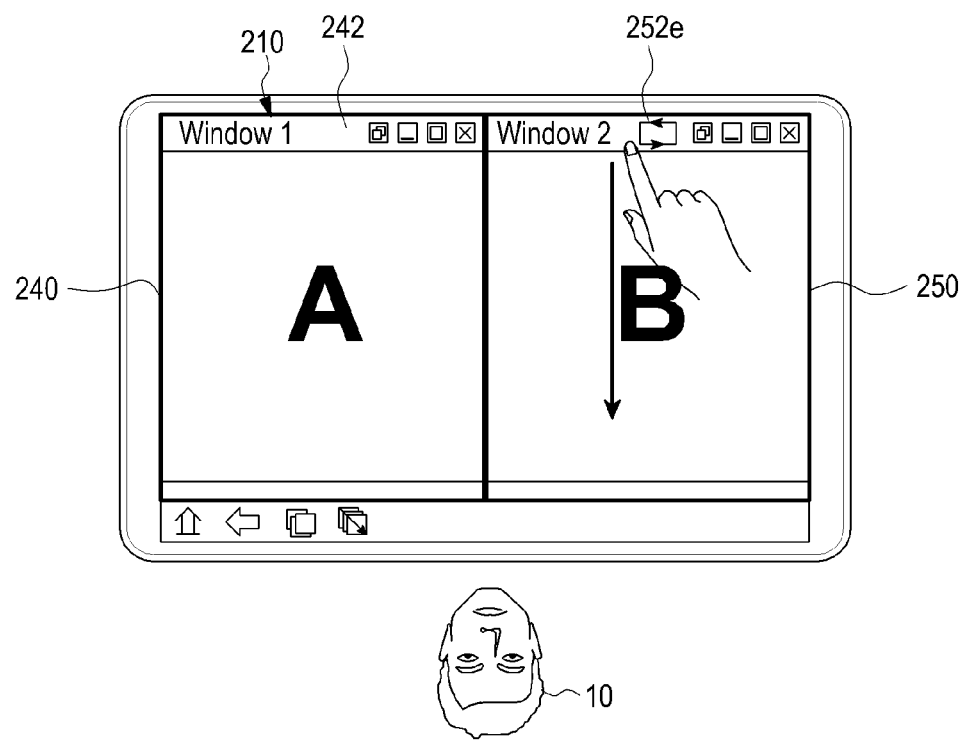
Figure 19D:
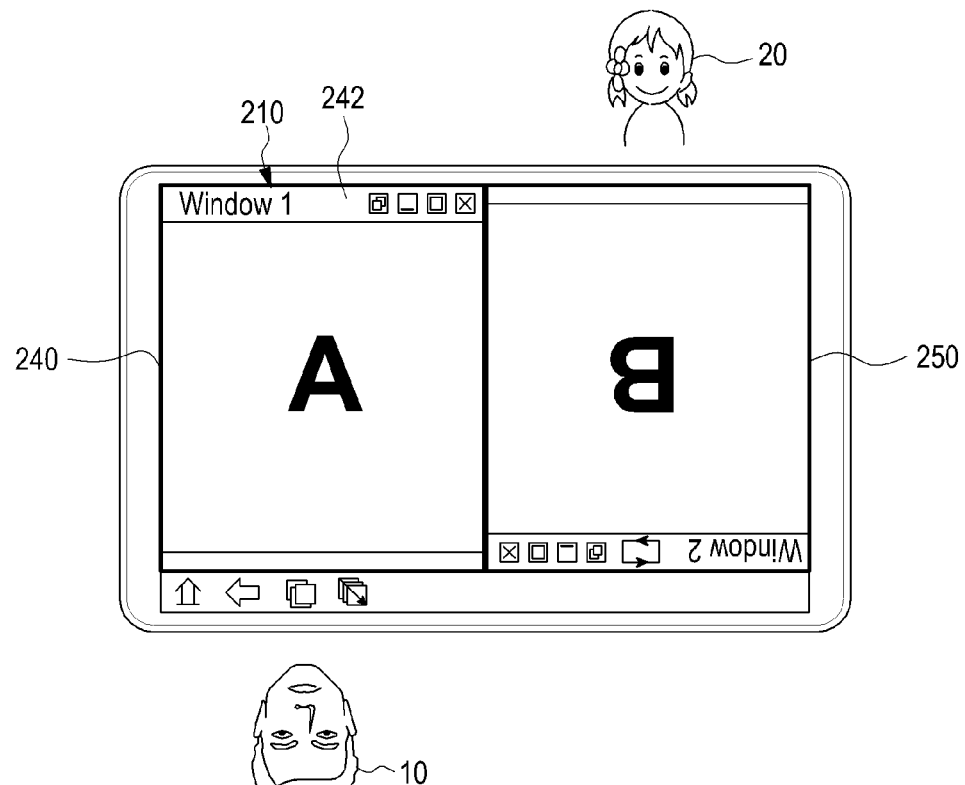

In addition, referring to FIG. 19C, in the state where the first window 240 and the second window 250 are arranged in the direction of the first user 10, the first user 10 touches the title bar 252 of the second window 250 and then performs a gesture of dragging his/her finger in the vertical bottom direction. Then, the controller 110 detects the touch and drag gestures and rotates the second window 250 by 180 degrees according to the gesture of the first user 10 to arrange the second window 250 in the direction of the second user 20 as illustrated in FIG. 19D. Further, when the touch gesture of counterclockwise rotating the finger on the second window 250 is detected or the screen rotation button 252e formed in the title bar 252 of the second window 250 is touched, the controller 110 may be set such that the second window 250 is counterclockwise rotated by 180 degrees and then displayed.

As described above, the first window 240 may be arranged in the direction of the first user 10, and the second window 250 may be arranged in the direction of the second user 20. The first user 10 can view a first application through the first window 240 from a first direction or perform functions of the first application by touching the object A. Further, the second user 20 can view a second application through the second window 250 from a direction rotated by 90 degrees or 180 degrees from the first direction or perform functions of the second application by touching the object B. Accordingly, each of the plurality of users 10 and 20 can use different applications by using one mobile device 100 and the touch screen 190.

Figure 20A:
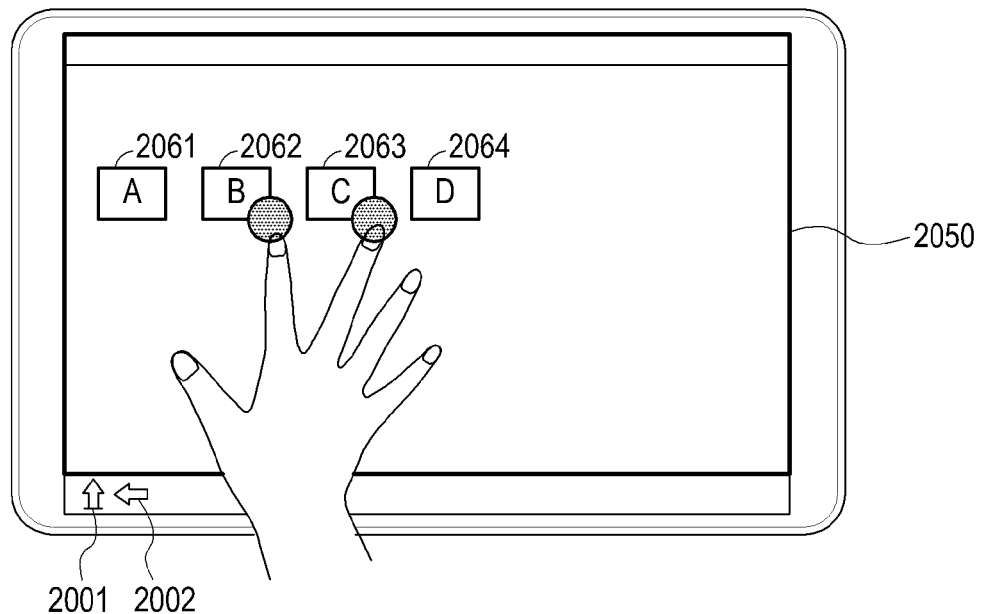
FIG. 20A is a conceptual diagram for describing a plurality of execution inputs simultaneously executing a plurality of applications according to an exemplary embodiment of the present invention.

FIG. 20A is a conceptual diagram for describing a plurality of execution inputs for simultaneously executing a plurality of applications according to an exemplary embodiment of the present invention.

As illustrated in FIG. 20A, application execution icons 2061, 2062, 2063, and 2064 for executing applications A, B, C, and D are displayed on a touch screen 2050. Each of the application execution icons 2061, 2062, 2063, and 2064 can output threads for executing corresponding applications in a preset way, for example, when receiving a touch input. The controller 110 loads the corresponding application on the RAM or the ROM based on the received thread.

Meanwhile, the user can input a simultaneous execution input for simultaneously executing the plurality of applications, for example, applications B and C. An example of the simultaneous execution input in FIG. 20A may be a gesture of substantially simultaneously touching corresponding application execution icons of the applications B and C. Here, the expression of substantially simultaneously may mean that a time difference between touch time points of the application execution icons is shorter than a preset threshold.

For example, when receiving a simultaneous execution input such as the substantially simultaneous touches of the corresponding application execution icons of the applications B and C, the controller 110 can perform multitasking by loading the applications B and C. More specifically, first and second controllers 110*a* and 110*b* of the controller 110 can load and execute each of the applications B and C.

Meanwhile, the configuration of simultaneously executing two applications relative to the above-described exemplary embodiment of the present invention is merely an example, and it is easily understood by those skilled in the art that the number of applications simultaneously executed is not limited.

Menu keys 2001 and 2002 can provide a function of controlling a general operation of a device 2000. For example, when the user touches the menu key 2001, the device 2000 can provide a menu screen. When the user touches the menu key 2002, the device 2000 can display again the screen displayed in a previous step. Meanwhile, the control by the touch of the menu keys 2001 and 2002 is an example, and it is easily understood by those skilled in the art that various implementation examples of controlling the general operation of the device 2000 by a single control or a combination of controls of the menu keys 2001 and 2002 may be applied to the exemplary embodiments. The menu keys 2001 and 2002 may have a rectangular shape extending in a horizontal direction on a part of a touch screen 2050, for example, on first and second application execution screens 2054 and 2055. The menu keys 2001 and 2002 may be implemented in a type of being displayed on the touch screen 2050 as described above, but it is merely an example and the menu keys 2001 and 2002 may be implemented in a type of a separate physical button from the touch screen 2050.

Figure 20B:
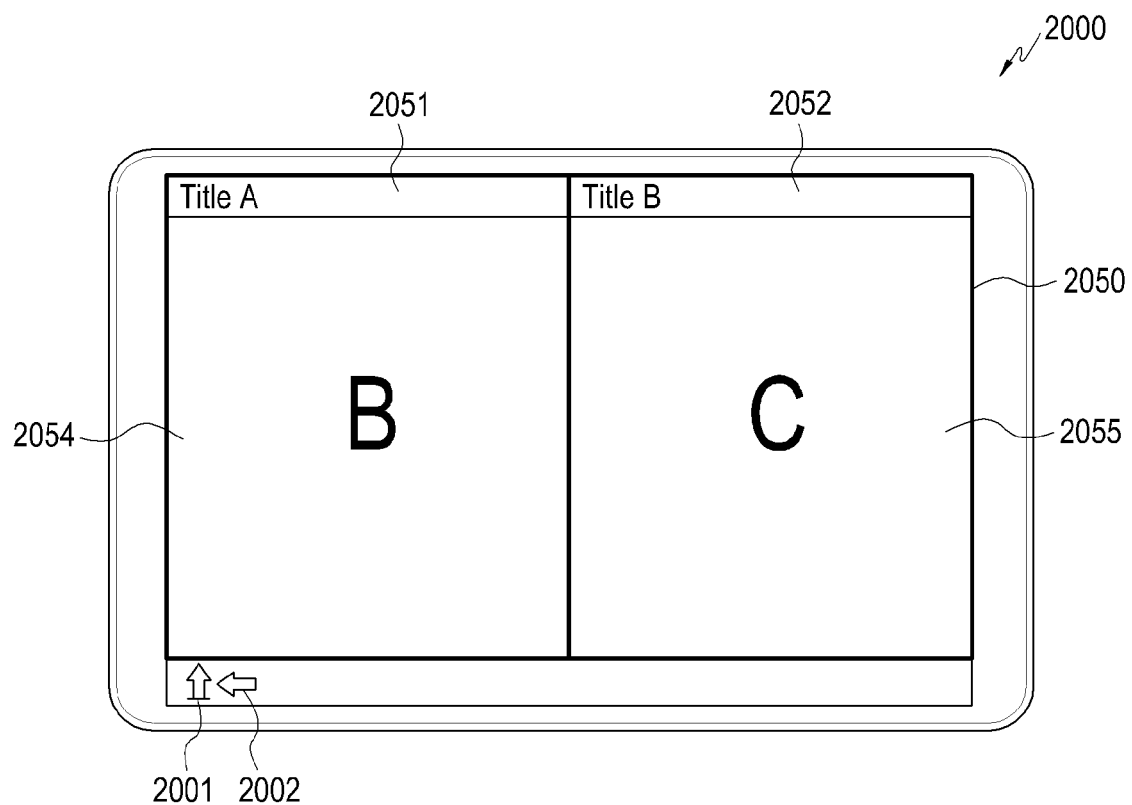
FIG. 20B is a conceptual diagram of a device having a touch screen displaying a first window and a second window according to an exemplary embodiment of the present invention.

FIG. 20B is a conceptual diagram of the device having the touch screen including first and second windows according to an exemplary embodiment of the present invention.

The touch screen 2050 can display various icons, multimedia, an application execution screen and the like as described above. The device 2000 according to an exemplary embodiment displays first and second title bars 2051 and 2052, the first and second application execution screens 2054 and 2055, and the menu keys 2001 and 2002.

The first and second title bars 2051 and 2052 can display a letter, a number, a figure or the like for identifying the first and second applications. The first and second title bars 2051 and 2052 may be implemented, for example, in a substantially rectangular shape extending in a horizontal axis direction, but such an implementation is merely an example and it is easily understood by those skilled in the art that the title bar has no limitation as long as the title bar is a means for identifying the applications.

Each of the first and second application execution screens 2054 and 2055 can display an execution screen of an independent application. In the example of FIG. 20A, the execution screens 2054 and 2055 of the applications B and C may have substantially a rectangular shape and each of the execution screens 2054 and 2055 may be disposed in a bottom of the first and second title bars 2051 and 2052. The execution screens 2054 and 2055 of the first and second applications can display texts, multimedia or the like in accordance with the configuration of the applications.

The controller 110 according to an exemplary embodiment can control such that the first and second applications are independently displayed in the first window and the second window. That is, execution or termination of the first application does not influence execution or termination of the second application. Accordingly, even when the first application is terminated, the second application may be displayed in the second window 2052 and 2055. Alternatively, as another exemplary embodiment of the present invention, the second application may be displayed in an entirety of the first and second windows.

Figure 20C:
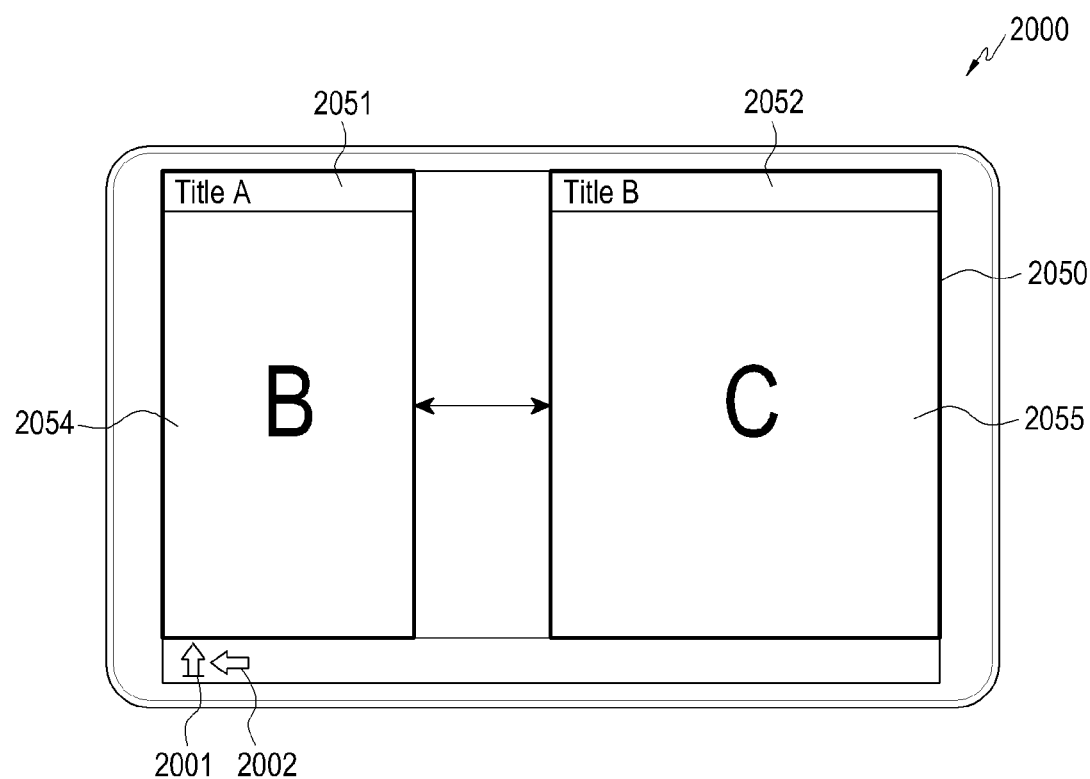
FIG. 20C is a conceptual diagram of a device having a touch screen displaying a first window and a second window according to another exemplary embodiment of the present invention.

FIG. 20C is a conceptual diagram of the device having the touch screen displaying first and second windows according to another exemplary embodiment. In FIG. 20C, the first window 2051 or 2054 and the second window 2052 or 2055 are spaced apart from each other with a predetermined interval therebetween in contrast with the exemplary embodiment of FIG. 20B. Meanwhile, besides the exemplary embodiment of FIG. 20B, it is easily understood by those skilled in the art that there is no limitation as long as the first window and the second window are separated.

Figure 20D:
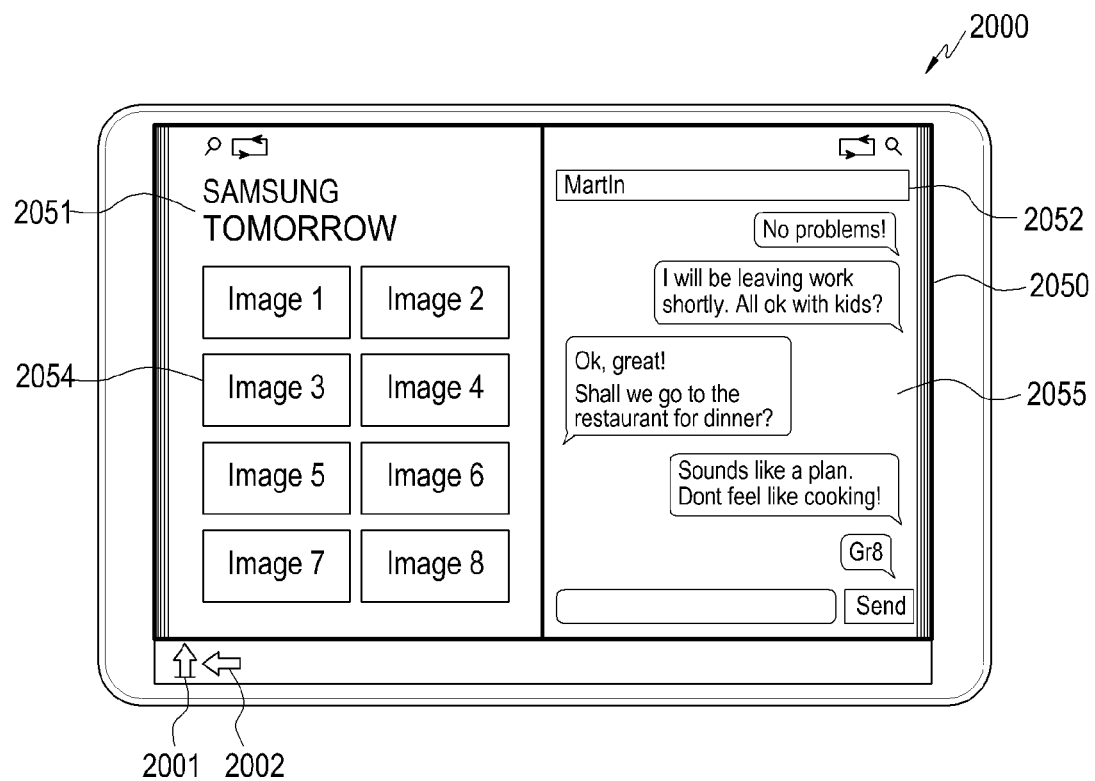
FIG. 20D is a conceptual diagram of an implementation example according to an exemplary embodiment of the present invention.

FIG. 20D is a conceptual diagram of an implementation example according to an exemplary embodiment of the present invention. As illustrated in FIG. 20D, the first and second applications may be displayed as indicated in respective pages of a book. The touch screen 2050 can display the first title bar 2051, the first application execution screen 2054, the second title bar 2052, and the second application execution screen 2055.

Figure 21:
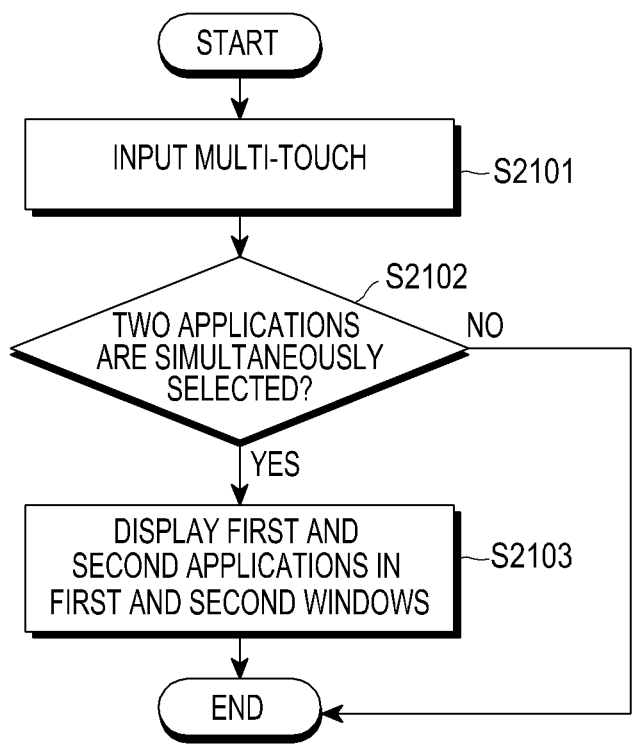
FIG. 21 is a flowchart illustrating a control method by a device including a touch screen simultaneously executing a plurality of applications according to an exemplary embodiment of the present invention.

FIG. 21 is a flowchart illustrating a method of controlling the device including the touch screen simultaneously executing a plurality of applications according to an exemplary embodiment of the present invention.

The touch screen may receive a multi-touch, that is, a simultaneous execution input from an outside in step S2101. The multi-touch may be a touching of a plurality of random points of the touch screen, for example, icons. Meanwhile, although the touching of the plurality of points by the multi-touch is an example, it is easily understood by those skilled in the art that there is no limitation in a multi-touch mode such as a mode where one point, for example, one icon is touched and then another point, for example, an icon corresponding to an application to be simultaneously executed is dragged.

When receiving the multi-touch, the controller 110 can determine whether two applications are substantially simultaneously selected in step S2102. The controller 110 can determine, for example, input times of a plurality of touches input to the touch screen and determine a time difference between the input times. When a time difference between input times of the plurality of touches is smaller than a preset threshold, the controller 110 can determine that two applications are simultaneously selected in step S2102-Y. Further, when the time difference between input times of the plurality of touches is not smaller than the preset threshold, the controller can determine that the two applications are not simultaneously selected and execution of the application corresponding to an application execution icon first executed in as aspect of the time is received in step S2102-N.

When it is determined that the two applications are simultaneously selected, the controller 110 determines that the input corresponds to a simultaneous execution input to control the touch screen to display the two applications in the first and second windows, respectively in step S2103.

According to the above described exemplary embodiment, the action of simultaneously touching the two application execution icons to execute the two applications complies with user intuition, and accordingly it is possible to easily perform the multitasking for a plurality of applications without a separate additional control process.

Figures 22A, 22C:
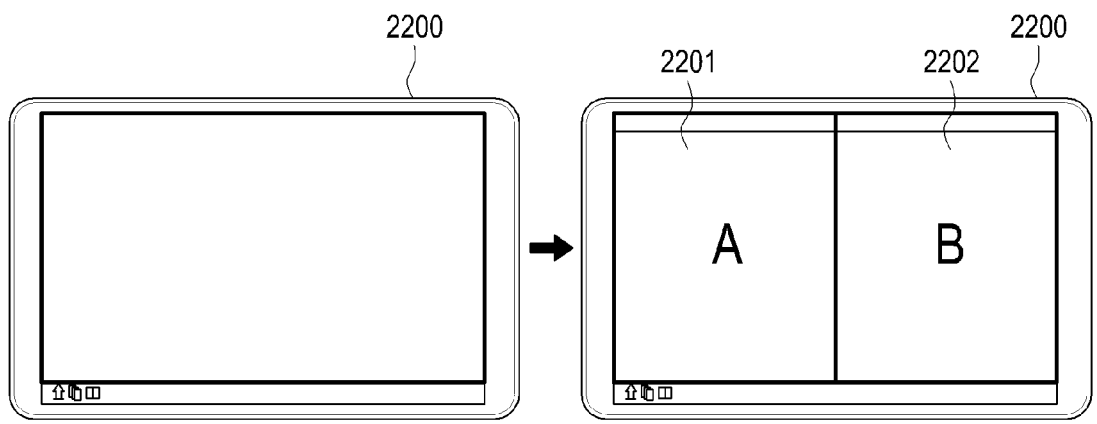
FIGS. 22A and 22C are conceptual diagrams of a device including a touch screen according to an exemplary embodiment of the present invention.

FIGS. 22A and 22C are conceptual diagrams of a device including a touch screen according to an exemplary embodiment of the present invention. FIG. 22A is a conceptual diagram of a device 2200 including the touch screen according to an exemplary embodiment of the present invention.

Figure 22B:
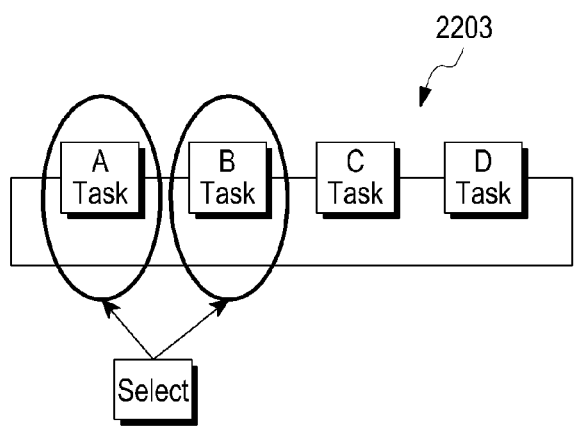
FIG. 22B is a conceptual diagram of an application panel according to an exemplary embodiment of the present invention.

FIG. 22B is a conceptual diagram of an application panel according to an exemplary embodiment of the present invention. As illustrated in FIG. 22B, the application panel 2203 includes A, B, C and D application execution icons and generates threads for executing each application by the touch.

The application panel 2203 may be disposed in a random point of the touch screen. The application execution icon included in the application panel 2203 is editable by the user or may be a defaulted icon. The application panel 2203 may include an application execution icon of the application frequently used by the user.

For example, the user can substantially simultaneously touch A and B application execution icons, and the controller 110 can determine whether the A and B application execution icons are simultaneously touched by comparing a time difference between touch times of the A and B application execution icons as illustrated in FIG. 22B. When it is determined that the A and B application execution icons are simultaneously touched, the controller 110 may determine that the simultaneous execution input is input. Accordingly, the controller 110 can execute the A and B applications while independently displaying the A and B applications in the first window 2201 and the second window 2202 as illustrated in FIG. 22C.

Figure 23:
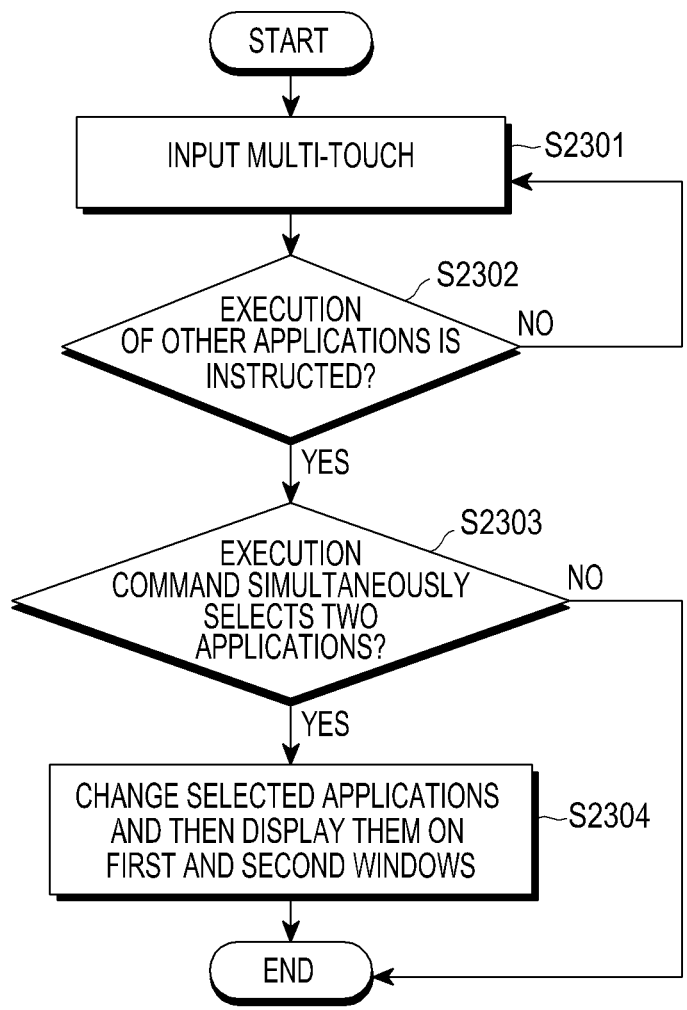
FIG. 23 is a flowchart illustrating a control method by a device including a touch screen simultaneously executing a plurality of applications according to an exemplary embodiment of the present invention.

FIG. 23 is a flowchart illustrating a method of controlling the device including the touch screen simultaneously executing a plurality of applications according to another exemplary embodiment of the present invention. Each step of FIG. 23 will be described with reference to FIGS. 24A to 24C.

The controller 110 can control the touch screen 190 such that the first and second applications are displayed in the first and second windows in step S2301. Here, since the configuration where the first and second applications are simultaneously executed and independently displayed in the first and second windows has been described in detail, more descriptions thereof will be omitted.

Figures 24A, 24C:
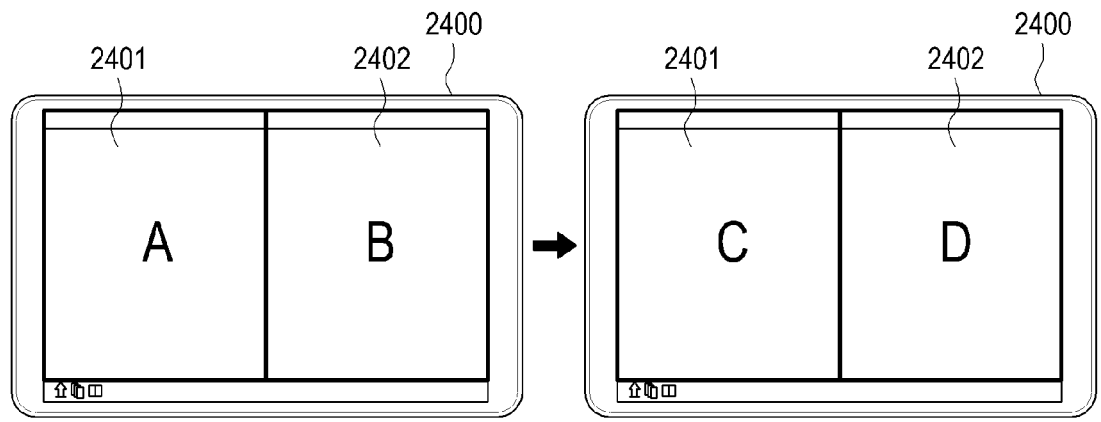
FIG. 24A is a conceptual diagram of a device including a touch screen according to an exemplary embodiment of the present invention.
FIG. 24C is a conceptual diagram of a device including a changed touch screen according to an exemplary embodiment of the present invention.

FIG. 24A is a conceptual diagram of a device including a touch screen according to an exemplary embodiment of the present invention.

Referring to FIG. 24A, A and B applications are displayed in a first window 2401 and a second window 2402 of the touch screen of the device 2400, respectively.

The controller 110 can receive an input for executing another application from an outside, that is, can receive an execution application switching input in step S2302. Here, the input for executing another input may be an input for executing another application other than the first and second applications in step S2301. The input for executing another application may be a gesture for going back to the initial menu screen to touch the application execution icon or touching the application execution icon included in the application panel displayed coexistently on the touch screen.

Figure 24B:
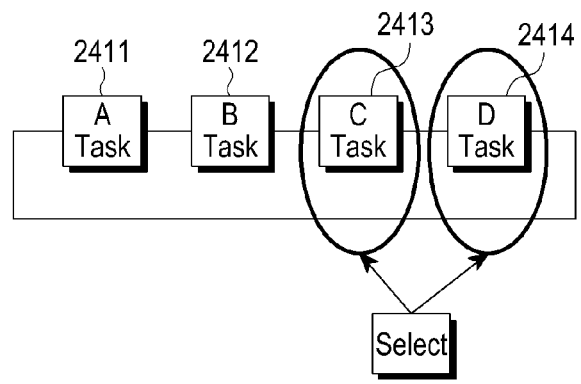
FIG. 24B is a conceptual diagram of an application panel according to an exemplary embodiment of the present invention.

FIG. 24B is an application panel according to an exemplary embodiment of the present invention.

Referring to FIG. 24B, the application panel may be displayed in a random area of the touch screen of FIG. 24A. The application panel includes A, B, C, and D application execution icons 2411, 2412, 2413, and 2414. The user can input the simultaneous execution input by substantially simultaneously touching the C and D application execution icons 2413 and 2414.

The controller 110 can determine whether the input for executing another application is an input for simultaneously executing two or more applications in step S2303. When the input is the multi-touch, the controller 110 can determine whether the input for executing another application is the input for simultaneously executing two or more applications based on whether a time difference between a plurality of touch times of the multi-touch is equal to or smaller than a preset threshold.

When the input for executing another application is the input for simultaneously executing two or more applications in S2303-Y, the touch screen may be controlled such that selected two or more applications, for example, two applications are changed and then displayed in the first and second windows in step S2304.

FIG. 24C is a conceptual diagram of the device including the changed touch screen according to an exemplary embodiment of the present invention.

Referring to FIG. 24c, it may be identified that the C and D applications are displayed in the first and second windows 2401 and 2402, respectively.

Figure 25A:
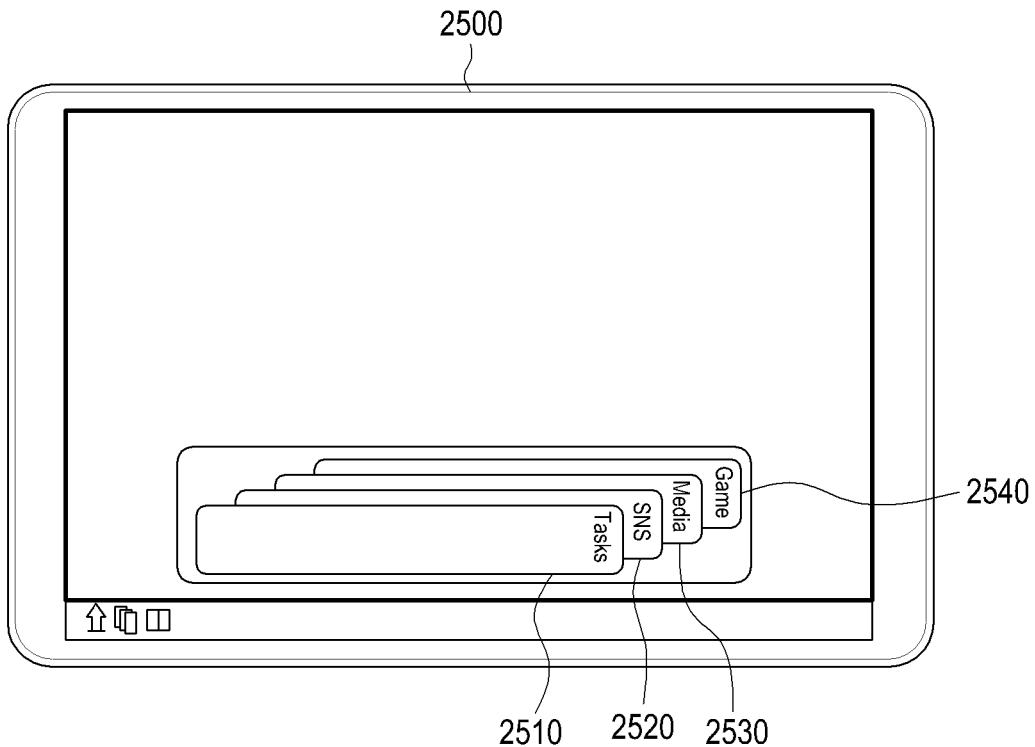
FIGS. 25A to 25C are conceptual diagrams for describing a layout of an application panel according to an exemplary embodiment of the present invention.
Figure 25B:
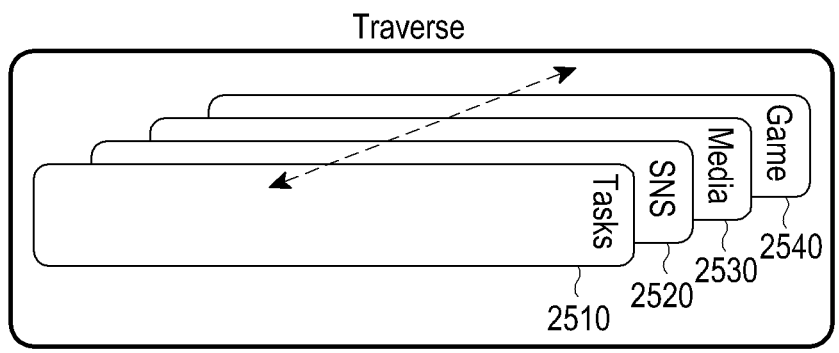
Figure 25C:
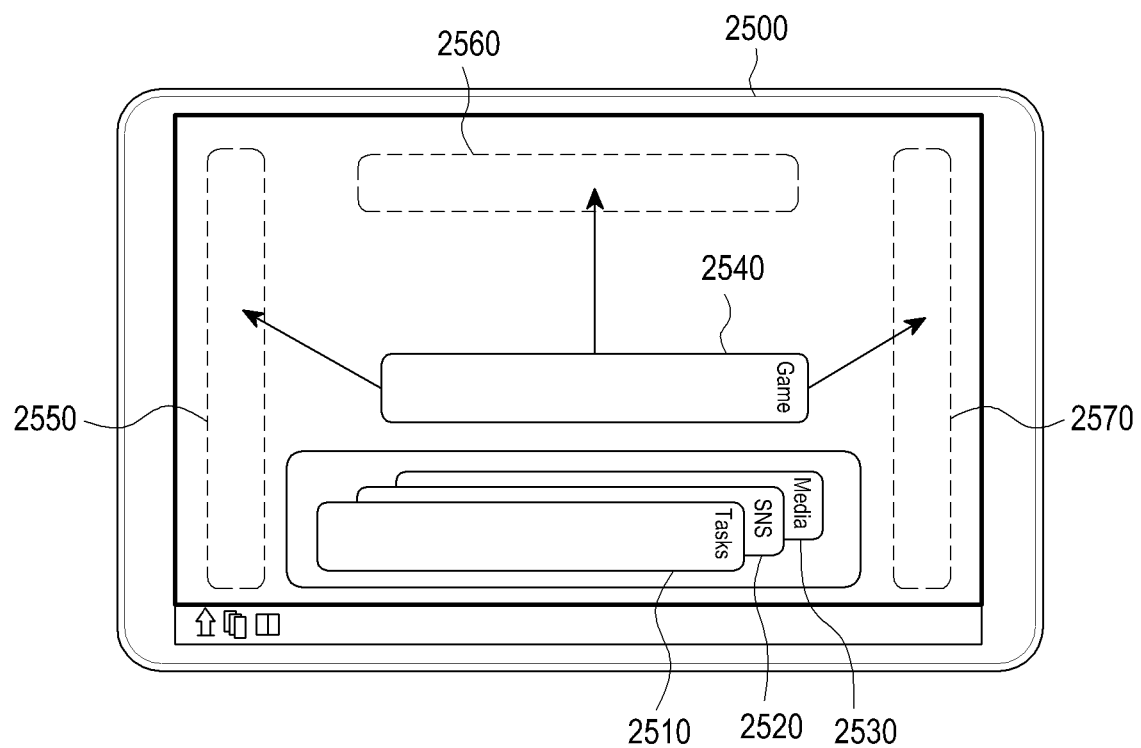

FIGS. 25A to 25C are conceptual diagrams for describing a layout of the application panel according to an exemplary embodiment of the present invention.

Referring to FIG. 25A, at least one of application panels 2510, 2520, 2530, and 2540 may be displayed on the touch screen 2500. Here, at least one of the application panels 2510, 2520, 2530, and 2540 may be overlappingly displayed. The application panel may include application execution icons, and may be implemented in a task application panel 2510, a Social Network Service (SNS) application panel 2520, a media application panel, a favorite application panel, a game application panel 2540 and the like according to a division reference of the execution icons FIG. 25B is a conceptual diagram illustrating a display change in the application panel.

Referring to FIG. 25B, the user inputs a drag and drop gesture to a random application panel, for example, a task application panel 2510 to change a position of the task application panel 2510. Here, the drag and drop refers to a gesture releasing the touch in a stop state after a drag gesture is input in a state where a particular view is touched. As described above, by adopting the task application panel, it is possible to create an effect of easily searching for and executing an execution key used by the user through a single interface.

Here, a task manager panel may be a panel displaying a list of applications which are currently executed. Meanwhile, the social network service application panel (for example, application icon group such as facebook, twitter and the like), the media application panel, the game application panel, and the favorite application panel (for example, application icon group frequently used) may be directly generated by the user and then edited and managed, or may be automatically generated by the controller and then configured.

According to an exemplary embodiment of the present invention, the task manager panel may be displayed in a front-most side, and the favorite application panel may be displayed in a back side in such a manner that the favorite application panel overlaps the task manager panel. A movement between panels may be performed based on the touch. When a particular panel is selected, the selected panel may be displayed in a controllable state in a front-most side. A basic layout of the panel is overlappingly provided in a stack type, but the order can be controlled according to user's taste. Further, each panel may be separated from a main stack and then disposed in each area of the screen.

FIG. 25C is a conceptual diagram illustrating a display change in the application panel according to various exemplary embodiments of the present invention.

Referring to FIG. 25C, the user inputs the drag and drop gesture to the game application panel 2540 to change a position of the game application panel 2540 to a random position 2550, 2560, or 2570.

As described above, the user can freely move the position of the application panel according to user convenience, and input the simultaneous touch of application execution icons to the application panel to easily execute a plurality of applications in accordance with user intuition.

Further, it is possible to manage applications for each group through the task manager panel and the application panel, and efficiently support execution and switching of the applications without a separate operation.

For example, when the user selects a plurality of application icons on the task manager panel, the screen is simultaneously switched to the plurality of selected applications currently executed and the applications may be simultaneously displayed. In addition, when a plurality of application icons on the application panel are selected, it is processed that an execution key is input, and the plurality of selected applications may be substantially simultaneously executed and simultaneously displayed on one screen.

The user can efficiently perform the execution/switching between the currently executed application and the frequently used application through one interface. Further, since two or more applications can be executed through one input, it is possible to remove an unnecessary time according to an individual execution.

Furthermore, the user may select a plurality of application icons on a task manager or application panel. Then the device may divide a region of the touch screen based on a number of application icons that the user touches. Or the device may provide a plurality of windows which are overlapped to each other based on the number of application icons that the user touches.

The methods according to the illustrative exemplary embodiments of the present invention may be implemented in a program command form which can be executed through various computer means, and may be recorded in a computer-readable medium. The computer-readable medium may include a program command, a data file, a data structure and the like alone or in combination thereof. The program command recorded in the medium may be one specially designed or constructed for the present invention or one known to and then used by those skilled in the computer software art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
a touch screen configured to:
receive multi-touch inputs, and
display visual items and first windows; and
at least one processor configured to:
display, on the touch screen, a first visual item for executing a first application by receiving a touch input on the first visual item and a second visual item for executing a second application by receiving a touch input on the second visual item, the first visual item being separated from the second visual item,
receive a multi-touch input on a first position and a second position of the touch screen, wherein the first position corresponds to the first visual item and the second position corresponds to the second visual item and the first position is different from the second position, and
display, simultaneously, on the touch screen, in response to receiving the multi-touch input on the first position and the second position of the touch screen, a first execution window of the first application corresponding to the first visual item and a second execution window of the second application corresponding to the second visual item by executing the first application corresponding to the first position touched by the multi-touch input and the second application corresponding to the second position touched by the multi-touch input,
wherein the first application runs independently from the second application,
wherein each of the first visual item and the second visual item is for executing one single application, and
wherein the at least one processor is further configured to:
execute a single application corresponding to one which is touched by a single touch input among the first visual item and the second visual item when receiving the single touch input, and
execute, simultaneously, two applications corresponding to the first visual item and the second visual item which are touched by the multi-touch input when receiving the multi-touch input.

2. The mobile device of claim 1, wherein the at least one processor is further configured to display the first execution window and the second execution window when a first input of the multi-touch input and a second input of the multi-touch input are acquired within a predetermined time.

3. The mobile device of claim 1, wherein the at least one processor is further configured to display a third application on the first execution window and a fourth application on the second execution window based on a switching input for switching the first application and the second application to others.

4. The mobile device of claim 3, wherein the switching input is a simultaneous execution input for a visual item corresponding to the third application and a visual item corresponding to the fourth application.

5. The mobile device of claim 4, wherein the at least one processor is further configured to display the visual item corresponding to the third application and the visual item corresponding to the fourth application on an application panel which is displayed on a portion of the touch screen.

6. The mobile device of claim 5, wherein, when a number of application panels is at least two, the at least one processor is further configured to display the application panels overlapping each other.

7. The mobile device of claim 5, wherein the at least one processor is further configured to change a position of the application panel based on at least one of position of an application changing input.

8. The mobile device of claim 7, at least one of position of the application changing input is a touch and drop gesture for the application panel.

9. A mobile device for executing multiple applications, the mobile device comprising:
   a touch screen configured to:
      comprise divided regions for displaying different windows not overlapping each other,
      receive multi-touch inputs, and
      display visual items and windows corresponding to applications; and
   at least one processor configured to:
      display, on the touch screen, each of a plurality of visual items for executing each of a plurality of applications by receiving a touch input on each of the plurality of visual items,
      receive a multi-touch input on a plurality of positions of the touch screen, each of the plurality of positions corresponding to each of the plurality of visual items, and
      display, simultaneously, on the touch screen, in response to receiving the multi-touch input on the plurality of positions of the touch screen, a plurality of execution windows of the plurality of applications each corresponding to each of the plurality of visual items by executing each of the plurality of applications corresponding to each of the plurality of positions touched by the multi-touch input,
   wherein each of the plurality of applications being executed simultaneously when a time between a plurality of inputs of the multi-touch input is less than a defined time period,
   wherein each of the plurality of visual items is for executing one single application, and
   wherein the at least one processor is further configured to:
      execute a single application corresponding to one which is touched by a single touch input among the plurality of visual items when receiving the single touch input, and
      execute, simultaneously, at least two applications corresponding to the plurality of visual items which are touched by the multi-touch input when receiving the multi-touch input.

10. A method for controlling a mobile device, the method comprising:
   displaying, on a touch screen of the mobile device, a first visual item corresponding to a first application and a second visual item corresponding to a second application;
   receiving a multi-touch input on a first position and a second position of the touch screen, wherein the first position corresponds to the first visual item and the second position corresponds to the second visual item and the first position is different from the second position; and
   displaying, simultaneously, on the touch screen, in response to receiving the multi-touch input on the first position and the second position of the touch screen, a first execution window of first application corresponding to the first visual item and a second execution window of the second application corresponding to the second visual item by executing the first application corresponding to the first position touched by the multi-touch input and the second application corresponding to the second position touched by the multi-touch input,
   wherein the first application runs independently from the second application,
   wherein each of the first visual item and the second visual item is for executing one single application, and
   wherein a single application corresponding to one which is touched by a single touch input among the first visual item and the second visual item is executed, when receiving the single touch input, and two applications corresponding to the first visual item and the second visual item which are touched by the multi-touch input are executed simultaneously, when receiving the multi-touch input.

11. The method of claim 10, wherein the displaying of the first execution window and the second execution window occurs when a first input of the multi-touch input and a second input of the multi-touch input are acquired within a predetermined time.

12. The method of claim 10, further comprising:
   inputting a switching input for switching the first application and the second application to others; and
   displaying a third application on the first execution window and a fourth application on the second execution window based on the switching input.

13. The method of claim 12, wherein the switching input is a simultaneous execution input for a visual item corresponding to the third application and a visual item corresponding to the fourth application.

14. The method of claim 13, further comprising controlling the visual item corresponding to the third application and the visual item corresponding to the fourth application on an application panel which is displayed on a portion of the touch screen.

15. The method of claim 14, wherein, when a number of application panels is at least two, displaying the application panels overlapping each other.

16. The method of claim 14, further comprising:
   inputting an application position changing input; and
   changing a position of the application panel based on the position of an application changing input.

17. The method of claim 16, wherein the position of the application changing input is a touch and drop gesture for the application panel.

18. A method for controlling a mobile device, the method comprising:
   displaying, on a touch screen of the mobile device, each of a plurality of visual items for executing each of a plurality of applications by receiving a touch input on each of the plurality of visual items;
   receiving a multi-touch input on a plurality of positions of the touch screen, each of the plurality of positions corresponding to each of the plurality of visual items; and
   displaying, simultaneously, on the touch screen, in response to receiving the multi-touch input on the plurality of positions of the touch screen, a plurality of execution windows of the plurality of applications each corresponding to each of the plurality of visual items by executing each of the plurality of applications corresponding to each of the plurality of positions touched by the multi-touch input, wherein each of the plurality of applications being executed simultaneously when a time between a plurality of inputs of the multi-touch inputs is less than a defined time period, wherein each of the plurality of visual items is for executing one single application, and wherein a single application corresponding to one which is touched by a single touch input among the plurality of visual items is executed, when receiving the single touch input, and at least two applications corresponding the plurality of visual items which are touched by the multi-touch input are executed simultaneously, when receiving the multi-touch input.

* * * * *